United States Patent
Oberste et al.

(10) Patent No.: US 12,227,883 B2
(45) Date of Patent: *Feb. 18, 2025

(54) SYSTEMS AND METHODS FOR CONTINUOUS FABRICATION OF WOVEN COMPOSITE MATERIALS

(71) Applicant: WEAV3D, Inc., Norcross, GA (US)

(72) Inventors: Christopher Oberste, Brookhaven, GA (US); Phillip Sung Tse Cheng, Atlanta, GA (US)

(73) Assignee: WEAV3D, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,240

(22) Filed: Feb. 15, 2024

(65) Prior Publication Data

US 2024/0240370 A1    Jul. 18, 2024

Related U.S. Application Data

(63) Continuation of application No. 17/822,645, filed on Aug. 26, 2022, now Pat. No. 12,110,616, which is a
(Continued)

(51) Int. Cl.
*D03C 3/20* (2006.01)
*D03C 13/00* (2006.01)
(Continued)

(52) U.S. Cl.
CPC ............. *D03C 3/205* (2013.01); *D03C 13/02* (2013.01); *D03D 41/004* (2013.01); *D03D 47/266* (2013.01)

(58) Field of Classification Search
CPC ...... D03C 3/205; D03C 13/02; D03D 47/266; D03D 15/00; D03D 15/225; D03D 15/283; D03D 15/292; D03D 41/004; D03J 1/06
See application file for complete search history.

(56) References Cited

U.S. PATENT DOCUMENTS 3,634,827 A    1/1972 Lourie
3,654,381 A    4/1972 Copp
(Continued)

FOREIGN PATENT DOCUMENTS

CN    101831744    3/2013
CN    106760538    5/2017
(Continued)

OTHER PUBLICATIONS

International Search Report for PCT/US2017/032703 dated Jul. 27, 2017.
(Continued)

*Primary Examiner* — Katharine G Kane
(74) *Attorney, Agent, or Firm* — Clayton, McKay & Bailey, PC

(57) ABSTRACT

A machine and method are presented for continuously forming a woven composite with controllable internal fabric geometry. The machine may include one or more spools for dispensing one or more warp filaments, a roller assembly configured to receive a composite weave, a warp rack having warp heads for engaging the warp filaments and vertically adjusting position to dynamically create a weave pattern in response to the insertion of one or more weft filaments by a weft inserter stack.

20 Claims, 29 Drawing Sheets

Related U.S. Application Data continuation-in-part of application No. 16/301,883, filed as application No. PCT/US2017/032703 on May 15, 2017, now Pat. No. 11,473,223, application No. 18/442,240, filed on Feb. 15, 2024 is a continuation-in-part of application No. 16/821,600, filed on Mar. 17, 2020, now abandoned, which is a continuation-in-part of application No. 16/711,668, filed on Dec. 21, 2019, now abandoned.

(60) Provisional application No. 62/336,974, filed on May 16, 2016.

(51) Int. Cl.
  *D03D 41/00* (2006.01)
  *D03D 47/26* (2006.01)

(56) References Cited

U.S. PATENT DOCUMENTS

| | | |
|---|---|---|
| 3,753,843 A | 8/1973 | Hutchison |
| 3,881,522 A | 5/1975 | Lewis |
| 3,960,182 A | 6/1976 | Schwarz |
| 4,080,915 A | 3/1978 | Bompard |
| 4,133,928 A | 1/1979 | Riley |
| 4,195,671 A | 4/1980 | Bossut |
| 4,444,709 A | 4/1984 | Hayashi |
| 4,540,726 A | 9/1985 | Sugama |
| 4,871,491 A | 10/1989 | McMahon |
| 4,997,693 A | 3/1991 | Sonoh |
| 5,066,536 A | 11/1991 | Cogswell |
| 5,302,419 A | 4/1994 | Muzzy |
| 5,305,576 A | 4/1994 | Giles |
| 5,344,687 A | 9/1994 | Grimnes |
| 5,650,220 A | 7/1997 | Greenwood |
| 5,775,381 A | 7/1998 | Addis |
| 5,783,278 A | 7/1998 | Nishimura |
| 5,983,952 A | 11/1999 | Carpenter |
| 6,003,563 A | 12/1999 | Uchida |
| 6,034,155 A | 3/2000 | Espeland |
| 6,184,286 B1 | 2/2001 | Edwards |
| 6,315,007 B1 | 11/2001 | Mohamed |
| 6,733,211 B1 | 5/2004 | Durie |
| 7,066,212 B2 | 6/2006 | Berger et al. |
| 7,892,379 B2 | 2/2011 | Eleazer |
| 8,129,294 B2 | 3/2012 | Khokar |
| 9,725,832 B1 | 8/2017 | Ouellette |
| 2001/0023568 A1 | 9/2001 | Edwards |
| 2001/0039975 A1 | 11/2001 | Braun |
| 2002/0009581 A1 | 1/2002 | Kishi |
| 2003/0044155 A1 | 3/2003 | Maiden |
| 2003/0211797 A1 | 11/2003 | Hill |
| 2005/0085147 A1 | 4/2005 | Homma |
| 2006/0225806 A1 | 10/2006 | Chon |
| 2007/0293976 A1 | 12/2007 | Puget |
| 2008/0092978 A1 | 4/2008 | Beemaert |
| 2008/0286578 A1 | 11/2008 | Tilbrook |
| 2010/0098929 A1 | 4/2010 | Dispenza |
| 2010/0129597 A1 | 5/2010 | Hansen |
| 2010/0269948 A1 | 10/2010 | Legrant |
| 2010/0207629 A1 | 12/2010 | Citterio |
| 2011/0073353 A1 | 3/2011 | Lee |
| 2011/0265905 A1 | 11/2011 | Kuhl |
| 2012/0178325 A1 | 7/2012 | Wakeman et al. |
| 2013/0102217 A1 | 4/2013 | Jeon |
| 2013/0190917 A1* | 7/2013 | Cross ............... D03J 1/06 139/11 |
| 2013/0210299 A1 | 8/2013 | Zhang |
| 2014/0170920 A1 | 6/2014 | Manipatruni |
| 2014/0186600 A1* | 7/2014 | Dyksterhouse ....... B32B 5/024 28/100 |
| 2014/0224374 A1 | 8/2014 | Tseng |
| 2014/0261988 A1 | 9/2014 | Stewart-Irvin |
| 2015/0114511 A1 | 4/2015 | Dambrine |
| 2015/0167208 A1* | 6/2015 | Bischoff ........... D03D 15/47 139/50 |
| 2015/0233028 A1 | 8/2015 | Tomiyori |
| 2015/0330031 A1 | 11/2015 | Van Erp |
| 2016/0097155 A1 | 4/2016 | Fan |
| 2016/0214293 A1 | 7/2016 | Watamabe et al. |
| 2016/0298271 A1 | 10/2016 | Salama et al. |
| 2016/0305051 A1 | 10/2016 | Oberste |
| 2016/0333503 A1 | 11/2016 | Shen |
| 2017/0101730 A1 | 4/2017 | Gilbertson |
| 2017/0198424 A1 | 7/2017 | Alex |
| 2018/0038045 A1 | 2/2018 | Oberste |
| 2018/0216262 A1* | 8/2018 | Rutz ............... D03D 15/267 |
| 2018/0223456 A1 | 8/2018 | Mathon |
| 2019/0062959 A1 | 2/2019 | Lewis |
| 2019/0161891 A1 | 5/2019 | Estreicher |
| 2020/0115847 A1 | 4/2020 | Oberste |
| 2020/0217011 A1 | 7/2020 | Oberste |

FOREIGN PATENT DOCUMENTS

| | | |
|---|---|---|
| CN | 109503067 | 3/2019 |
| DE | 102011118980 | 5/2013 |
| DE | 102012101016 | 8/2013 |
| DE | 102014112468 | 12/2015 |
| JP | S4930860 | 8/1974 |
| JP | S59168153 | 9/1984 |
| JP | 2001-355154 | 12/2001 |
| JP | 2003-136550 | 5/2003 |
| JP | 2006-519322 | 8/2006 |
| JP | 2006-233341 | 9/2006 |
| JP | 2012-251249 | 12/2012 |
| WO | 2006075962 | 7/2006 |
| WO | 2013179037 | 12/2013 |
| WO | WO2014/058513 | 4/2014 |
| WO | 2014158323 | 10/2014 |
| WO | 2016025427 | 2/2016 |

OTHER PUBLICATIONS

International Search Report for PCT/US2020/064157 dated Mar. 9, 2021.

"Office Action from EP Application No. 22 207 963.4 dated Jan. 18, 2024".

"Office Action from JP Application No. 2022-112209 dated Mar. 15, 2023".

"Office Action from Korean application 10-2018-7035541 dated Aug. 17, 2021".

"Office Action from related Japanese application dated Apr. 15, 2021".

"Search Report and Office Action from EP Application No. 22207963 dated Mar. 3, 2023".

"Supplemental Search Report from EP Application No. 17799954 dated Jan. 13, 2020".

* cited by examiner

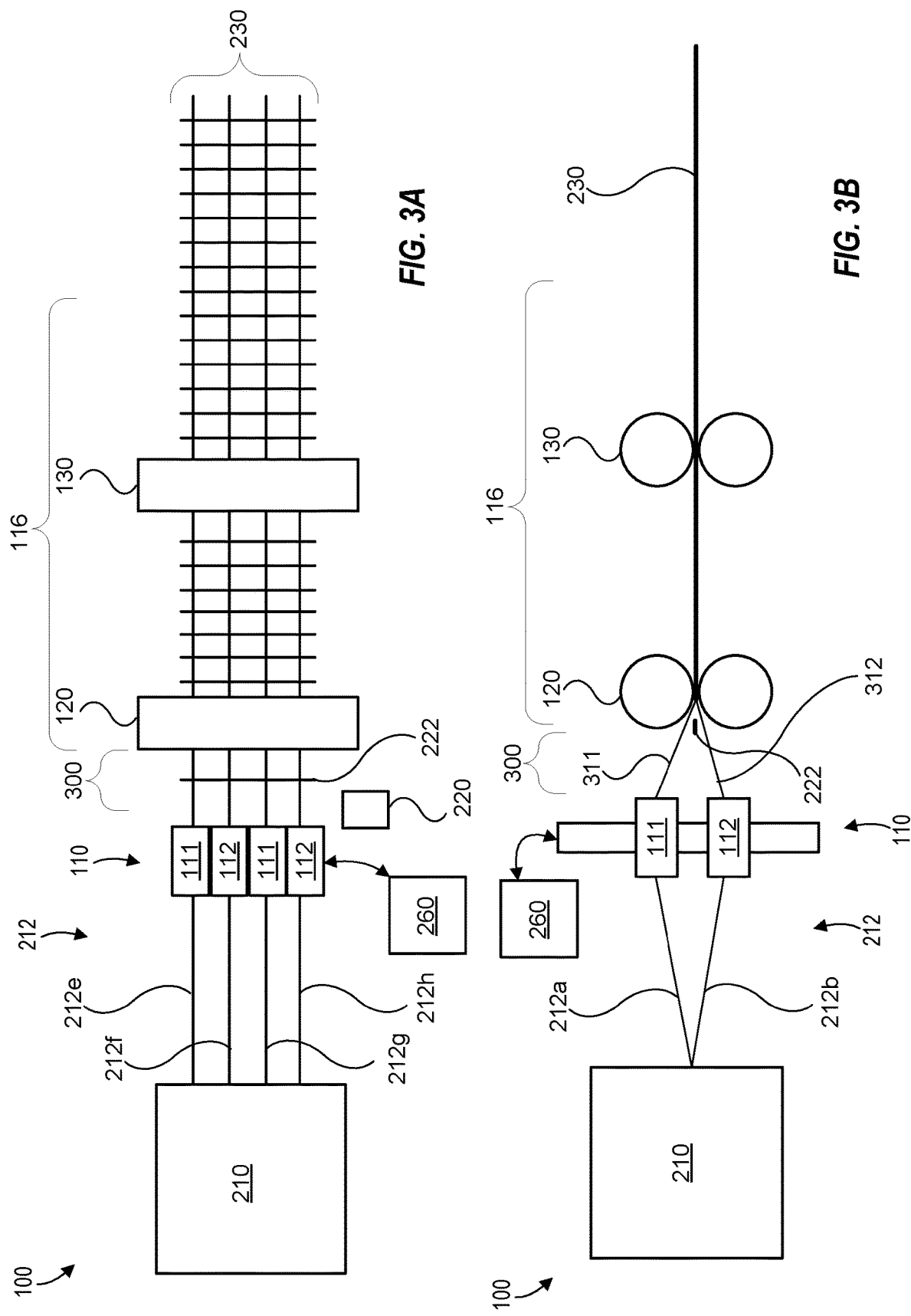

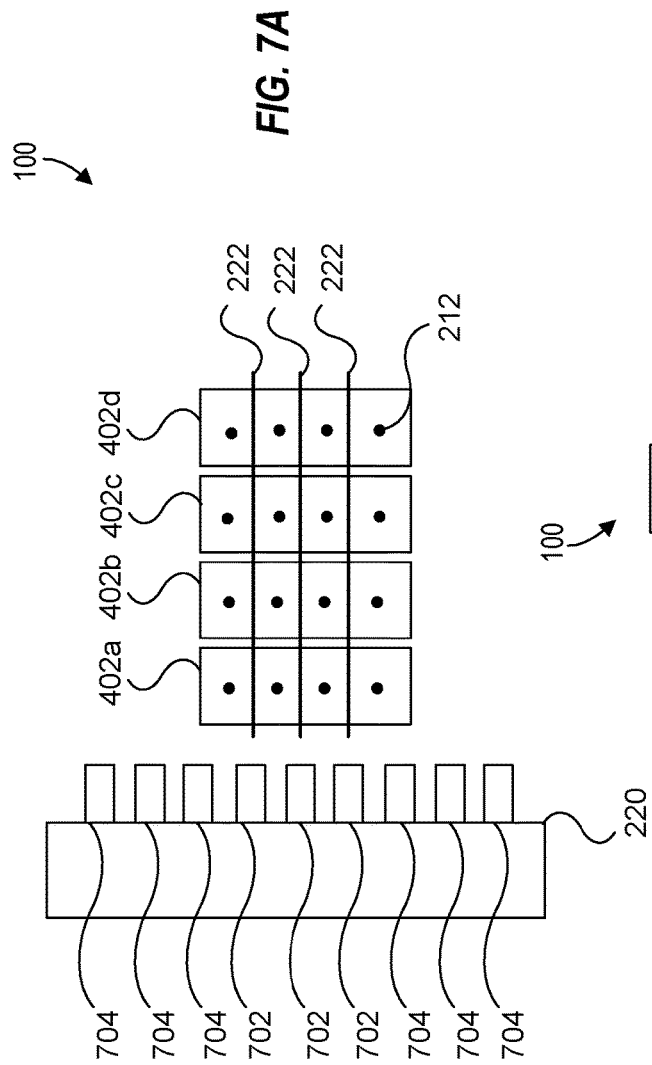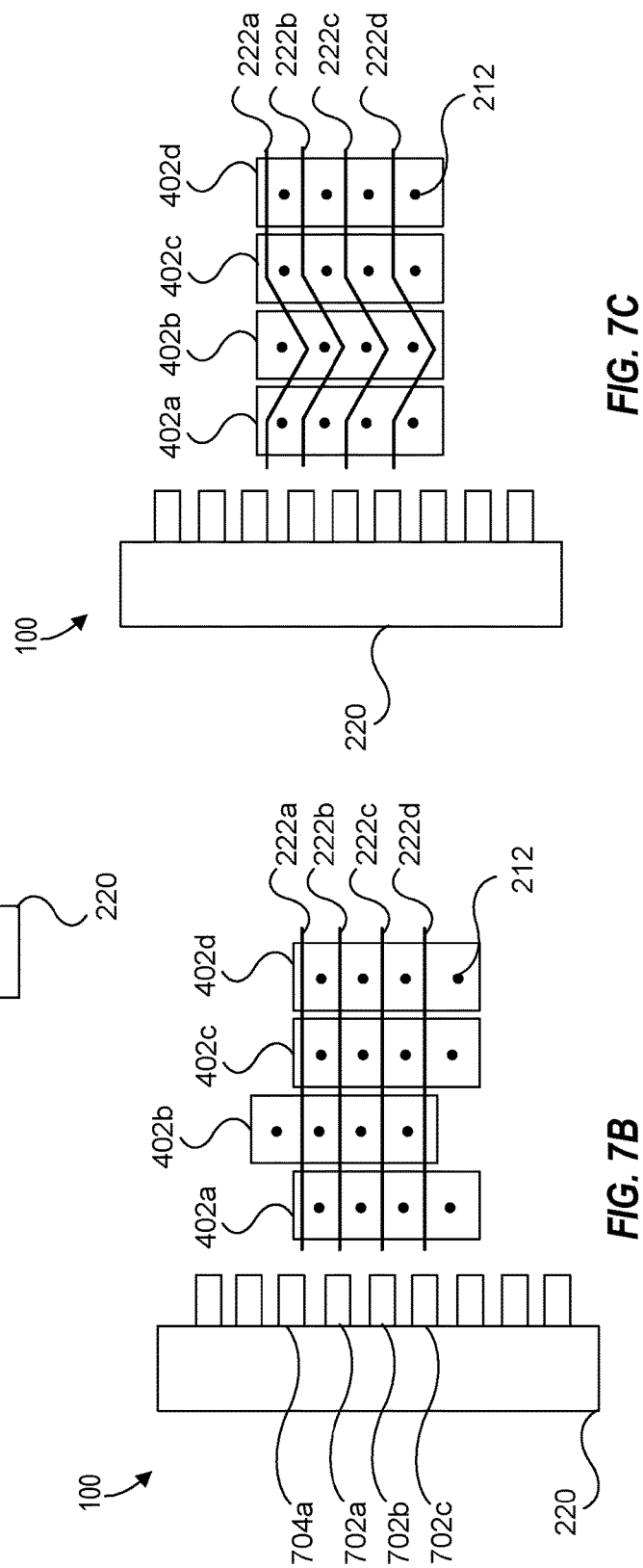

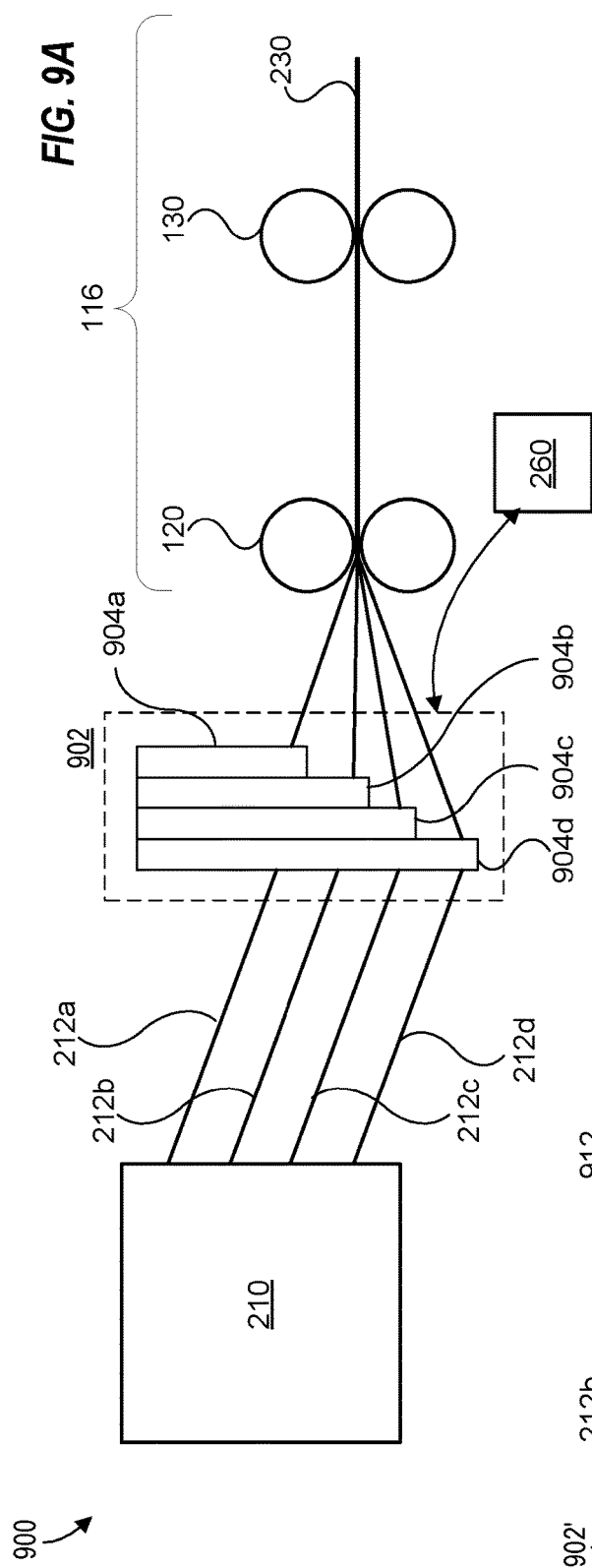
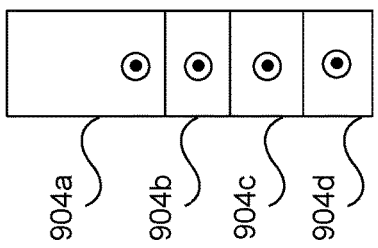
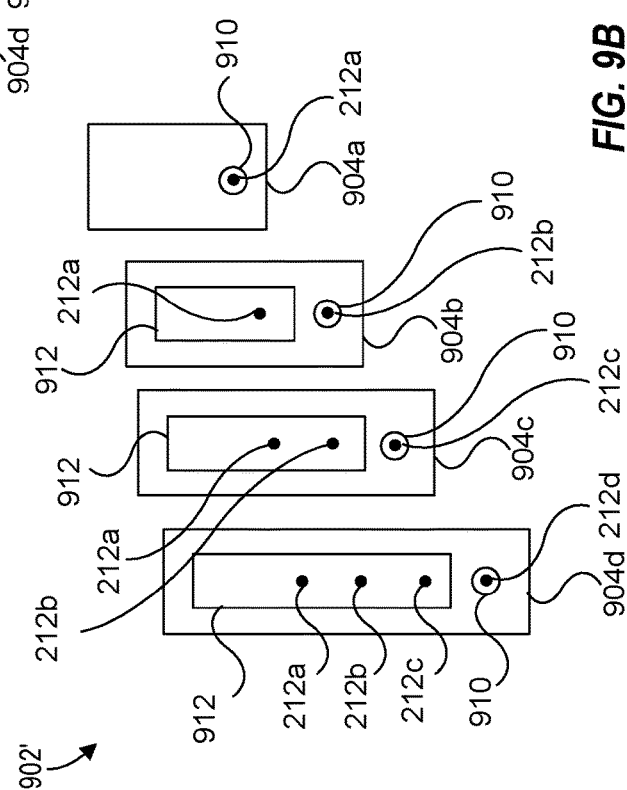
FIG. 9A
FIG. 9B
FIG. 9C

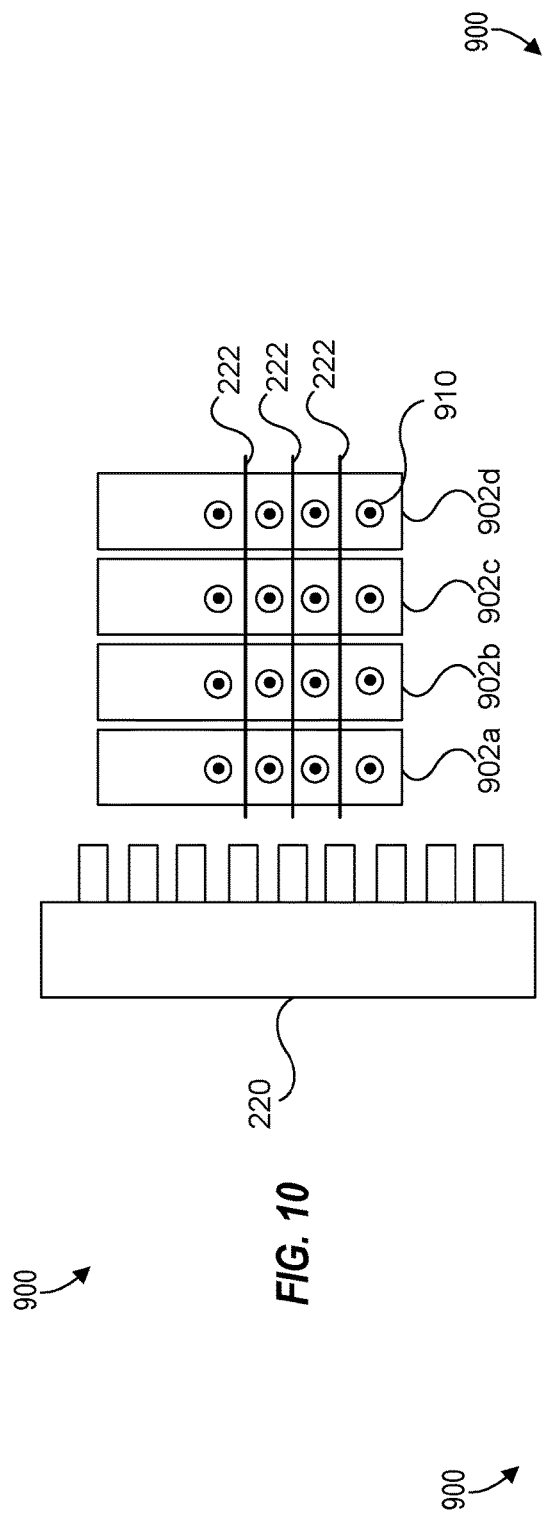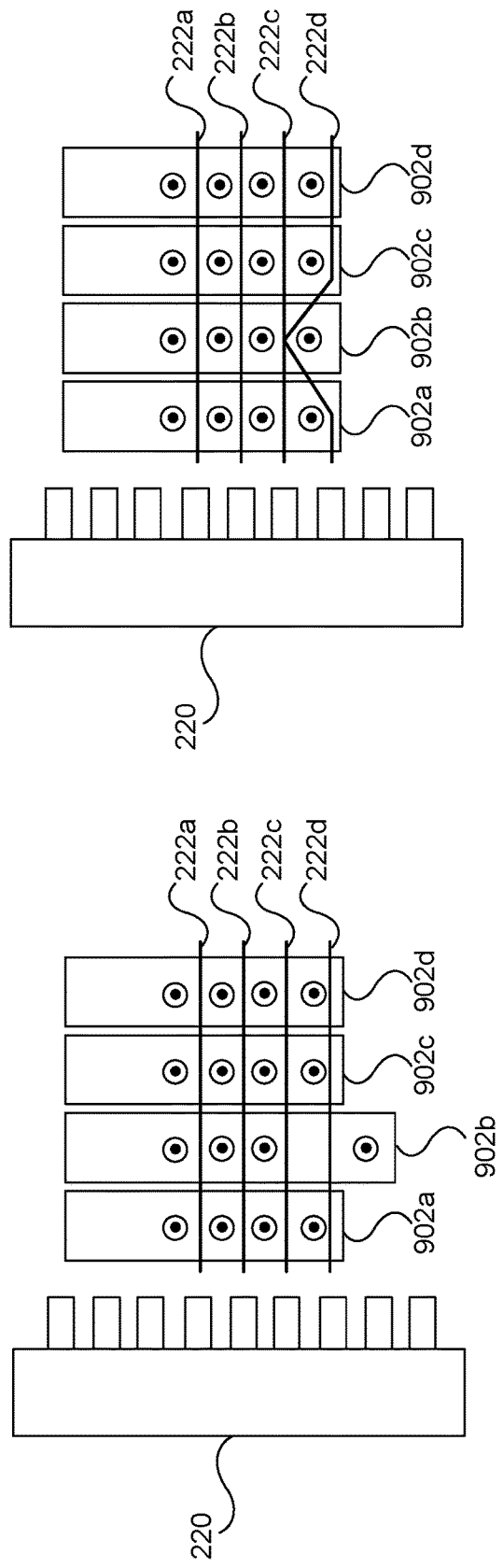

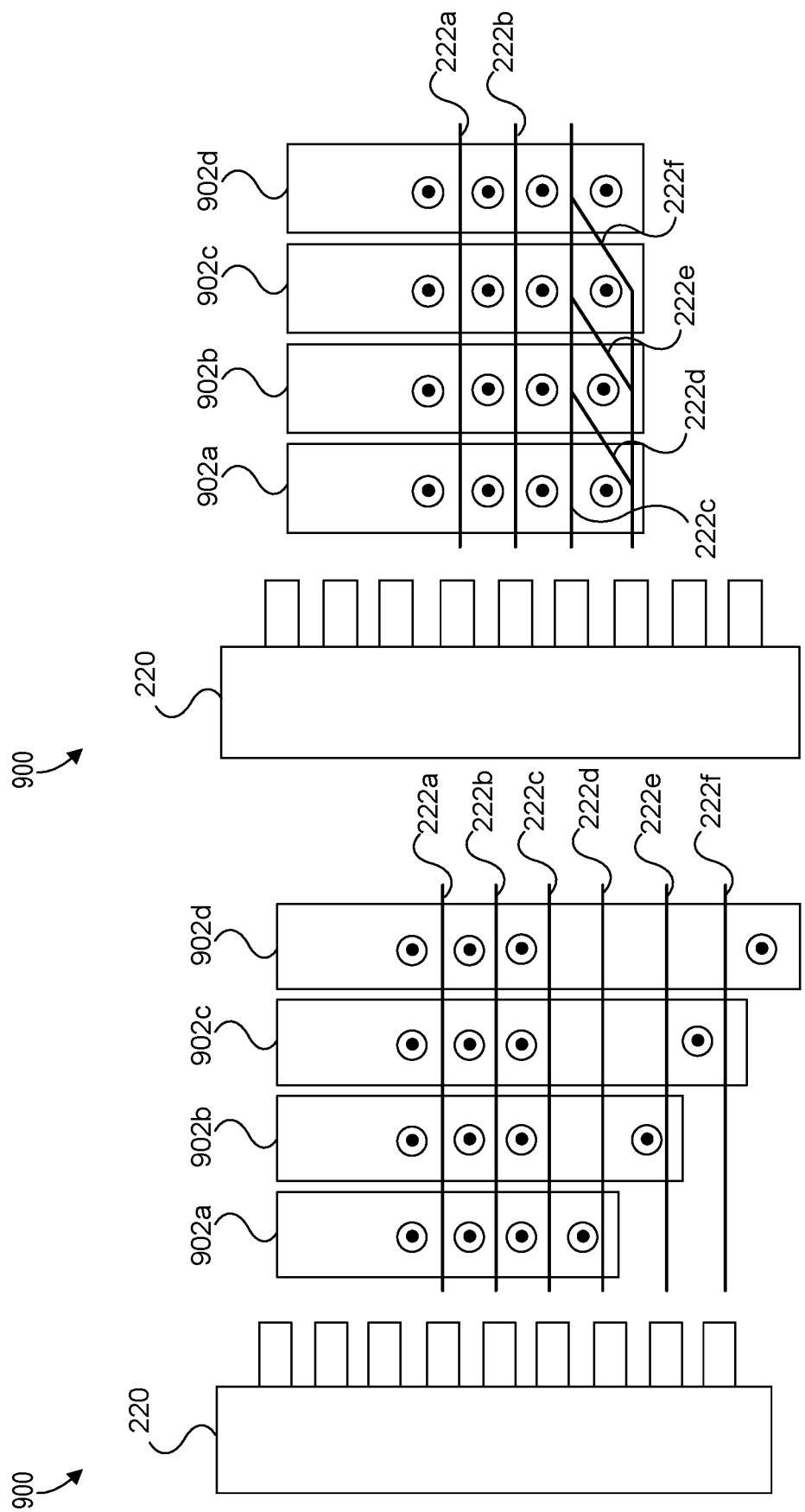

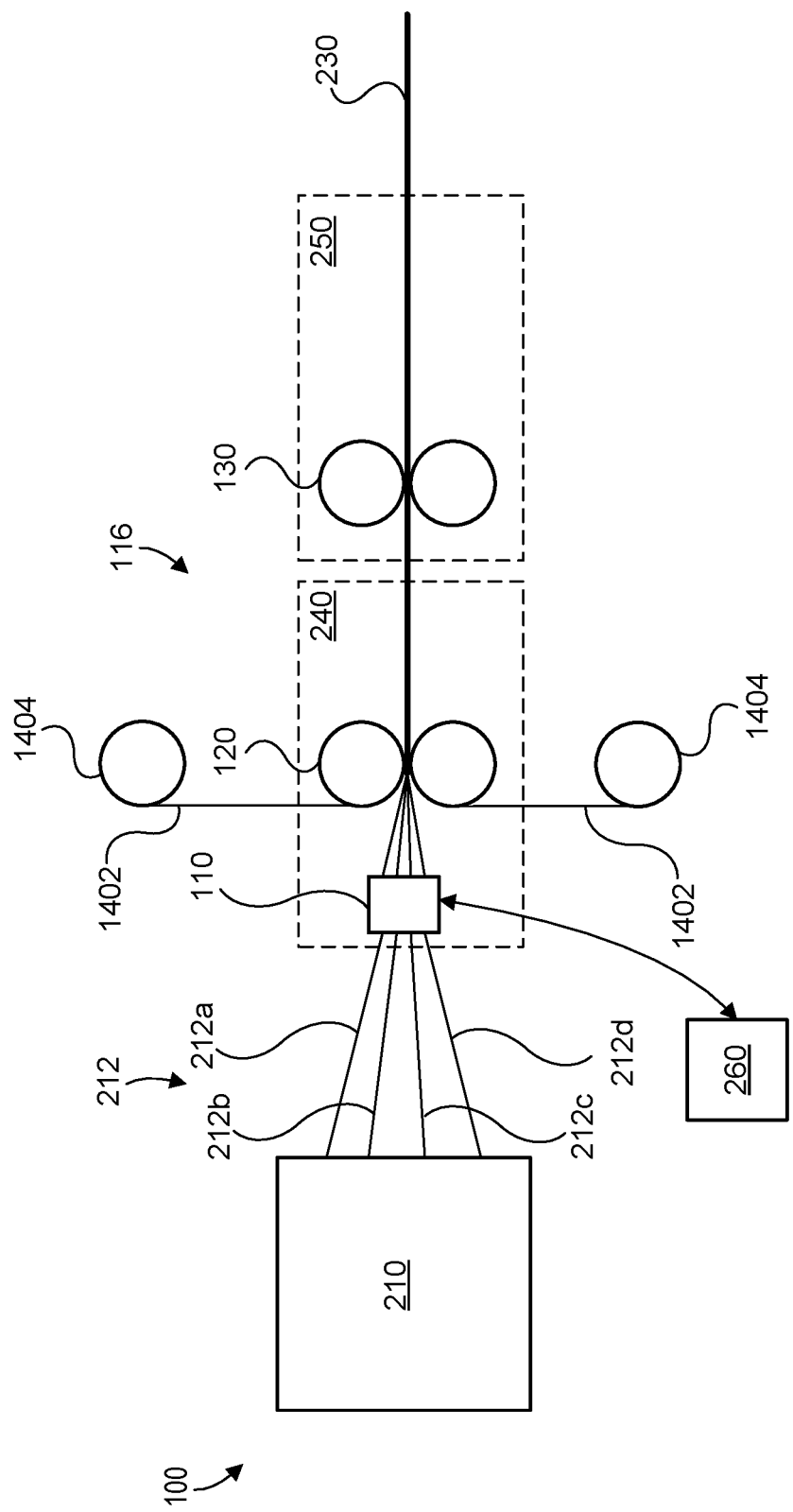

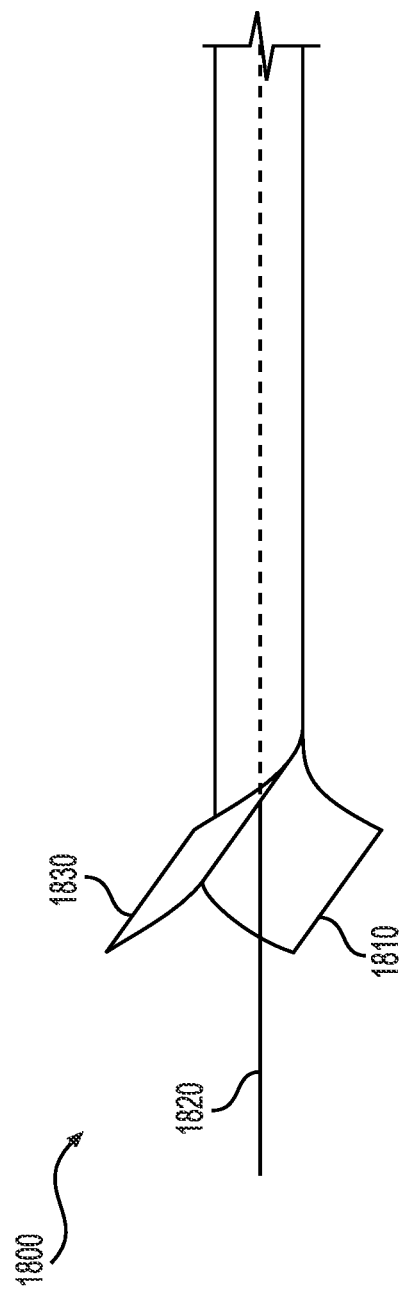

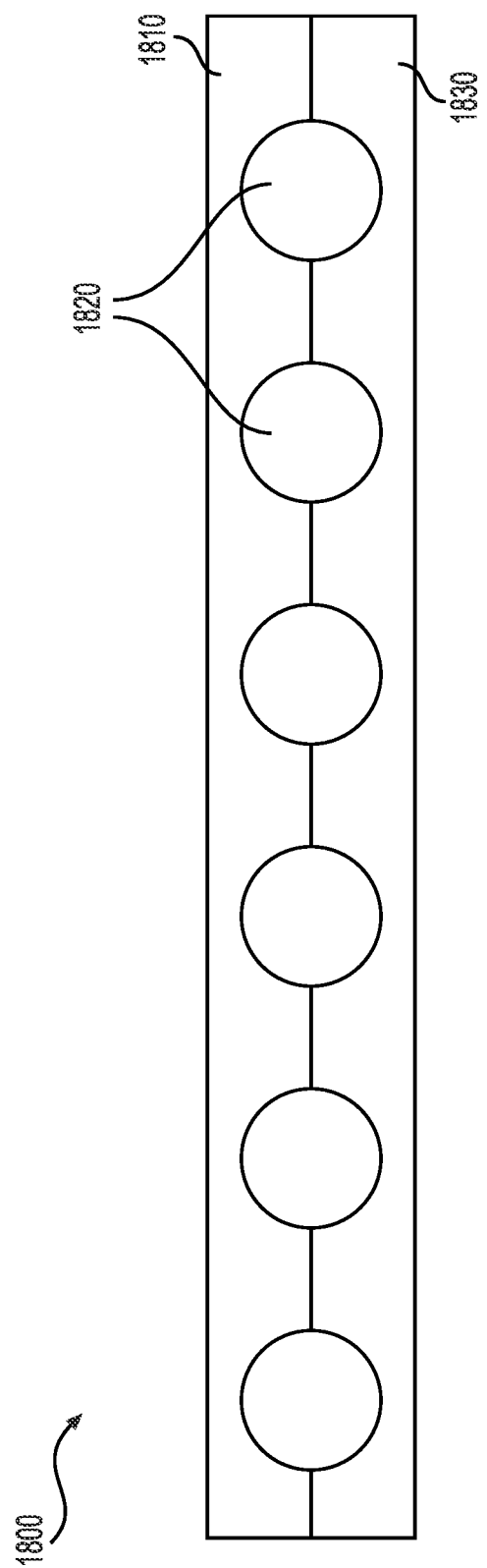

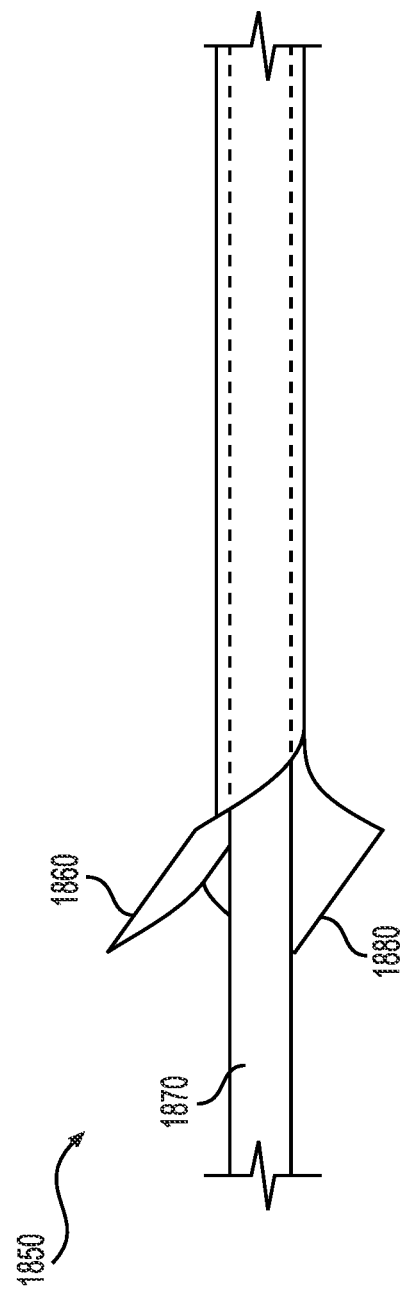

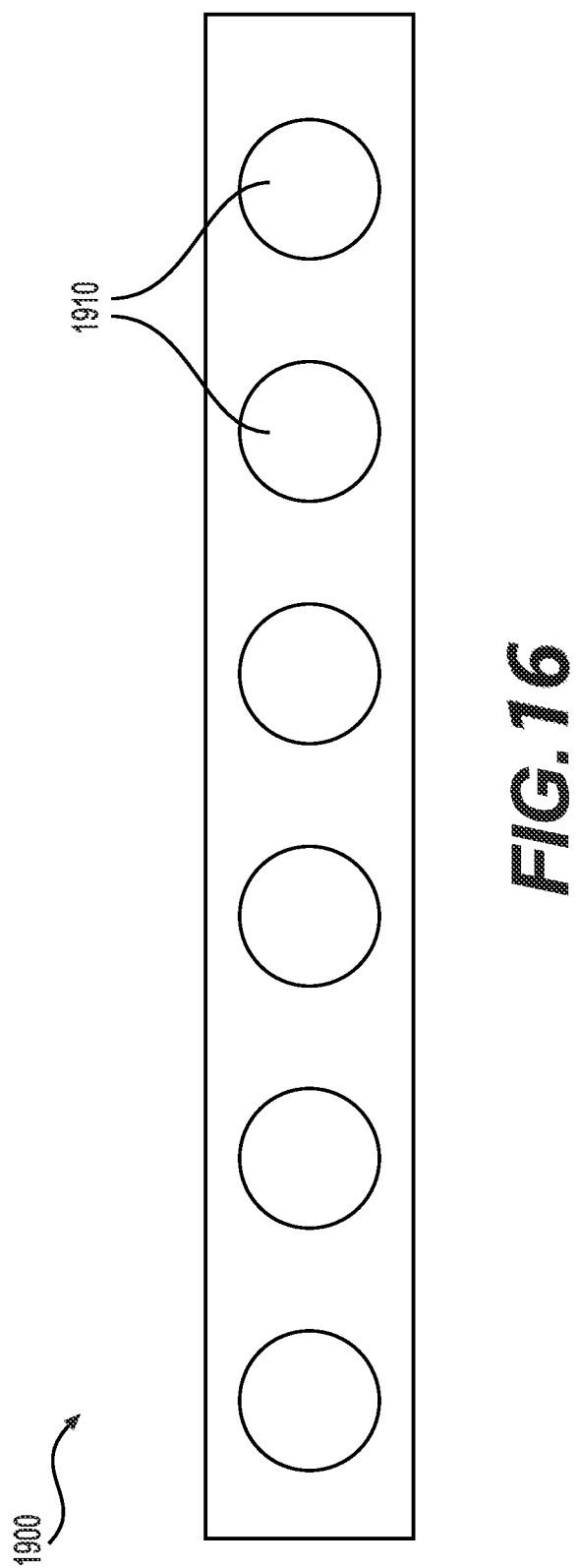

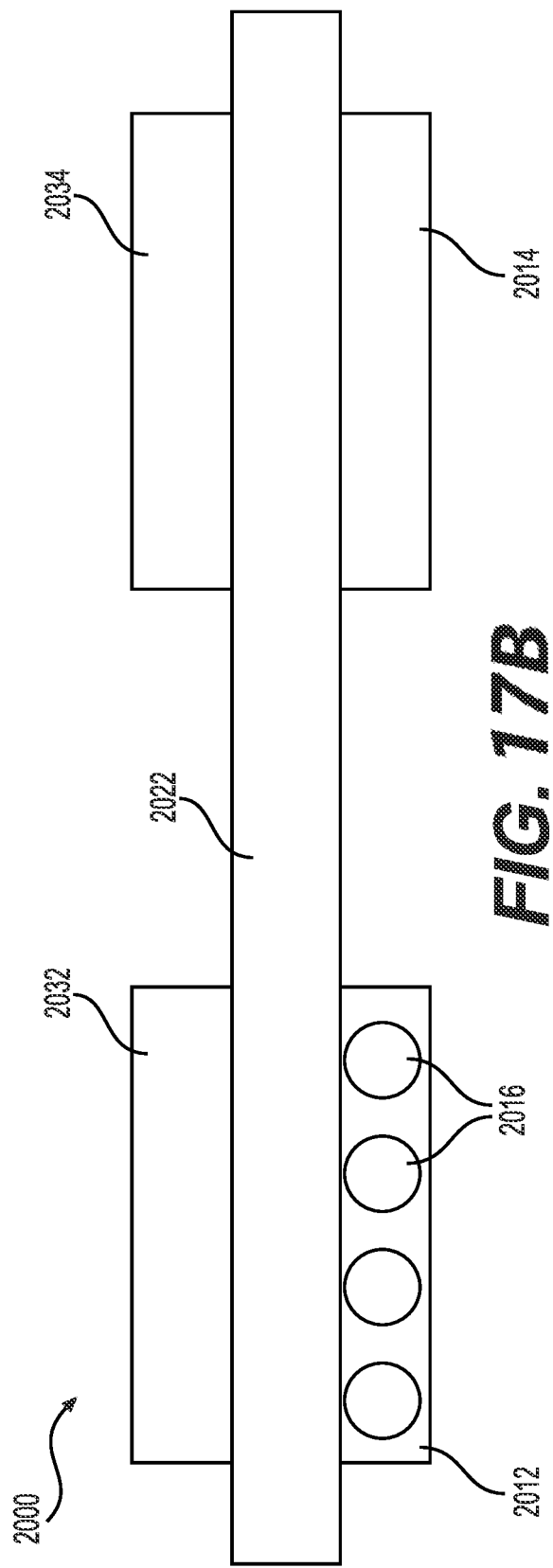

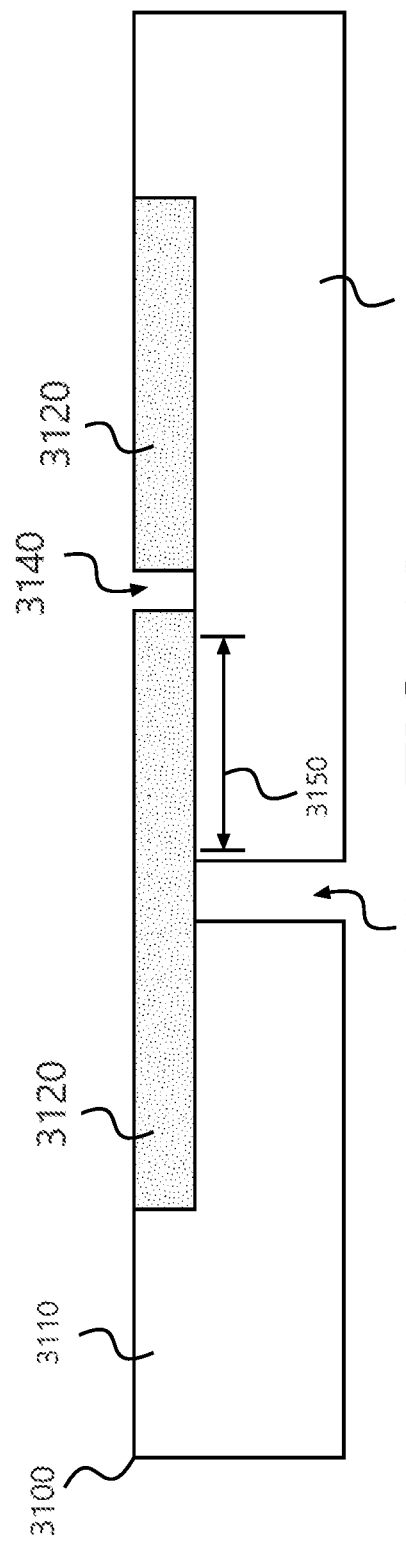
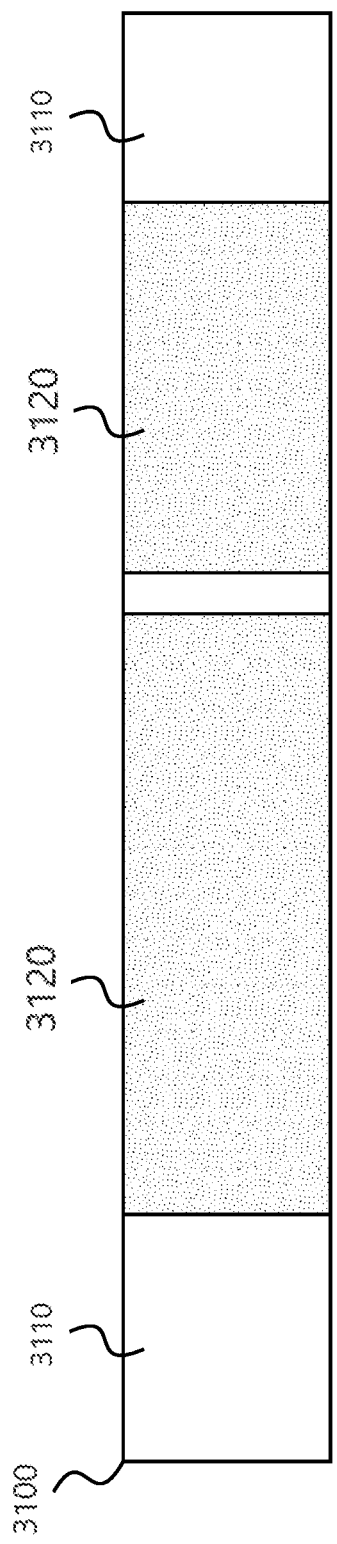

SYSTEMS AND METHODS FOR CONTINUOUS FABRICATION OF WOVEN COMPOSITE MATERIALS

CROSS-REFERENCE TO RELATED APPLICATIONS

This application is a continuation-in-part of U.S. patent application Ser. No. 17/822,645, which is a continuation of U.S. patent application Ser. No. 16/301,883 filed 15 Nov. 2018, which is a U.S. National Stage Application claiming priority to PCT/US2017/032703 filed 15 May 2017, which claims priority to U.S. Provisional Patent Application No. 62/336,974 filed 16 May 2016, each of which is incorporated herein by reference as if set forth herein in their entirety.

This application is also a continuation-in-part of U.S. patent application Ser. No. 16/821,600 filed Mar. 17, 2020, which is a continuation-in-part of Ser. No. 16/711,668 filed Dec. 12, 2019, each of which is incorporated herein by reference as if set forth herein in their entirety.

FIELD OF THE DISCLOSURE

The disclosure relates to the field of woven composite materials. More specifically, the disclosure relates to the continuous manufacturing of woven composites with controllable internal fabric geometry.

BACKGROUND

A composite is a heterogeneous structure that consists of a combination of two or more different materials with significantly different properties. High-performance composites are widely used in the aerospace, automotive, defense, and biomedical industries, where high specific strength and modulus allow for the creation of strong, fuel-efficient vehicles and devices. However, current high-performance composites suffer from several deficiencies inherent to their manufacturing approach.

The two major types of composite materials are laminates and three-dimensional ("3D") preforms. In the case of laminates, yarns are woven into fabrics, the fabrics are often preimpregnated with a matrix resin and then applied to a mold in a layerwise fashion. Layup is commonly done by hand, which makes laminates expensive and increases the likelihood of error. The layerwise nature of laminates also results in out-of-plane (i.e., between layers) properties that are as low as 10% of the in-plane properties, poor delamination resistance, and in-plane properties that are limited by the structure of the base fabric.

3D composite preforms have attempted to solve some of these issues, but they are they are constrained by the relative difficulty in making and working with a preform. These include difficulty attaining proper fiber alignment, limited composite forming techniques, and the risk of introducing crimp to the fabric as the preform is consolidated during the composite forming process. 3D preforms are three-dimensional fabric structures formed by weaving yarns on a complex, computer-controlled loom. This fabric structure is placed into a mold and infused with matrix resin. While this process has improved out-of-plane properties compared to laminates, the resin infusion process can result in the introduction of defects in the form of air bubbles, (e.g., voids) and kinked fibers.

Composites may be formed using additive manufacturing. However additive manufacturing is not able to form laminates or woven preforms and they are inherently weaker than conventionally formed composites. Current additive manufacturing methods use chopped fibers or continuous fibers. However, chopped fibers have reduced strength and toughness and due to the way continuous fibers are laid down there is no mechanical interlacing between fibers, which results in delamination failure or in-layer crack propagation. Further, known methods of forming composites using additive manufacturing are insufficient for quickly generating bulk quantities of composites.

Accordingly, there is a need for systems and methods to continuously form woven composite material with controllable internal geometry. Embodiments of the present disclosure are directed to this and other considerations.

Reinforced Concrete

Historically, concrete has been formed from a mixture that includes Portland cement and aggregate (often a mixture of fine and coarse aggregate). In order to improve the tensile strength and limit crack propagation, concrete is often reinforced with steel rebar or wire cage. Steel is selected for its low cost and workability, specifically that it can be hot formed and welded to achieve complex shapes; however, steel is subject to corrosion, which causes swelling of the steel and induces spalling and fracture in the concrete. The porosity of traditional concrete permits corrosive liquids and gases (such as salt water or hydrogen sulfide) to attack the steel rebar, which has led to numerous developments to mitigate this problem.

Composite rebar is commonly used as an alternative to steel rebar in construction applications with environmental constraints that make steel rebar unsuitable. This may include applications with high risk of corrosion (such as bridges, water treatment facilities, or industrial drainage) or sensitivity to magnetic interference (such as buildings that house magnetic resonance imaging equipment or radio broadcasting equipment). These materials are conventionally produced by pultrusion of fiber reinforced thermosets, though other production methods would be familiar to one having skill in the art. The majority of composite matrix materials are thermosets selected from the categories of unsaturated polyester resins, epoxy resins, vinyl ester resins, or acrylic resins. Fibers reinforcement is usually fiberglass, carbon fiber, or basalt fiber. The selection of fiber and matrix material is based on a combination of performance requirements, environmental requirements, and cost constraints.

Polymer concrete is defined to include both polymer cement concrete, whereby the polymer replaces lime-based cement used in traditional concrete, and polymer modified concrete, whereby the polymer is used in addition to lime-based cement. Polymer concretes are formed from a mixture that includes a polymer and aggregate. The most commonly used polymers are epoxy, latex, unsaturated polyester resin, viny lester, furan, and acrylate. Polymer concrete has several advantages compared to traditional concrete, including superior strength and impact resistance, low permeability, high chemical resistance, good vibration damping, and fast curing. The low permeability and high chemical resistance of polymer concrete make it particularly suitable for use in enclosures to protect sensitive electronic and control equipment and as well as drainage systems for industrial chemicals. Polymer concrete also protects steel rebar and wire cage from corrosion.

Failure of reinforced concrete frequently occurs due to shear slippage or disbond between the concrete and the reinforcement material which decouples the load transfer between the materials. Steel does not exhibit a high degree of adhesion to binders used in traditional concrete or polymer concrete. While coatings can be applied to steel to achieve adhesion, the preferred alternative involves texturing of rebar (deformed rebar) or using a wire cage structure, both methods that increases the load transfer area in contact with the concrete and resists shear slippage. Composite rebar used in traditional concretes often reproduce the texture or cage structure in an effort to replicate this effect; however very little optimization has occurred in the space of polymer concrete.

Polyesters are formed from the reaction of diacid and diol molecules. These can either be classified into unsaturated polyesters (which are thermoset materials) and saturated polyesters (usually thermoplastics) based on whether they retain double bonds after the polymerization process (unsaturated means that double bonds are retained). The presence of non-benzene double bonds allows unsaturated polyesters to be cross-linked into its final thermoset form.

Unsaturated polyester resin ("UPR") may be used in the production of polymer concrete as the primary binding agent. The majority of UPR use a combination of maelic anyhydride and phthalic anhydride (diacids) plus propylene glycol (diol) to form the unsaturated polyester structure. The introduction of a cross-linking reagent (often styrene) and free radical initiator (often provided by methyl ethyl ketone peroxide ("MEKP") or benzoyl peroxide ("BPO")) triggers a reaction which opens the double bonds and allows the formation of cross-linking between adjacent polyester molecules through the styrene molecules. This cross-linking structure gives UPR good chemical resistance, which is why it is used in polymer concrete applications; however, UPR's adhesive properties are lower than epoxy (a more expensive thermoset), which makes selecting suitable reinforcement materials difficult.

Therefore, a need exists to identify a polymer material that would be compatible with UPR and serve as a reinforcement material.

BRIEF SUMMARY OF THE DISCLOSURE

In an exemplary embodiment, the present invention is a method comprising forming a woven composite material of repeating units created by a repeated sequence of warp and weft filament movements comprising receiving one or more polymer impregnated or coated warp filaments, inserting one or more polymer impregnated or coated weft filaments between one or more warp filaments, and consolidating the woven composite material by heat and pressure to form a consolidated woven composite.

The method can be a method of continuously forming the consolidated woven composite from the composite weave material.

The method can further comprise trimming a part portion of the consolidated woven composite, and overmolding the trimmed part portion of the consolidated woven composite to form a finished component.

The method can further comprise feeding one or more layers of substrate material that is melt-compatible with one or more of the warp and/or weft filaments into a roller assembly.

Consolidating the woven composite material can comprise consolidating the woven composite material concurrently with the substrate material through the roller assembly to form a cohesive bond between the substrate material and the consolidated woven composite.

In another exemplary embodiment, the present invention is a method comprising trimming a part portion of a consolidated woven composite, the consolidated woven composite formed from a woven composite material of repeating units created by a repeated sequence of warp and weft filament movements, and overmolding the trimmed part portion of the consolidated woven composite to form a finished component.

Trimming and overmolding can comprise receiving the consolidated composite weave as continuous stock in a compression mold or injection mold to trim and overmold the part portion.

The repeating units can comprise a selectively chosen weave pattern having a specified internal geometry.

The repeating units can comprise at least a set of first repeating units having a first weave pattern and a set of second repeating units having a second weave pattern.

The first weave pattern can be different than the second weave pattern.

The method can further comprise heating the trimmed part portion, and stamping the heated, trimmed part portion into a preform.

The overmolding can comprise overmolding the preform.

The method can further comprise one or more of selecting the selectively chosen weave pattern from among a variety of different weave patterns, controlling with a controller the trimming, controlling with a controller the overmolding, and controlling with a controller the selecting.

The part portion can comprise one or more of the repeating units.

Overmolding the preform can allow for texturizing of the preform and the creation of non-structural protruding features.

The preform can be over-molded multiple times to add different materials to the preform, add materials to different sides or portions of the preform, and/or produce a variety of shapes.

The method can further comprise placing the preform into a mold cavity.

The overmolding can comprise overmolding the preform in the mold cavity.

The shapes can be selected from the group consisting of brackets, panels, vehicle body parts, parts with a flat contour, and parts with curvilinear contour.

The method can further comprise removing the overmolded preform from the mold, and optionally finishing the removed over-molded preform.

The finishing can comprise one or more of trimming edges of the preform, drilling holes in the preform, and sanding down the preform.

In another exemplary embodiment, the present invention is a method comprising feeding one or more layers of substrate material that is melt-compatible with one or more warp and/or weft filaments of a woven composite material created by a repeated sequence of warp and weft filament movements, and consolidating the substrate material concurrently with the woven composite material through the use of heat and pressure in a continuous process by a roller assembly to form a consolidated woven composite having a cohesive bond between the substrate material and the woven composite material.

One or more of the layers of the substrate material can comprise a polymer film.

At least one layer of the substrate material can comprise a polymer film, and at least another layer of the substrate material can comprise a fiber mat that does not contain any polymer.

One or more of the layers of the substrate material can comprise a fiber mat comprising a mixture of reinforcing fibers and polymer fibers, such that the polymer fibers melt during the consolidating and wet the reinforcing fibers to promote melt-adhesion to the woven composite material.

At least one layer of the substrate material can be applied to each side of the woven composite material.

The method can further comprise feeding one or more layers of a second substrate material, wherein at least one layer of the second substrate material can be applied to the opposite side of the woven composite material from the first substrate material, and wherein the concurrent consolidation of the substrate materials with the woven composite material can form a consolidated woven composite having an additional cohesive bond between the second substrate and the woven composite material.

The substrate material can be selected for gloss and/or surface texture for the purpose of obscuring or hiding the appearance of the woven composite material in the woven composite material, The polymer film can be a pure polymer film, a polymer-infused fiber mat, or a combination of a pure polymer film and a polymer-infused fiber mat.

The polymer film layer can be located in between the woven composite material and the fiber mat layer, such that when the polymer film layer is melted during the consolidating, it infuses the fiber mat layer and provides melt-adhesion between the fiber mat layer and the woven composite material.

In another exemplary embodiment, the present invention is a method comprising forming a woven composite material of repeating units created by a repeated sequence of warp and weft filament movements comprising receiving one or more polymer impregnated or coated warp filaments from a warp rack comprising warp heads, and inserting one or more polymer impregnated or coated weft filaments between one or more warp filaments with a weft inserter comprising weft heads, and consolidating the woven composite material by heat and pressure in a consolidation zone to form a consolidated woven composite, wherein each warp head can be capable of independent vertical movement to adjust the height of the warp filament extending from the warp head toward a roller assembly in the consolidation zone, and wherein the method can be a method of continuously forming the consolidated woven composite from the composite weave material.

The method can further comprise trimming the consolidated woven composite exiting the consolidation zone.

The consolidation zone can be configured to maintain the temperature of the consolidated woven composite above the glass transition temperature ($T_g$) of the polymer.

A trimming device for the trimming can be selected from the group consisting of a water jet, a laser, and a shear press.

The method can further comprise overmolding the trimmed consolidated woven composite The method can further comprise heating the trimmed consolidated woven composite.

The method can further comprise heating the trimmed consolidated woven composite above the glass transition temperature ($T_g$) of the polymer.

The method can further comprise receiving the heated consolidated composite weave, and overmolding the received consolidated composite weave, wherein a compression mold or injection mold can be configured for the receiving and the overmolding.

Trimming and overmolding can comprise receiving the consolidated composite weave as continuous stock in a compression mold or injection mold.

Heating can comprise heating the trimmed consolidated woven composite above its melting temperature ($T_m$).

The compression mold or injection mold can be further configured to overmold the consolidated composite weave with a thermoplastic material.

The method can further comprise pressing the heated, trimmed consolidated woven composite into a preform.

In another exemplary embodiment, a method of continuously forming a woven composite material using a machine having polymer impregnated or coated warp filaments suspended between a roller assembly and a warp rack that comprises warp heads is disclosed, wherein each warp head can comprise filament channels positioned at different vertical locations along the height of the warp head, each filament channel configured to engage a warp filament, and each warp head being capable of independent vertical movement to adjust the height of warp filaments associated with the respective warp head relative to the roller assembly, can comprise vertically positioning a first sub-group of the warp heads in a first vertical position and a second sub-group of the warp heads in a second vertical position such that the vertical height of each warp filament in a filament channel of a warp head of the first sub-group of the warp heads is higher than a warp filament in a corresponding filament channel of a warp head of the second sub-group of the warp heads, inserting one or more polymer impregnated or coated weft filaments into a warp between the roller assembly and the warp rack, such that each weft filament is inserted between a warp filament associated with the first sub-group of the warp heads and a warp filament associated with the second sub-group of the warp heads, securing the one or more weft filaments between two or more warp filaments to form a composite weave by vertically repositioning the first sub-group of the warp heads in a third vertical position and the second sub-group of the warp heads in a fourth vertical position such that the vertical height of each warp filament in a filament channel of a warp head of the first sub-group of the warp heads is lower than a warp filament in the corresponding filament channel of a warp head of the second sub-group of the warp heads, and consolidating the composite weave.

The method can further comprise creating the warp between the roller assembly and the warp rack by feeding a free end of each of the warp filaments originating from filament spools through a unique filament channel of one of the warp heads of the warp rack and feeding the free end of each of the warp filaments through the pair of opposing rollers.

Consolidating the composite weave can comprise activating the roller assembly to draw the composite weave through a pair of opposing rollers that are configured to heat and compress the composite weave.

Consolidating the composite weave can comprise heating the composite weave in a heated zone configured to meld together one or more warp filaments and one or more weft filaments of the composite weave and compressing the composite weave.

The heating and the compressing can comprise an ultrasonic welding bar that, for heating, vibrates the composite weave to generate heat by elastic losses and, for compressing, compresses the composite weave against an anvil.

The heating zone can comprise a heating device selected from the group consisting of an inductive heater, a convection device, and a microwave heating device, wherein the inductive heater can induce current in the composite weave by generating an alternative or rotating magnetic field to generate heat through resistive losses, and wherein the convection device can circulate hot air around the composite weave.

Compressing the composite weave can comprise compressing the composite weave by drawing the composite weave through a first pair of opposing rollers of the roller assembly.

The method can further comprise tensioning the composite weave as it cools by drawing the composite weave through a second pair of opposing rollers after compressing the composite weave through the first pair of opposing rollers.

In another exemplary embodiment, a method comprises trimming a woven composite material, the woven composite material formed from a composite weave by a continuous composite weaving machine into the woven composite material having several different weave patterns and/or several different varieties of weave patterns, and overmolding the trimmed portion of the woven composite material to form a finished component.

After exiting a roller assembly of the continuous composite weaving machine, the trimming can be by a water jet, a laser, a shear press, or other suitable device performing the method of trimming.

Trimming and overmolding can comprise receiving a continuous stock of the consolidated composite weave in a compression mold or injection mold to trim and overmold the woven composite material.

The number of different weave patterns and/or the number of different varieties of weave patterns of the woven composite material can each be customized to have a specific internal geometry.

The method can further comprise heating the trimmed portion, and stamping the heated, trimmed portion into a preform, wherein overmolding can comprise overmolding the preform.

The method can further comprise one or more of controlling with a controller the trimming, controlling with a controller the overmolding, and dynamically controlling with a controller the number of different weave patterns and/or several different varieties of the weave patterns.

The trimmed portion can comprise one of the weave patterns from among the different weave patterns and/or the number of different varieties of the weave patterns.

Overmolding the preform can allow for texturizing of the preform and the creation of non-structural protruding features.

The preform can be over-molded multiple times to add different materials to the preform, add materials to different sides or portions of the preform, and/or produce a variety of shapes like brackets and panels such as vehicle body panels with flat or curvilinear contour.

The continuous composite weaving machine can further include a robot arm that is configured to pick up the preform from a stamping press and place it into a mold cavity, and overmolding can comprise overmolding the preform in the mold cavity.

Following the overmolding process, the preform can be removed from the mold cavity and trimmed and finished.

The method can further comprise removing the overmolded preform from the mold cavity, wherein the continuous composite weaving machine can include a robot arm that is configured to pick up the preform from the mold cavity, and optionally finishing the removed over-molded preform, and wherein the finishing can comprise one or more of trimming edges of the preform, drilling holes in the preform, and sanding down the preform.

In another exemplary embodiment, a method comprises trimming a woven composite material, the woven composite material formed from a composite weave by a continuous composite weaving machine into the woven composite material having several different weave patterns and/or several different varieties of weave patterns, and heating and pressing the trimmed portion of the woven composite material into a preform, placing the preform in a mold cavity, and overmolding the preform.

The woven composite material can be trimmed using a water jet, a laser, or a shear press, the preform can be over-molded multiple times to add different materials to the preform, add materials to different sides or portions of the preform, and/or produce a variety of shapes like brackets and panels such as vehicle body panels with flat or curvilinear contour.

Following the multiple overmolding process, the preform can be removed from the mold cavity and finished, and the process of trimming, heating, pressing, and overmolding, can be performed continuously using die stamping.

The continuous composite weaving machine can include one or more spools for dispensing one or more warp filaments, a warp rack comprising warp heads for receiving one or more warp filaments from the one or more spools, wherein, seen in front and rear views of the warp rack, the warp heads are aligned adjacent to one another in a vertical plane, each warp head, comprising filament channels positioned at different vertical locations along the height of the warp head, each filament channel configured to engage a warp filament suspended between a spool of the one or more spools and a roller assembly, and being capable of independent vertical movement to adjust the height of warp filaments extending from the warp head toward the roller assembly, and a weft inserter stack comprising weft inserters for inserting one or more weft filaments between one or more warp filaments to form the composite weave, wherein the roller assembly is configured to receive the composite weave and consolidate the composite weave by heat and pressure to form the woven composite material, wherein a trimming device is configured to trim the woven composite material after it exits the roller assembly of the continuous composite weaving machine, and wherein the woven composite material is trimmed using the trimming device.

A method for continuously fabricating a woven composite with controllable internal fabric geometry is also disclosed. The method uses a machine having warp filaments suspended between a roller assembly and a warp rack that comprises warp heads, wherein each warp head comprises filament channels positioned at different vertical locations along the height of the warp head, each filament channel configured to engage a warp filament, and each warp head being capable of independent vertical movement to adjust the height of warp filaments associated with the respective warp head relative to the roller assembly. The method includes vertically positioning a first sub-group of the warp heads in a first vertical position and a second sub-group of the warp heads in a second vertical position such that the vertical height of each warp filament in a filament channel of a warp head of the first sub-group of the warp heads is higher than a warp filament in a corresponding filament channel of a warp head of the second sub-group of the warp heads.

The method further includes inserting one or more weft filaments into a warp between the roller assembly and the warp rack, such that each weft filament is inserted between a warp filament associated with the first sub-group of the warp heads and a warp filament associated with the second sub-group of the warp heads.

The method further includes securing the one or more weft filaments between two or more warp filaments to form a composite weave by vertically repositioning the first sub-group of the warp heads in a third vertical position and the second sub-group of the warp heads in a fourth vertical position such that the vertical height of each warp filament in a filament channel of a warp head of the first sub-group of the warp heads is lower than a warp filament in the corresponding filament channel of a warp head of the second sub-group of the warp heads.

The method further includes consolidating the composite weave by activating the roller assembly to draw the composite weave through a pair of opposing rollers that are configured to heat and compress the composite weave.

The method can further include creating the warp between the roller assembly and the warp rack by feeding a free end of each of the warp filaments originating from filament spools through a unique filament channel of one of the warp heads of the warp rack and feeding the free end of each of the warp filaments through the pair of opposing rollers.

In another exemplary embodiment, a machine for continuously forming a finished woven composite from a composite weave material comprises a warp rack comprising warp heads for receiving one or more polymer impregnated or coated warp filaments, wherein each warp head can be capable of independent vertical movement to adjust the height of a warp filament extending from the warp head toward a roller assembly.

The machine can further comprise one or more spools for dispensing the one or more polymer impregnated or coated warp filaments, a weft inserter stack comprising weft inserters for inserting one or more polymer impregnated or coated weft filaments between one or more warp filaments to form the composite weave material, and a roller assembly configured to receive the composite weave material, wherein each warp head can comprise filament channels, one each positioned at different vertical locations along the height of the warp head, wherein each filament channel can be configured to engage the warp filament suspended between one of the spools and the roller assembly, and wherein the warp heads can be aligned adjacent to one another in a vertical plane.

The machine can further comprise a heated zone for heating one or more warp filaments and one or more weft filaments to meld them together and form the finished woven composite, wherein a temperature sensor within the heated zone can be configured to monitor the temperature of the filaments.

In another exemplary embodiment, a machine for continuously forming a finished woven composite from a composite weave material comprises a warp rack comprising warp heads for receiving one or more polymer impregnated or coated warp filaments, a weft inserter stack comprising weft inserters for inserting one or more polymer impregnated or coated weft filaments between one or more warp filaments to form the composite weave material, and a consolidation zone for heating and compressing the composite weave material to form the finished woven composite, wherein each warp head can be capable of independent vertical movement to adjust the height of a warp filament extending from the warp head toward a roller assembly.

The machine can further comprises one or more spools for dispensing the one or more polymer impregnated or coated warp filaments, and a roller assembly in the consolidation zone configured to receive the composite weave material, wherein each warp head can comprise filament channels, one each positioned at different vertical locations along the height of the warp head, wherein each filament channel can be configured to engage the warp filament suspended between one of the spools and the roller assembly, and wherein the warp heads can be aligned adjacent to one another in a vertical plane.

Each of the warp filaments and weft filaments can comprise a polymer impregnated or coated filament.

In another exemplary embodiment, a machine for continuously forming a finished woven composite from a composite weave material can comprise spools for dispensing polymer impregnated or coated warp filaments, a warp rack comprising warp heads for receiving warp filaments from the spools, each warp head comprising filament channels positioned at different vertical locations along the height of the warp head, each filament channel configured to engage a warp filament suspended between one of the spools and a roller assembly, and being capable of vertical movement independent of vertical movement of the other of the warp heads to adjust the height of warp filaments extending from the warp head toward the roller assembly, a weft inserter stack comprising weft inserters for inserting polymer impregnated or coated weft filaments between warp filaments to form the composite weave material, and a consolidation zone with the roller assembly configured to receive the composite weave material and consolidate the composite weave material by heat and pressure to form the finished woven composite.

The roller assembly can comprise a pair of heated rollers for heating the warp filaments and the weft filaments of the composite weave material to meld them together. The roller assembly can further comprise a pair of cooled rollers downstream of the pair of heated rollers for cooling the composite weave.

The warp heads can be aligned adjacent to one another in a vertical plane.

The finished woven composite can be a multilayer composite panel continuously formed from the spooled filaments through to the finished woven composite by the machine itself.

The weft inserters of the weft inserter stack can be configured to insert one or more of the weft filaments between one or more of the warp filaments such that each inserted weft filament is oriented approximately perpendicularly to the one or more warp filaments.

The composite weave material can be an interlacing weave material formed of at least two layers interlaced with at least one weft filament, wherein the weft inserter stack can be configured to simultaneously insert a first weft filament of the weft filaments at a first height between a first layer of a pair of warp filaments of the warp filaments and a second weft filament of the weft filaments at a second height different than the first height between a second layer of a pair of warp filaments of the warp filaments.

One or more weft inserters can be selected from the group consisting of a rapier weft inserter, an air-jet weft inserter, and an inertial weft inserter.

In another exemplary embodiment, a machine for continuously forming a finished woven composite from a composite weave material comprises spools for dispensing polymer impregnated or coated warp filaments, a warp rack comprising warp heads for receiving warp filaments from the spools, each warp head comprising filament channels positioned at different vertical locations along the height of the warp head, each filament channel configured to engage a warp filament suspended between one of the spools and the roller assembly, and being capable of vertical movement independent of vertical movement of the other of the warp heads to adjust the height of warp filaments extending from the warp head toward the roller assembly, a weft inserter stack comprising weft inserters for inserting polymer impregnated or coated weft filaments between warp filaments to form the composite weave material, and a roller assembly configured to receive the composite weave material and consolidate the composite weave material to form the finished woven composite.

The roller assembly can comprise a pair of heated rollers for heating the composite weave.

The roller assembly can comprise a pair of cooled rollers for cooling the composite weave.

The warp heads can be aligned adjacent to one another in a vertical plane.

The finished woven composite can be a multilayer composite panel continuously formed by the machine itself, without additional processing steps.

The machine can further comprise a controller configured to control a sequence of vertical movements of one or more warp heads and insertions of one or more of the weft filaments between one or more of the warp filaments to create a composite weave having a predetermined pattern.

The weft inserters of the weft inserter stack can be configured to insert one or more of the weft filaments between one or more of the warp filaments such that each inserted weft filament is oriented approximately perpendicularly to the one or more warp filaments.

The weft inserter stack can be configured to simultaneously insert a first weft filament of the weft filaments between a first pair of warp filaments of the warp filaments and a second weft filament of the weft filaments between a second pair of warp filaments of the warp filaments.

One or more weft inserters can be selected from the group consisting of a rapier weft inserter, an air-jet weft inserter, and an inertial weft inserter.

In another exemplary embodiment, a machine for continuously forming a composite weave comprises one or more spools for dispensing one or more warp filaments, a roller assembly configured to receive the composite weave comprising one or more of the warp filaments and one or more weft filaments, a warp rack comprising heddle assemblies for receiving one or more of the warp filaments from the one or more spools, each heddle assembly comprising a first heddle comprising a first eye for engaging a first warp filament suspended between a spool of the one or more spools and the roller assembly, the first heddle capable of independent vertical movement to adjust the height of the first eye, and a second heddle having a slot for receiving the first warp filament and a second eye for engaging a second warp filament suspended between a spool of the one or more spools and the roller assembly, the second heddle capable of independent vertical movement to adjust the height of the second eye, and a weft inserter stack comprising weft inserters for inserting one or more of the weft filaments between one or more of the warp filaments.

The consolidated composite weave can be continuously formed from polymer impregnated or coated warp filaments of the composite weave material by compressing and heating of the composite weave material.

The heddle assemblies can be aligned adjacent to one another in a first vertical plane.

The first heddle of each heddle assembly can be positioned adjacent to the second heddle of the respective heddle assembly in a second vertical plane that is approximately perpendicular to the first vertical plane.

The first eye of the first heddle of a heddle assembly can align with the slot of the second heddle of the heddle assembly when the heddle assembly is in a neutral position.

Each heddle assembly can further comprise a third heddle having a slot for receiving the first warp filament and the second warp filament, and a third eye for engaging a third warp filament suspended between a spool of the one or more spools and the roller assembly, the third heddle being capable of independent vertical movement to adjust the height of the third eye.

The machine can further comprise a controller configured to control a sequence of vertical movements of one or more of the first, second, and/or third heddles and insertions of one or more of the weft filaments between one or more of the warp filaments to create a composite weave having a predetermined pattern.

A machine for continuously fabricating a woven composite with controllable internal fabric geometry is disclosed. In an exemplary embodiment, a machine for continuously forming a woven composite material includes one or more spools for dispensing one or more warp filaments. The machine further includes a roller assembly configured to receive a composite weave comprising one or more warp filaments and one or more weft filaments. The machine further includes a warp rack comprising warp heads for receiving one or more warp filaments from the one or more spools, where each warp head includes filament channels positioned at different vertical locations along the height of the warp head and each filament channel is configured to engage a warp filament suspended between a spool of the one or more spools and the roller assembly. Each warp head is capable of independent vertical movement to adjust the height of warp filaments extending from the warp head toward the roller assembly. The machine further includes a weft inserter stack comprising weft inserters for inserting one or more weft filaments between one or more warp filaments to form the composite weave.

One or more of the warp heads of the machine can include a heating element for heating one or more warp filaments.

One or more of the warp heads of the machine can include a temperature sensor.

The roller assembly of the machine can be configured to consolidate the composite weave.

The roller assembly of the machine can include a pair of heated rollers for heating the composite weave.

The roller assembly of the machine can include a pair of cooled rollers for cooling the composite weave.

The warp heads of the machine can be aligned adjacent to one another in a vertical plane.

One or more of the warp heads of the machine can be configured to move vertically to adjust the height of warp filaments associated with the respective one or more warp heads after one or more weft filaments have been inserted between one or more warp filaments.

The machine can further include a controller that is configured to control a sequence of vertical movements of one or more warp heads and insertions of one or more weft filaments between one or more warp filaments to create a composite weave having a predetermined pattern.

One or more of the weft inserters of the weft inserter stack of the machine can be configured to insert one or more weft filaments between one or more warp filaments such that each inserted weft filament is oriented approximately perpendicularly to the one or more warp filaments.

The weft inserter stack of the machine can be configured to simultaneously insert a first weft filament between a first pair of warp filaments and a second weft filament between a second pair of warp filaments.

One or more weft inserters of the machine can be a rapier weft inserter, an air-jet weft inserter, and/or an inertial weft inserter.

In another exemplary embodiment, a machine for continuously forming a woven composite material includes one or more spools for dispensing one or more warp filaments. The machine further includes a roller assembly configured to receive a composite weave comprising one or more warp filaments and one or more weft filaments. The machine further includes a warp rack comprising heddle assemblies for receiving one or more warp filaments from the one or more spools, where each heddle assembly includes a first heddle comprising a first eye for engaging a first warp filament suspended between a spool of the one or more spools and the roller assembly and a second heddle having a slot for receiving the first warp filament and a second eye for engaging a second warp filament suspended between a spool of the one or more spools and the roller assembly. The first heddle and second heddle are capable of independent vertical movement to adjust the height of the first eye and second eye, respectively. The machine further includes a weft inserter stack comprising weft inserters for inserting one or more weft filaments between one or more warp filaments to form the composite weave.

The heddle assemblies of the machine can be aligned adjacent to one another in a first vertical plane.

The first heddle of each heddle assembly can be positioned adjacent to the second heddle of the respective heddle assembly in a second vertical plane that is approximately perpendicular to the first vertical plane.

The first eye of the first heddle of a heddle assembly of the heddle assemblies can align with the slot of the second heddle of the heddle assembly when the heddle assembly is in a neutral position.

Each heddle assembly of the heddle assemblies can further include a third heddle having a slot for receiving the first warp filament and the second warp filament, and a third eye for engaging a third warp filament suspended between a spool of the one or more spools and the roller assembly, where the third heddle is capable of independent vertical movement to adjust the height of the third eye.

The machine can further include a controller configured to control a sequence of vertical movements of one or more of the first, second, and/or third heddles of one or more of the heddle assemblies and insertions of one or more weft filaments between one or more warp filaments to create a composite weave having a predetermined pattern.

Transmission Material

A tape structure is also disclosed which includes transmission material. The transmission material can be made of any material capable of conducting heat or transmitting signals, data, or electric current, including conductive metallic wire and light guide material like optical fiber. The transmission material may be preimpregnated in the filament prior to consolidation or impregnated as part of the consolidation process. An interlaced composite can include multiple transmission material types that perform different functions. An interlaced composite can also include transmission material of the same type in multiple tapes that can interact with each other. "Interlaced composite" and "woven composite" can be used interchangeably.

Reinforced Concrete

Described herein is a composition and method of making a reinforced polymer concrete. The composition of the reinforced polymer concrete can include a polymer concrete mixture and a reinforcing material. The polymer concrete mixture can include UPR. In an example, UPR can be formed by combining maelic anhydride and phthalic anhydride (diacids) with propylene glycol (diol). The reinforcing material can include a polymer and a reinforcement fiber.

The polymer used in the reinforcing material can be any polymer with a backbone that includes cyclohexane dimethanol ("CHDM"). For example, the polymer can be a CHDM-containing polyurethane or polyester, such as PETG, polycyclohexylene dimethylene terephthalate glycol ("PCTG"), and polycyclohexylene dimethylene terephthalate acid ("PCTA"). The polymer can be thermoset or thermoplastic so long as it contains the CHDM backbone. The reinforcement fiber can be any type of fiber material that provides increased strength, stiffness, or functionality compared to the polymer. For example, the reinforcement fiber can be glass fiber, carbon fiber, basalt fiber, or metallic fiber.

In an example, the reinforced polymer concrete can be formed by inserting the polymer concrete mixture and the reinforcing material into a mold. The polymer concrete may be prepared by mixing UPR, aggregate, and a curing agent. The curing agent may consist of a cross-linking reagent and a free radical initiator. The reinforcing material may be added to the mold before the polymer concrete is introduced while still in a liquid or semi-liquid state. The interaction of the curing agent and UPR triggers a reaction in the UPR that opens double bonds and allows for cross-linking between adjacent polyester molecules through the cross-linking reagent molecules. In an example, the free radical initiator can be MEKP or BPO. The mixture may then be allowed to cure. In an example, the mixture may be cured at room temperature and pressure in an open mold that exposes at least part of the polymer concrete to the air. In another example, the mixture may be cured through the application of heat and/or pressure in a closed mold that fully encloses the polymer concrete during the curing process. In another example, the mixture may be cured in an open mold that is heated.

Described herein are also methods for creating an interlaced composite that includes a CHDM-containing polymer and introducing it into a polymer concrete mixture as a reinforcing material. An interlaced composite can be created and inserted into a mold. A polymer concrete mixture containing UPR, aggregate, and a curing agent can be inserted into the mold such that the polymer concrete mixture and CHDM-containing interlaced composite are in direct contact. The concrete mixture can then be allowed to cure.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein.

Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 3A is a representative top view of a continuous composite weaving machine having a first set of warp heads in a first position and a second set of warp heads in a second position in accordance with an exemplary embodiment.

FIG. 3B is a representative side view of a continuous composite weaving machine having a first set of warp heads in a first position and a second set of warp heads in a second position in accordance with an exemplary embodiment.

FIG. 7A is a representative front cutaway view of a continuous composite weaving machine in accordance with an exemplary embodiment.

FIGS. 7B and 7C are representative front cutaway views of a continuous composite weaving machine showing filament interlacing that occurs as warp heads move from a first vertical configuration (FIG. 7B) to a second vertical configuration (FIG. 7C) in accordance with an exemplary embodiment.

FIG. 9A is a representative side view of a continuous composite weaving machine having an alternative warp head configuration comprising of an assembly of heddles in accordance with an exemplary embodiment.

FIG. 9B is a representative exploded view of a warp head configuration comprising an assembly of heddles in accordance with an exemplary embodiment.

FIG. 9C is a representative front view of a warp head configuration comprising an assembly of heddles in accordance with an exemplary embodiment.

FIG. 10 is a representative front cutaway view of a continuous composite weaving machine having a warp head configuration comprising an assembly of heddles in accordance with an exemplary embodiment.

FIGS. 11A and 11B are representative front cutaway views of a continuous composite weaving machine having a warp head configuration comprising an assembly of heddles, showing an example of filament interlacing that occurs as heddles move from a first vertical configuration (FIG. 11A) to a second vertical configuration (FIG. 11B) in accordance with an exemplary embodiment.

FIGS. 12A and 12B are representative front cutaway views of a continuous composite weaving machine having a warp head configuration comprising an assembly of heddles, showing another example of filament interlacing that occurs as heddles move from a first vertical configuration (FIG. 12A) to a second vertical configuration (FIG. 12B) in accordance with an exemplary embodiment.

FIG. 14 is a representative side view of another continuous composite weaving machine in accordance with an exemplary embodiment.

FIG. 15A is an exploded diagram of transmission material in wire form enclosed between two tapes in accordance with the present disclosure.

FIG. 15B illustrates one example of a cross section of transmission material enclosed between two tapes in accordance with the present disclosure.

FIG. 15C is an exploded diagram of transmission material in ribbon form enclosed between two tapes in accordance with the present disclosure.

FIG. 16 depicts one example of a cross section of a transmission material impregnated in a single filament in accordance with the present disclosure.

FIG. 17B depicts one example of a cross section of an interlaced composite that includes multiple weave layers in accordance with the present disclosure.

FIG. 19A illustrates a side view of a reinforced polymer concrete.

FIG. 19B illustrates a top view of a reinforced polymer concrete.

DETAILED DESCRIPTION

Figure 1:
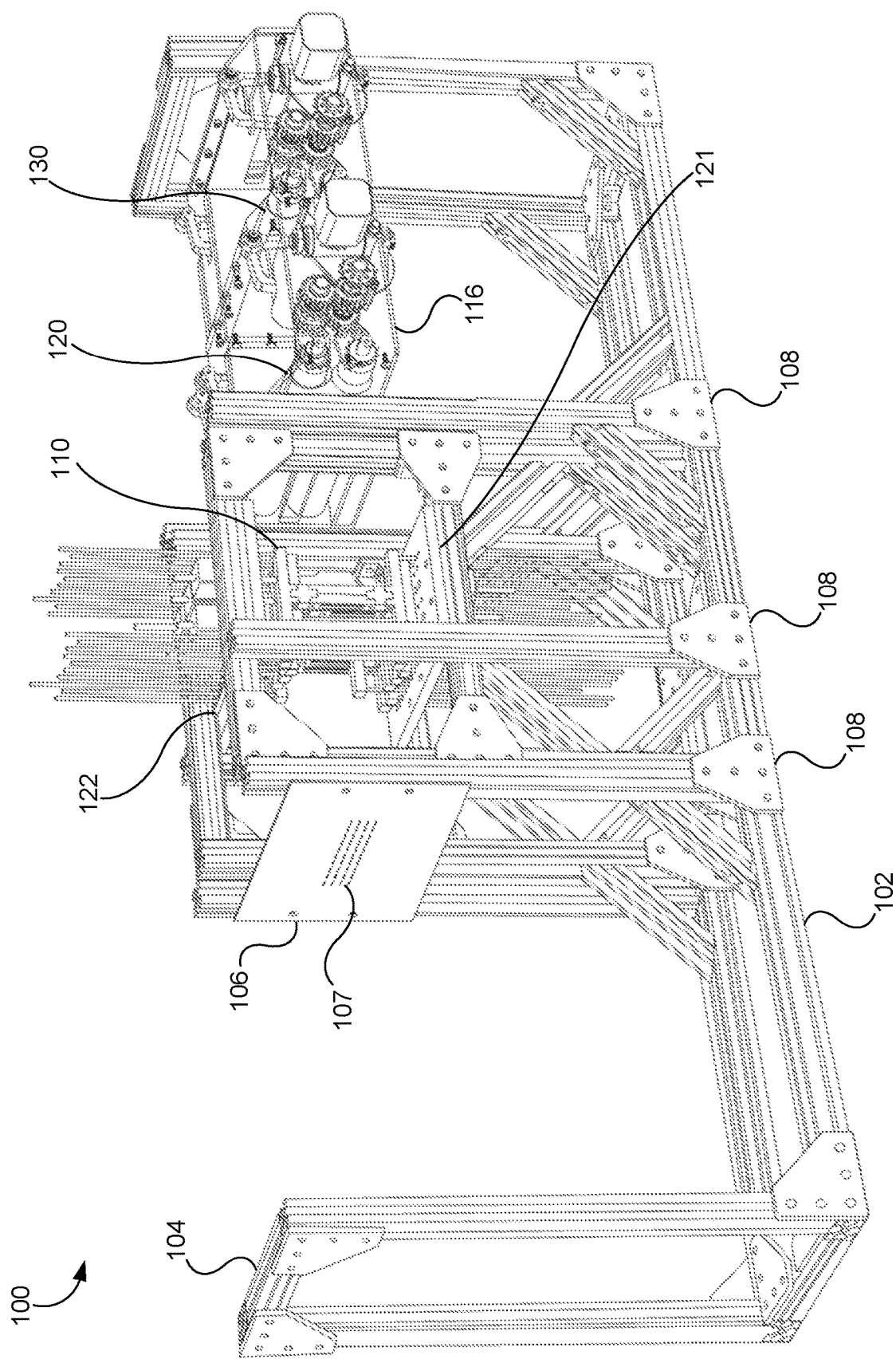
FIG. 1 is a partial schematic illustrating an exemplary embodiment of a continuous composite weaving machine in accordance with an exemplary embodiment.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, "consolidation" refers to heating and applying pressure to an assembly of thermoplastic materials in order to form them into a single sheet structure.

As used herein, "composite" refers to a combination of two or more materials differing in form or composition on a macro scale. As used herein, a composite includes, at least, a composite matrix binder and reinforcing elements. The composite constituents do not dissolve or merge completely into one another although they act in concert.

As used herein, "tape" refers to a relatively flat material, distinct from a fiber or a yarn geometry, having dimensions of a thickness of between approximately 0.1 mm and 1 mm, and a width of from approximately 5 mm to 50 mm. More preferably, the tape can have a thickness of between approximately 0.15 mm and 0.3 mm, and a width of from approximately 15 mm to 30 mm. In an illustrative embodiment, the width can be at least ten times the thickness, and more preferably, the width can be at least 100 times the thickness. The tape can have a length substantially longer than its thickness, for example, at least 100 times the thickness, and more preferably at least 1000 times the thickness.

As used herein, "filament" refers to an element including resin and having length much greater than its width or diameter. A filament can, but may not, also include one or more reinforcing fibers.

As used herein, "transmission material" refers to an element that does not include a resin and is capable of conducting heat or transmitting signals, data, or electric current. Examples of transmission material forms as used herein can include a yarn, fiber, wire, sheet, strip, film, or ribbon.

As used herein, "transmission tape" refers to a tape composed partially or entirely of transmission material.

As used herein, "resin" refers to an isotropic material used as a matrix binder within a composite.

As used herein, "thermoset" refers to a polymer which solidifies from a liquid form during processing due to an irreversible chemical reaction. Once cured, a thermoset cannot be returned to its uncured state. For example, an epoxy is a type of thermoset polymer.

As used herein, "thermoplastic" refers to a polymer which reversibly solidifies from a molten form during processing due to freezing. The mere presence of a thermoplastic polymer in a material, however, does not transform the material into a "thermoplastic composite." In order for a thermoplastic composite to be defined as such, it must retain the ability to be repeatedly softened by heating and reshaped even after the composite is initially produced. This can only occur if a thermoplastic polymer makes up a significant majority of the matrix of the composite. While thermoplastic polymers can often be dissolved within a thermoset polymer as an additive, the opposite is rarely true—though a thermoplastic matrix can be formed from a blend of two or more thermoplastic polymers.

Embodiments of the present disclosure present machines and methods for forming multiple layers of a woven composite in a single-step process. The woven composite may be created continuously and with a dynamically controllable internal fabric geometry that enables the creation of a woven composite having customized properties of strength, stiffness, and toughness. Spools of polymer impregnated filament may be loaded on one end of a continuous composite weaving machine and a multilayer composite panel may be output on the other side of the machine, with no additional lamination steps required. A continuous composite weaving machine of the present disclosure may also be configured to vary the density of the composite by change the spacing of warp and weft filaments relative to one another.

Referring now to the figures, in which like reference numerals represent like parts, various embodiments of the disclosure will be disclosed in detail. FIG. 1 is an illustration of a partial schematic for a machine 100 for continuously forming a composite weave with controllable internal fabric geometry (which may also be referred to as a continuous composite weaving machine 100). The machine 100 may include a frame 102 for supporting a warp rack 110 and a roller assembly 116. As described in greater detail below, warp rack 110 may include warp heads positioned between a base plate 121 and a top plate 122. Frame 102 may optionally support a weft inserter stack (not shown in FIG. 1) or a weft inserter stack may be independently positioned adjacent to frame 102. Frame 102 may include posts 108 that can be used to support insulation panels mounted around the warp rack 110, roller assembly 116, or other portions of continuous composite weaving machine 100. Frame 102 may include a spool rack mount 104 for supporting filament spools (not shown). Each filament spool may contain a roll of warp filament that comprises, for example, a continuous yarn or tow preimpregnated or coated with a thermoplastic polymer. The material of the yarn or tow can include, but is not limited to, carbon fiber, aramid fiber, glass fiber, or metallic fiber. The fibers (or combination of fibers) may be selected based on the desired mechanical or electrical properties. The free end of the warp filament of each filament spool may be fed into roller assembly 116 via warp rack 110.

Roller assembly 116 may include a first pair of rollers 120 that are configured to receive warp filaments. Roller assembly 116 may create tension in the warp filaments by "pinching" the warp filaments between the first pair of rollers 120. In other words, rollers of roller assembly 116 may apply a compressive force to the warp filaments that causes the warp filaments to be propelled forward when the rollers rotate in the appropriate opposing directions. The first pair of rollers 120 may provide compression of the composite weave by applying a compression force to the composite weave as the weave is pulled through the first pair of rollers 120. Roller assembly 116 may further include a second pair of rollers 130 to provide additional compression of the composite weave.

According to some embodiments, the first pair of rollers 120 and/or second pair of rollers 130 may be powered by one or more motors to draw the warp filaments off of the filament spools. In some embodiments, the first pair of rollers 120 may include a heating element to heat the materials and consolidate the composite. For example, the first pair of rollers 120 may include a resistive heater in a cartridge form. A cartridge heater may be installed concentric to a roller of the first pair of rollers 120 and thermal grease may be used to thermally link the heater to the roller, while allowing the roller and the cartridge heater to maintain mechanical independence from one other. In some embodiments, a heating element may perform induction heating, or the heating element may be heated working fluid that is pumped through the roller. Further, according to some embodiments, the second pair of rollers 130 may include a cooling element to solidify and cool the polymer matrix to control the crystallinity of the polymer in the resulting composite. For example, a cooling element may be a cartridge-type heat exchanger that is mounted concentric to a roller of the second pair of rollers 130 and interfaced with thermal grease. The cartridge-type heat exchanger may have chilled water (or some other working fluid) pumped through it to provide a cooling effect. Alternatively, a cooling function optionally performed by the second pair of rollers 130 may be achieved using a cryogenic liquid (e.g., liquid nitrogen) to generate a super-cooled gas that may be directed to flow over the hot filaments to cool them.

When warp filaments from the filament spools are suspended between roller assembly 116 and warp rack 110, roller assembly 116 and warp rack 110 may sufficiently engage the warp filaments to create tension in the warp filaments such that the warp filaments extend between warp rack 110 and roller assembly 116 in substantially straight lines. These substantially straight portions of warp filaments suspended between warp rack 110 and roller assembly 116 may form a warp that can receive weft filaments from one or more weft inserters of a weft inserter stack to form a weave as described in greater detail below.

As will be appreciated by those of skill in the art, a "warp" may be "warp filaments" in which one or more of the warp filaments is offset from the others by some distance or some angle. Accordingly, warp filaments may be disposed parallel to one another between warp rack 110 and roller assembly 116 in direction that is perpendicular to the length of the first pair of rollers 120 of roller assembly 116, although as explained in greater detail below, some or all of the warp filaments may be disposed at different vertical heights or angles (i.e., the angle at which a warp filament inclines/declines out of warp rack 110 towards roller assembly 116) to one another. As shown in further detail in FIG. 6, a weft inserter stack may include vertically stacked weft inserters. As will be appreciated by those of skill in the art, one or more weft inserters of a weft inserter stack may be a rapier weft inserter, an air-jet weft inserter, and/or an inertial weft inserter. For example, one or more weft inserters of the weft inserter stack may be a rack-and-pinion rapier or an air-jet insertion system as described in paragraphs [0076]-[0079] of US Pat. Pub. No. 2016/0305051.

Machine 100 may optionally include a filament guide plate 106 disposed between spool rack mount 104 and warp rack 110. Filament guide plate 106 may be a rigid plate that includes apertures 107 for receiving warp filaments from the filament spools mounted on spool rack mount 104 to guide them into warp rack 110. Each warp filament may be threaded through a distinct aperture 107 of a filament guide plate 106 prior to being threaded through warp rack 110. Filament guide plate 106 may serve to constrain the vertical movement of the portions of the warp filaments that extend between the filament rollers and filament guide plate 114 by constraining the position of each warp filament at its corresponding aperture 107. Filament guide plate 106 may also serve to restrict the lateral movement of the warp filaments by providing an anchor point at each aperture 107. Accordingly, filament guide plate 106 is advantageous because it enables the warp filaments to be received by warp rack 110 without risk of warp filaments contacting one other or becoming entangled due to variations in the tautness of the warp filaments caused by continuous movement through machine 100.

Although not shown in FIG. 1, spool rack mount 104 is capable of mounting filament spools in a grid-like configuration such that the filament spools are arranged in parallel rows and columns. For example, spool rack mount 104 can support four rows of ten filament spools that correspond to the four rows of ten apertures 107 of filament guide plate 106 shown in FIG. 1, such that each filament spool can feed into a distinct aperture 107. Although FIG. 1 shows a machine 100 configured to utilize 40 warp filaments (i.e., four rows of ten warp filaments corresponding to apertures 107 of filament guide plate 106), machine 100 is not so limited and it is contemplated that any number of warp filaments may be used by increasing or decreasing the number of filament spools and warp rack 110.

Figure 2A:
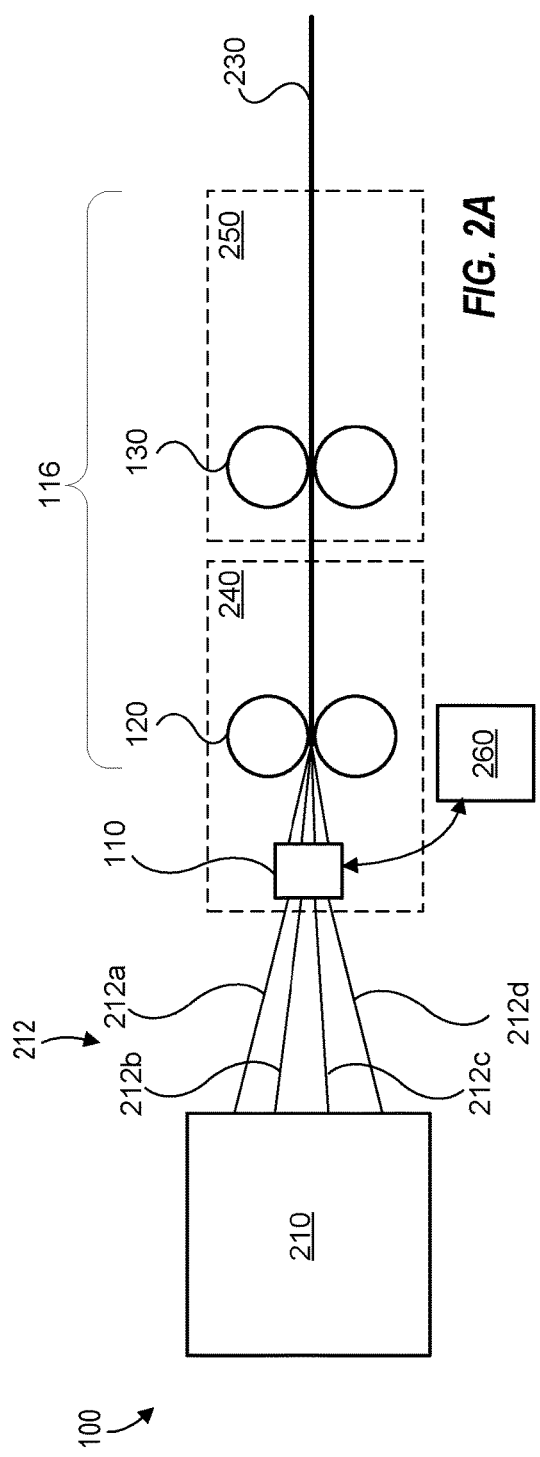
FIG. 2A is a representative side view of a continuous composite weaving machine in accordance with an exemplary embodiment.
Figure 2B:
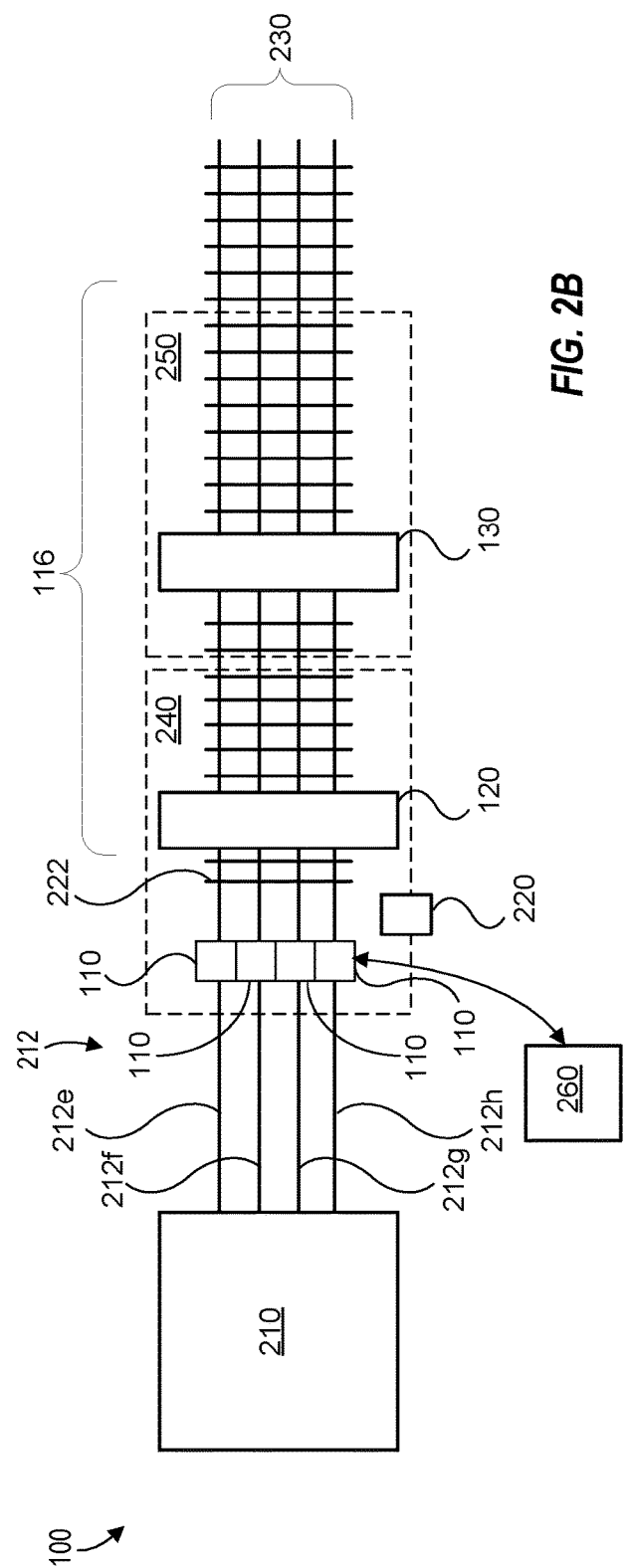
FIG. 2B is a representative top view of a continuous composite weaving machine in accordance with an exemplary embodiment.

FIGS. 2A and 2B show a representative side view and top view of a continuous composite weaving machine 100, respectively. As described above with respect to FIG. 1, filament spools 210 (that may be mounted on spool rack 104) feed warp filaments 212 into the first pair of rollers 120 of roller assembly 116 via warp rack 110. FIGS. 2A and 2B represent a four-by-four grid of filament spools 210 that dispense a total of 16 warp filaments 212. As shown in FIG. 2A, the warp filaments 212 may constitute multiple rows of warp filaments 212a, 212b, 212c, 212d that each include warp filaments 212 that are aligned with one another when viewed from the side. Each row of warp filaments 212a, 212b, 212c, 212d originates from filament spools 210 mounted at a different vertical height of spool rack mount 104. As shown in FIG. 2B, the warp filaments 212 may constitute multiple columns of parallel warp filaments 212e, 212f, 212g, 212h that each include warp filaments 212 that are aligned with one another when viewed from the top. For simplicity and ease of viewing, many of the figures herein only depict 16 warp filaments 212 (i.e., four rows and four columns of warp filaments 212), it should be understood that continuous composite weaving machine 100 may utilize many more warp filaments in practice, such as for example, the 40 warp filaments 212 described with respect to FIG. 1.

FIGS. 2A and 2B illustrate the process flow of forming a woven composite material 230 using continuous composite weaving machine 100. Roller assembly 116 is configured to draw the warp filaments 212 off of the filament spools 210 via warp rack 110. In some embodiments, roller assembly 116 may be configured to continuously pull the warp filaments 212 at a constant or variable rate, while in other embodiments roller assembly 116 may be configured to repeatedly pull the warp filaments 212 in discrete "tugs" separated by a predetermined or variable increment in time. Prior to being drawn into roller assembly 116, a weft inserter stack 220 can insert one or more weft filaments 222 into the warp formed by the warp filaments 212 to form a weave. A weft filament 222 may have a minimum length that is long enough to span the distance between the two outer columns of warp filaments 212e, 212h as shown in FIG. 3A. Weft filaments 222 may be made of a yarn or tow preimpregnated or coated with a thermoplastic polymer. The material of the yarn or tow can include, but is not limited to, carbon fiber, aramid fiber, glass fiber, or metallic fiber. Weft filaments 222 may also be made from a discontinuous fiber reinforced thermoplastic.

After weft filaments 222 are inserted between warp filaments 212 to form a weave, the weave may then be compressed into a composite material by roller assembly 116 which applies a compression force to the weave. To aid in the formation of the composite material 230, machine 100 may include a heated zone 240 to heat the warp filaments 212 and the one or more weft filaments 222 to meld them together. Warp filaments 212 may be kept at room temperature prior to entering heated zone 240. Within the heated zone 240, the filament temperature may be kept above the glass transition temperature ($T_g$) of the matrix polymer to permit bonding of the filaments. For example, warp rack 110 may heat the filaments above $T_g$, and heated zone 240 may cause the filaments to continue to heat until the temperature of the filaments is above a melting temperature ($T_m$) prior to the filaments reaching roller assembly 116. Heated zone 240 may be created by heating elements associated with warp rack 110, heating elements associated with the first pair of rollers 120, insulation panels mounted on posts 108 of the frame 102, or some combination thereof. According to some embodiments, the heating functions described above may alternatively be performed by an ultrasonic welding bar that can vibrate the material to generate heat by elastic losses, an inductive heater that induces current in the material by generating an alternative or rotating magnetic field to generate heat through resistive losses, a convection device (e.g., convection oven) that circulates hot air around the material, a microwave heating device, or any other such heating method known or later-developed in the art.

As mentioned above, roller assembly 116 may optionally include a second pair of rollers 130 to add a further compression force to the weave. The second pair of rollers 130 may have an associated cooling element that can create a cooled zone 250 for cooling the previously heated weave of warp and weft filaments 212, 222 to accelerate the formation of a woven composite material 230. In the cooled zone 250, the composite temperature may be reduced below the glass transition temperature ($T_g$) of the matrix polymer. Crystallinity in the matrix polymer can be controlled by varying the feed rate and distance between the first pair of heated rollers 120 and the second pair of cooled rollers 130, as this will determine the amount of time the polymer is between its glass transition ($T_g$) and melt temperature ($T_m$). Although embodiments of roller assembly 116 are described as having a first pair of heated rollers 120 for heating the woven composite and a second pair of cooled rollers 130 for cooling the woven composite, it is also contemplated that roller assembly 116 may include any number of pairs of heated and/or cooled rollers to control the crystallinity in the matrix polymer. For example, roller assembly 116 may include three or more pairs of rollers, where each pair of rollers is set to a specified temperature range such that the temperature is the greatest at the first pair of rollers that the composite weave is drawn into and coldest at the last pair of rollers, with each intermediate pair of rollers reducing the temperature between the first and last pairs of rollers by an increment.

Continuous composite weaving machine 100 may include a controller 260 that may be in electronic communication with warp rack 110, roller assembly 116, and weft inserter stack 220. Controller 260 can be a variety of electronic devices programmable to control the various functions of the continuous composite weaving machine, such as, for example, the vertical movement of warp heads or heddle assemblies of the warp rack 110, heating elements of the warp rack 110, the rotation speed of some or all of the rollers of roller assembly 116, compression forces applied by some or all of the rollers of roller assembly 116, heating and/or cooling elements of roller assembly 116, and insertion of weft filaments by the weft inserter stack 220. Furthermore, controller 260 can control the relative timing of the advancement of materials through roller assembly 116, the insertion of weft filaments from weft inserter stack 220, and the changes in warp head or heddle configurations of warp rack 110 so that continuous composite weaving machine 100 may continuously output woven composite material 230.

In some embodiments, controller 260 may store and execute predetermined programs to cause composite weaving machine 100 to produce a woven composite material 230 having a predetermined design. Controller 260 can be a microcontroller that is, for example, programmable or pre-programmed (e.g., application specific integrated circuits (ASICs)). Alternatively, the controller can be a PC, server, mainframe, or other computer programmed device that controls aspects of continuous composite weaving machine 100. Controller 260 can include an application (or, "app") on a smartphone or tablet. Controller 260 can be connected to the system using, for example, a direct wired connection, a local area network (LAN), a wireless local area network (WLAN), an internet connection, a wireless connection, Bluetooth, near-field communication (NFC), or a cellular or radio connection. Controller 260 can also be networked via a similar connection to enable remote operation and control.

Figure 3C:
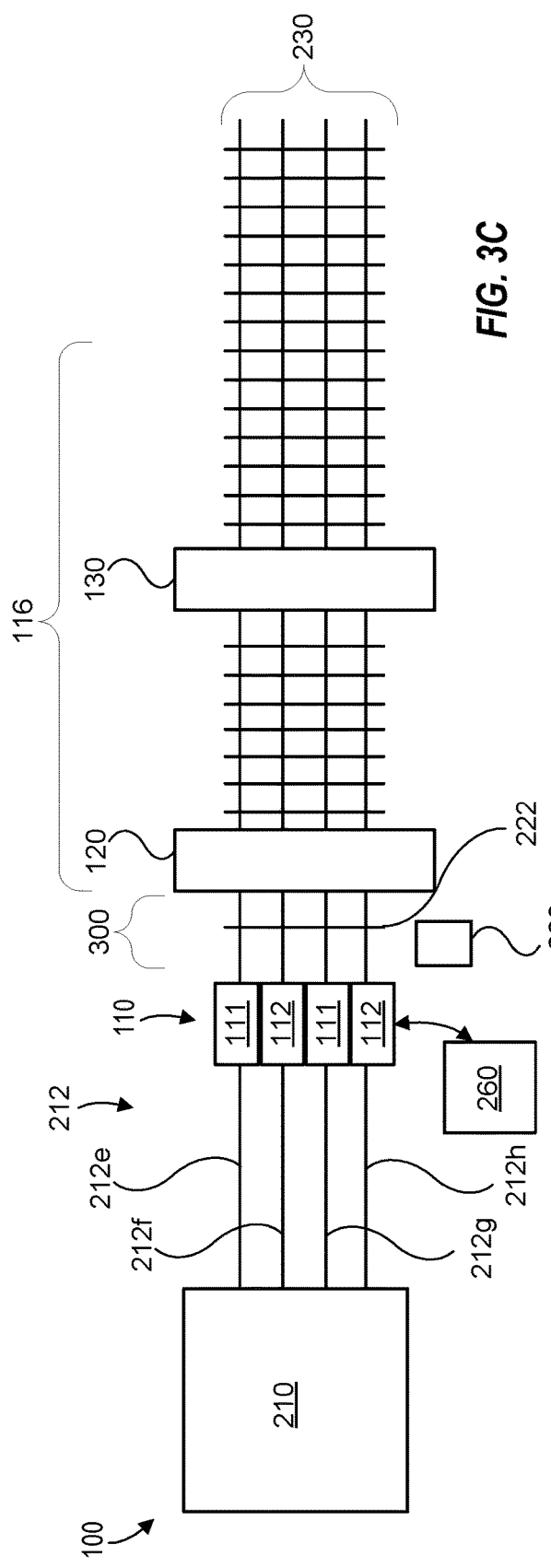
FIG. 3C is a representative top view of a continuous composite weaving machine having the first set of warp heads in the second position and the second set of warp heads in a first position in accordance with an exemplary embodiment.

FIGS. 3A through 3D illustrate the process of creating a weave by adjusting the vertical positions of the warp filaments 212 relative to one another. The vertical position of a warp filament may refer to the vertical height of the warp filament 212 at warp rack 110. As will be appreciated, by changing the height of a warp filament 212 at warp rack 110, the angle that the warp filament 212 extends towards warp rack 110 from its corresponding filament spool 210 may change. Further, the angle at which the warp filament extends towards roller assembly 116 from warp rack 110 (the "warp angle") will also change as the height a warp filament 212 is adjusted. A warp 300 may be created by adjusting the heights of the warp filaments 212 so that at least one sub-group of warp filaments 212 has a different height or warp angle than a second sub-group of warp filaments 212. As shown in FIG. 3B, warp filaments 212 originating from the same row of filament spools 210 that have the same height at the warp rack 110 will be aligned in a row when view from the side.

Figure 3D:
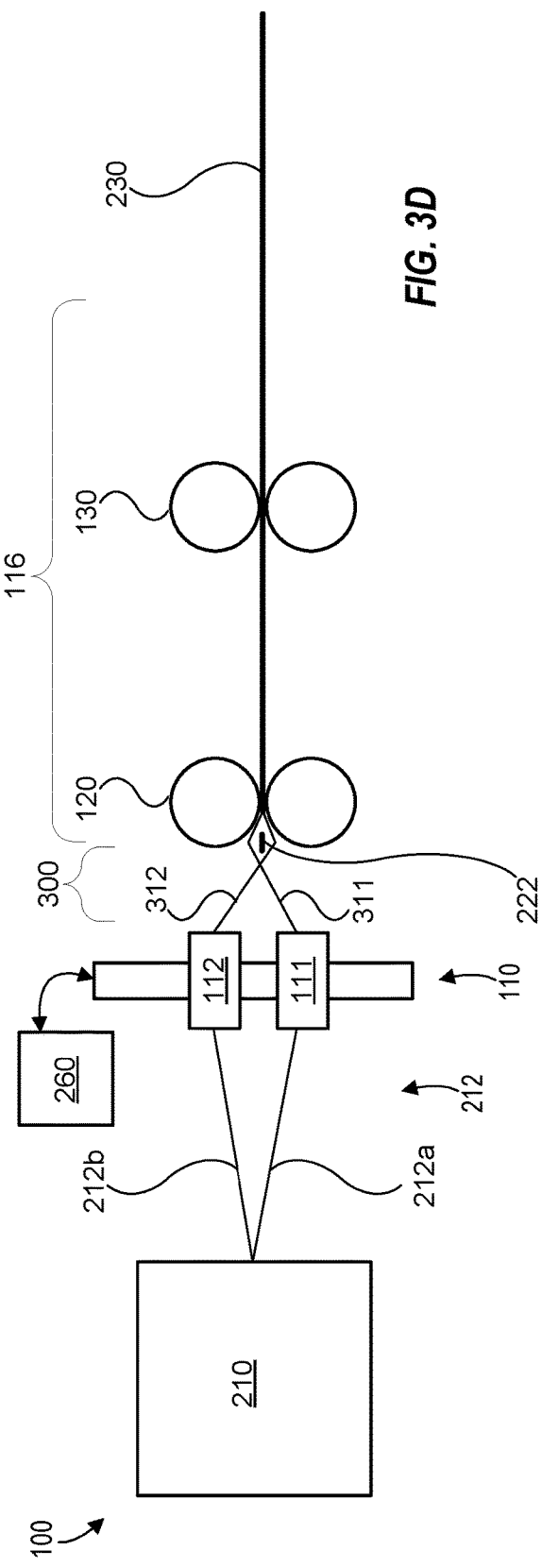
FIG. 3D is a representative side view of a continuous composite weaving machine having the first set of warp heads in the second position and the second set of warp heads in a first position in accordance with an exemplary embodiment.

As described in greater detail below, each warp head of warp rack 110 is configured to move vertically to adjust the height of the warp filaments 212 that are engaged by it. FIGS. 3A and 3B represent the warp heads of warp rack 110 in a first vertical configuration, whereas FIGS. 3C and 3D represent the warp heads of warp rack 110 having moved to a second vertical configuration. As shown in FIGS. 3A and 3B, a first row 212a of a first group of warp filaments 212e, 212g may be associated with a first group of warp heads 111 that are initially positioned at a first height, and a second row 212b of a second group of warp filaments 212f, 212h may be associated with a second group of warp heads 112 that are initially positioned at a second height that is lower than the first height. The relative positions of the portion 311 of the first row 212a positioned between warp rack 110 and roller assembly 116 and the portion 312 of the second row 212b positioned between the warp rack 110 and roller assembly 116 form a warp 300 that may receive one or more weft filaments 222.

Accordingly, when in the first vertical configuration, a weft filament 222 can be inserted by a weft inserter stack 220 between the first row 212a of warp filaments 212e, 212g and the second row 212b of warp filaments as shown in FIG. 3B. Following the insertion of the weft filament 222 into warp 300 (i.e., between two or more warp filaments 212), the warp heads of warp rack 110 may adjust their vertical positions to a second vertical configuration such that the first row 212a of warp filaments 212e, 212g is positioned below the second row 212b of warp filaments 212f, 212h. As shown in FIG. 3D, this inversion of the warp heads of warp rack 110 may cause the portions 311, 312 of the first and seconds rows 212a, 212b of the warp filaments 212 to cross over one another behind the inserted weft filament 222, thereby creating a weave and securing the weft filament 222 between the warp filaments 212. The portion of the weave containing the weft filament 222 may then be drawn into roller assembly 116 for compression into woven composite material 230 as described above.

For simplicity and ease of viewing, FIGS. 3A-3D only depict one row of filament spools 210 that result in the creation of two rows 212a, 212b of warp filaments 212 based on the vertical configuration of the warp heads of warp rack 110, however it is contemplated that continuous composite weaving machine 100 may include more rows of warp filaments 212. For example, as previously described, continuous composite weaving machine 100 may include four or more rows of warp filaments 212 extending out of the filament spools 210. Further, as described below, the warp heads of warp rack 110 can adjust their relative vertical heights to create a dynamic number of rows in warp 300. Further, although FIGS. 3A-3D only depicts the insertion of a single weft filament 222, it should be understood that weft inserter stack 220 may simultaneously insert weft filaments 222 at different vertical heights of the warp as desired. In this way, and as shown in greater detail below with respect to FIGS. 7A through 11B, continuous composite weaving machine 100 may dynamically create a variety of different weave patterns through a series of height adjustments to the warp heads of warp rack 110 and selective insertion of one or more weft filaments 222 into warp 300.

Figure 4A:
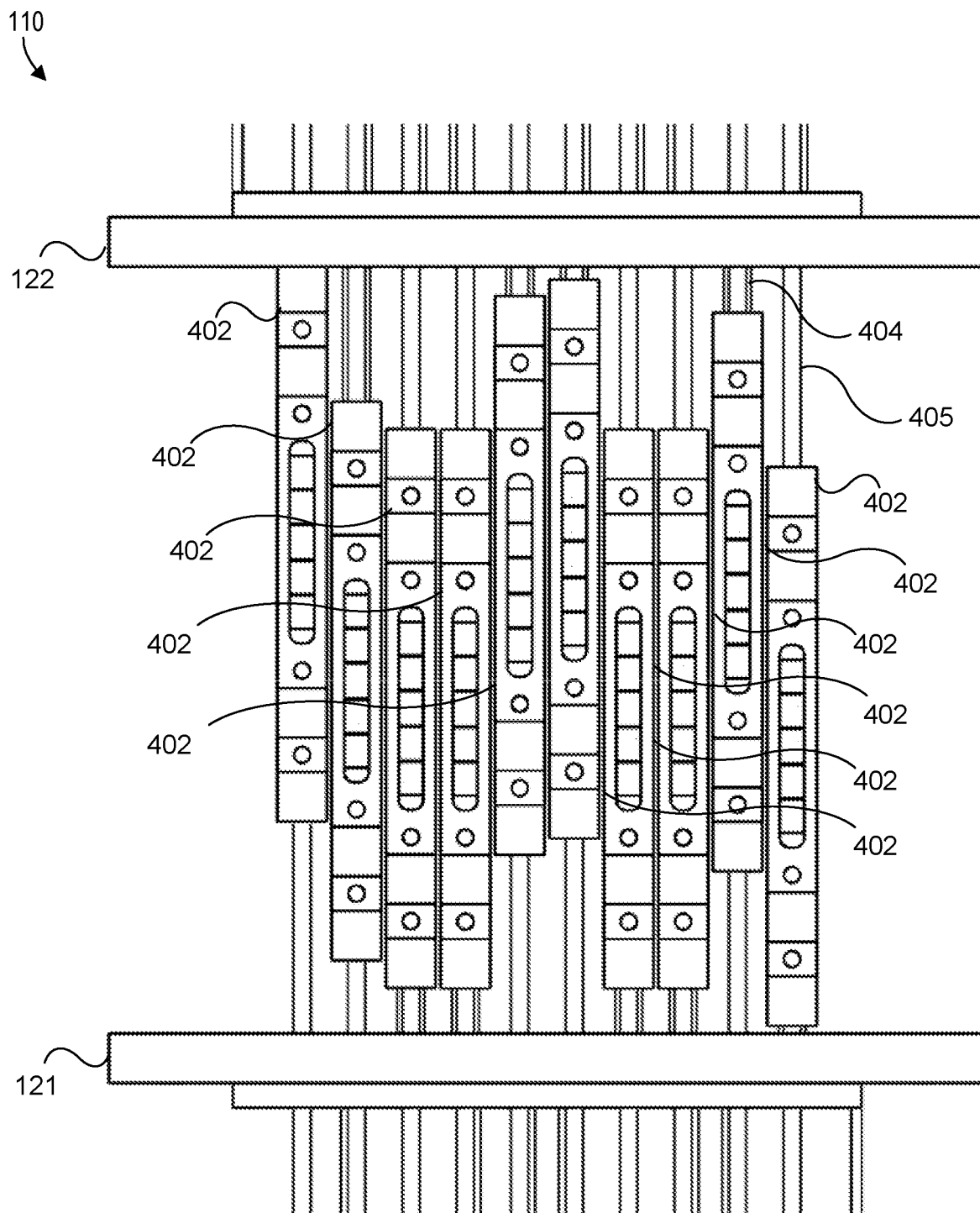
FIGS. 4A and 4B are front and rear views, respectively, of a warp rack of a continuous composite weaving machine in accordance with the present disclosure.
Figure 4B:
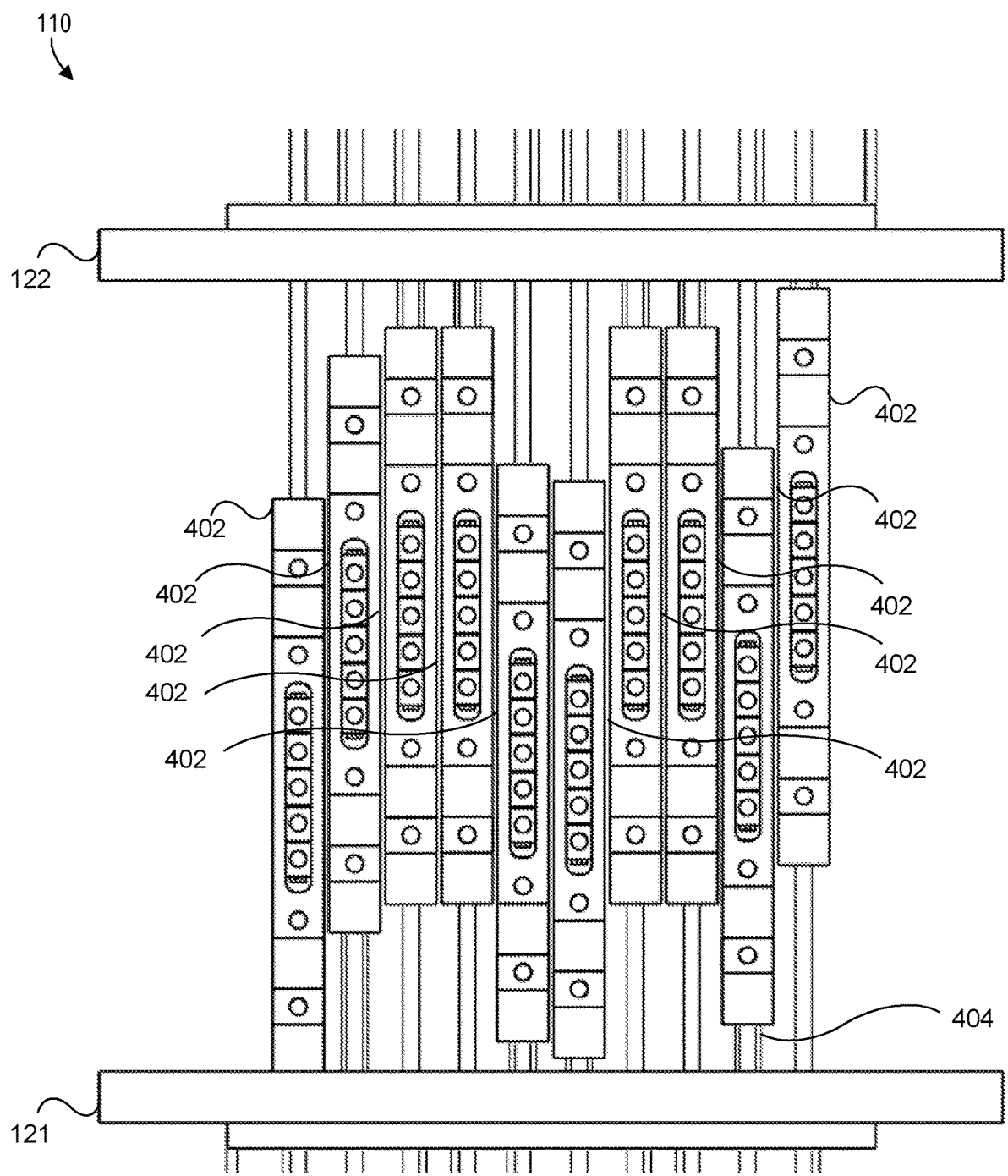

FIGS. 4A and 4B show front and rear views of a warp rack 110 having warp heads 402. As shown, each of the warp heads 402 may be aligned adjacent to one another in a vertical plane. Each warp head 402 may be mounted on a lead screw 404 that enables the warp head 402 to move vertically. A lead screw 404 associated with a particular warp head may be positioned above or below the warp head 402. Each warp head 402 may also be mounted on one or more linear shafts 405 constrains warp head 402 from moving laterally. The vertical movement of each of the warp heads 402 may be constrained by a base plate 121 positioned beneath the warp heads 402 and a top plate 122 positioned above the warp heads 402. In some embodiments, the vertical movement the warp heads 402 may be constrained by limit switches, beam-based sensors, or encoders on the motors that drive the motion of the warp heads. As will be understood by those of skill in the art, each lead screw 404 may be powered by a motor that can cause the lead screw 404 to rotate, thereby adjusting the vertical position of the associated warp head 402 upwards or downwards, based on the direction of rotation of the lead screw 404. Each motor may be controlled by the controller 260. In some embodiments, the vertical movement of one or more warp heads 402 may be driven by a solenoid-based system, a hydraulic system, a pneumatic system, a rack and pinion, or any other such suitable system for enabling selectively controllable vertical movement of a warp head 402 in a warp rack 110.

Each warp head 402 of the warp heads 402 may be capable of vertical movement that is independent of the other warp heads 402. Thus, according to some embodiments, each warp head 402 of the warp heads 402 may be enabled to be dynamically positioned at a different vertical height from one another. In some embodiments, sub-groups of the warp heads 402 may be configured to move in tandem such that each of the warp heads 402 of the sub-group maintain the same respective height. In some embodiments, sub-groups of the warp heads 402 may be dynamically formed and unformed by controller 260.

Figure 5A:
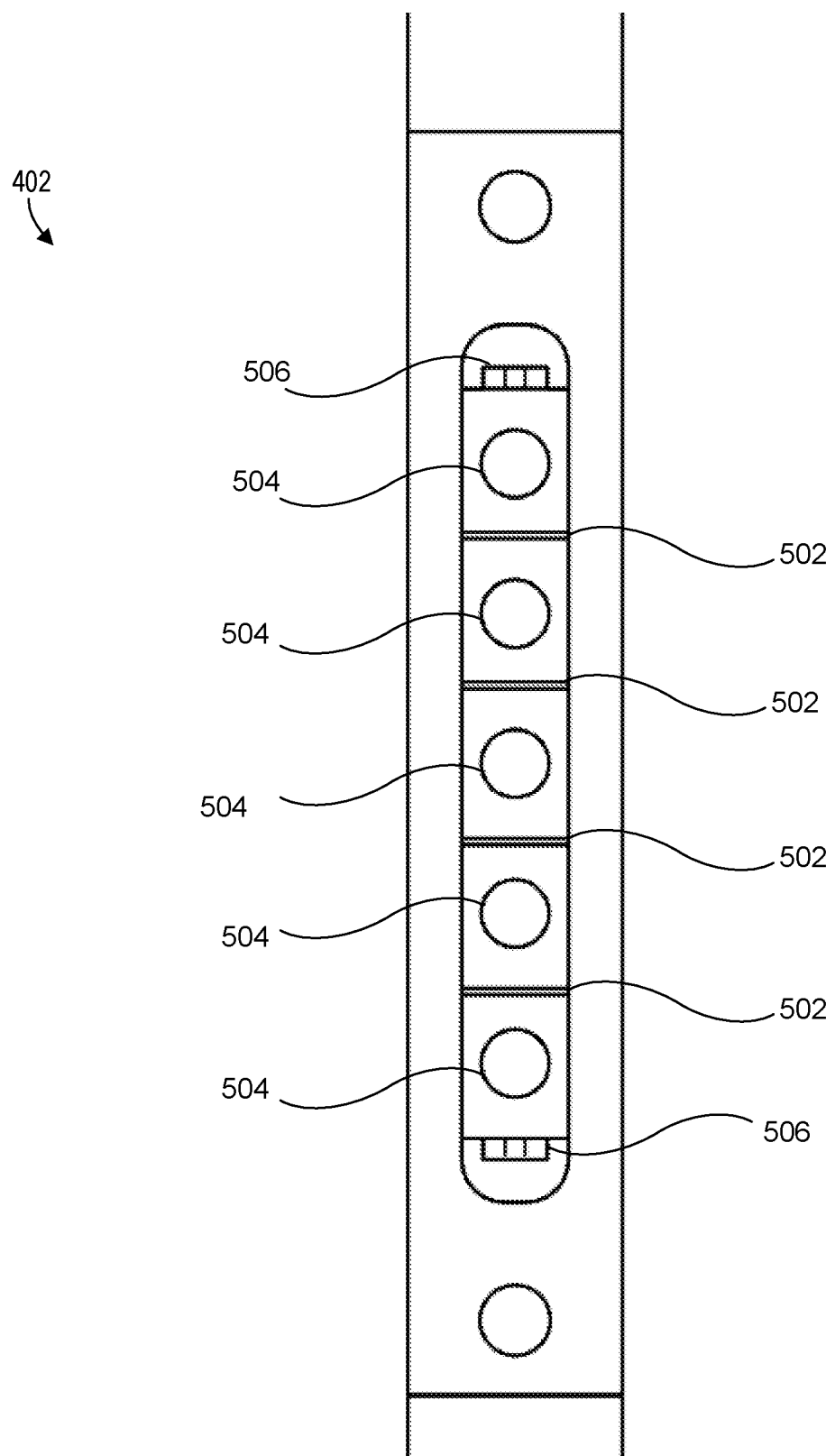
FIG. 5A is a rear view of a warp head in accordance with an exemplary embodiment.

FIG. 5A shows a rear view of a warp head 402 of the warp rack 110 of FIGS. 4A and 4B, according to an exemplary embodiment. Warp head 402 may include filament channels 502, heating elements 504, and one or more temperature sensors 506. The filament channels 502 may be positioned at different locations along the vertical axis of warp head 402 (i.e., along the height of warp head 402). Each filament channel 502 may be a slot that runs from the front face of warp head 402 to the rear face of warp head 402 such that a warp filament 212 may pass through warp head 402 via filament channel 502. Filament channel 502 is configured to engage or receive a warp filament 212 such that filament channel 502 will vertically anchor the warp filament 212 based on the vertical position of the warp head 402. In other words, as warp head 402 moves upwards or downwards as described above with respect to FIGS. 4A and 4B, the warp filaments 212 that pass through the respective filament channels 502 of the warp head 402 correspondingly move upwards or downwards at the point at which they pass through the respective filament channel 502.

Filament channel 502 may be configured to constrain the lateral movement of an inserted warp filament 212 while allowing the warp filament 212 to be freely drawn in a forwards or backwards direction through the filament channel 502. In some embodiments, filament channel 502 may be configured to exert a drag force on a warp filament 212 as it passes through the channel, which can enable the filament shape and/or size to be adjusted by the warp head 402. For example, in some embodiments, the dimensions of a filament channel 502 on the rear face of warp head 402 may be different from dimensions of the filament channel 502 on the front face of the warp head 402, allowing excess resin to be squeezed out and/or allowing the warp filament 212 to be reshaped (like pultrusion).

Heating elements 504 may be internally integrated into warp head 402 on either side of a given filament channel 502 to heat the warp filament 212 as it passes through filament channel 502. Heating elements may be for example, but not limited to, resistive cartridge heaters or induction coils. One or more temperature sensors 506 may be integrated within warp head 402 to monitor the temperature generated by heating elements 504. In some embodiments, warp heads 402 may be configured to heat the warp filaments 212 to a minimum temperature that is above the glass transition temperature ($T_g$) of the warp filament 212 polymer. For example, in some embodiments, warp heads 402 may be configured to heat the warp filaments 212 to approximately 20-30 degrees Celsius below the melting temperature ($T_m$)

of the warp filaments 212. As described above, as the warp filaments 212 move from warps heads 402 through heated zone 240 to roller assembly 116, the temperature of warp filaments 212 may be raised to above a specified temperature prior to reaching roller assembly 116, such as for example, $T_m$.

Although not shown, machine 100 may include temperature sensors within heated zone 240, roller assembly 116, and/or cooled zone 250 to monitor the temperature of the filaments and/or weave. Controller 260 may receive one or more signals from one or more temperature sensors 506 of a warp head 506 that indicate the temperature of the warp head 506 and controller 260 may send a signal to one or more of the heating elements 504 to adjust their output of heat. Controller 260 may send a signal to increase the heat output of the heating elements of one or more warp heads 402 if controller receives a signal from a temperature sensor 506 indicating the temperature at a warp head 402 is below a minimum temperature, such as, for example, $T_g$.

Figure 5B:
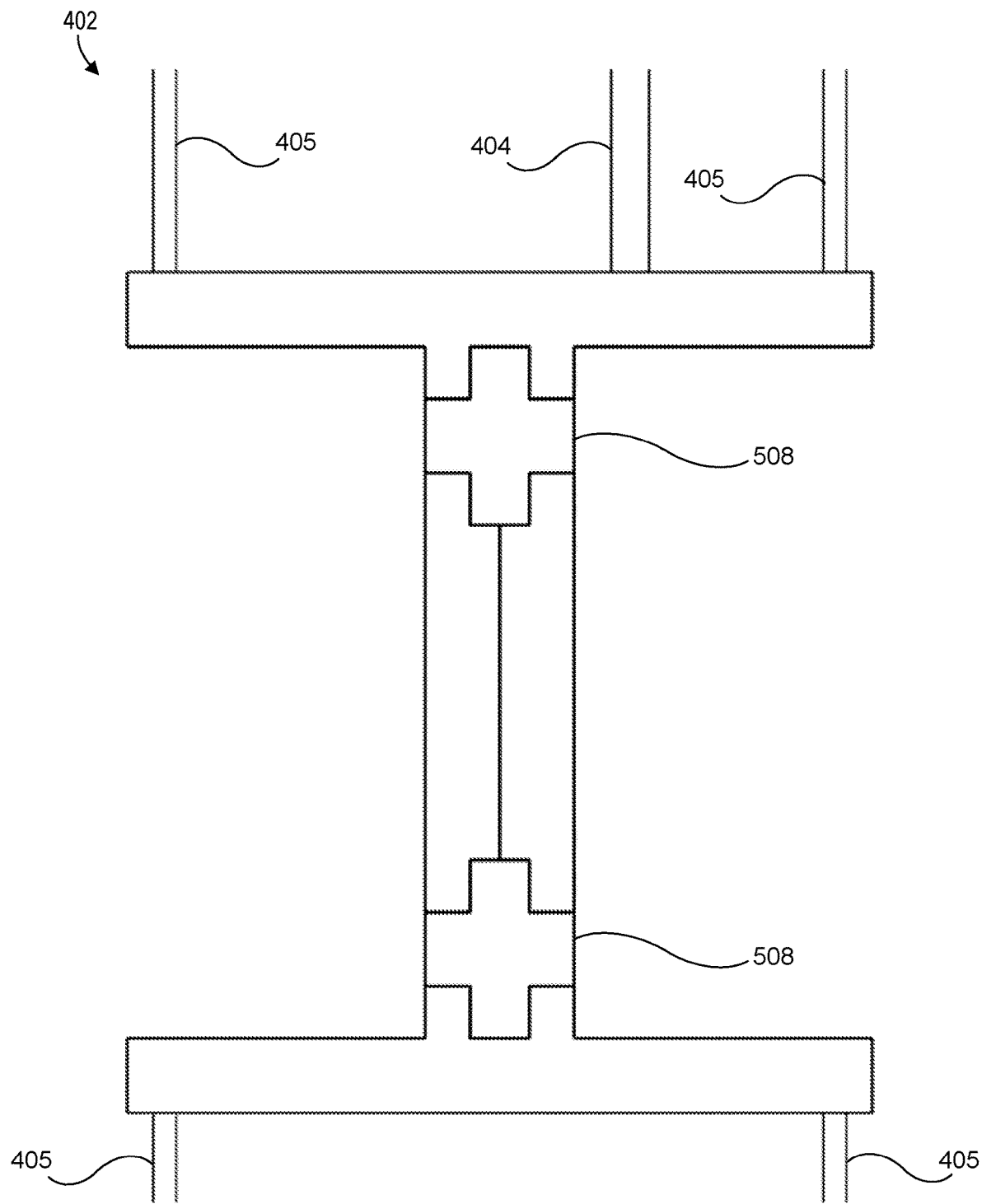
FIG. 5B is a side view of a warp head in accordance with an exemplary embodiment.
Figure 5C:
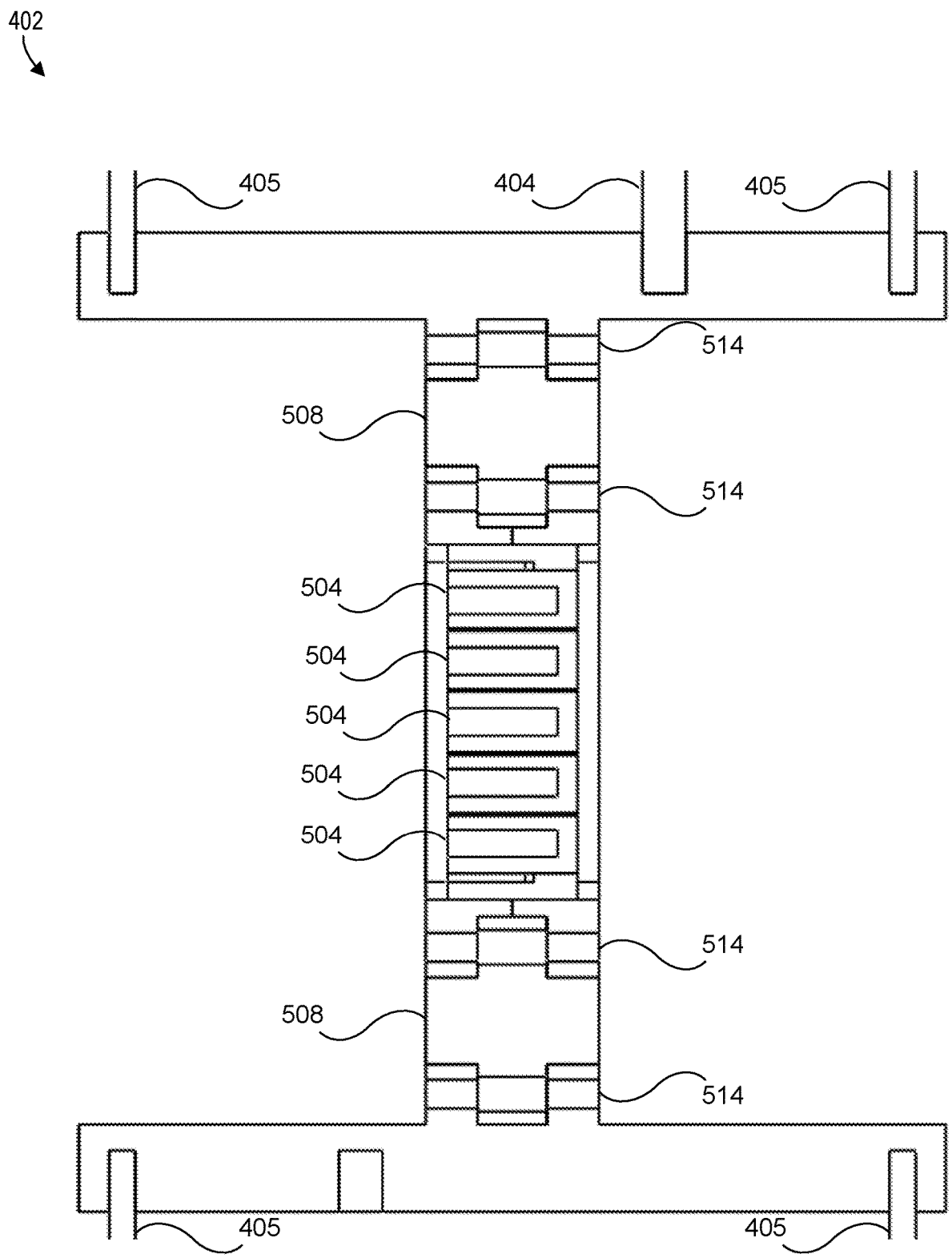
FIG. 5C is a cross-sectional side view of a warp head in accordance with an exemplary embodiment.

FIGS. 5B and 5C show a side view and a cross-sectional side view of a warp head 402, respectively, according to an exemplary embodiment. As previously described, warp head 402 may be mounted on a lead screw 404 that facilitates the vertical movement of warp head 402. Warp head 402 may also include linear shafts 405 that may resist the torsion caused by lead screw 404 and laterally stabilize warp head 402 within the warp rack 110. For example, as shown in FIG. 1, the linear shafts 405 extending out of the bottom portion of warp heads 402 of warp rack 110 are received by apertures of base plate 121 and the linear shafts 405 extending out of the top portion of warp heads 402 of warp rack 110 are received by apertures of top plate 122, thereby constraining each warp head 402 in an individual vertical plane that runs parallel to the other warp heads 402. Warp head 402 may include one or more insulators 508, that may be for example, ceramic insulators 508. A ceramic insulator 508 is advantageous because it can be used with any filament, regardless of the melting temperature ($T_m$). If a warp filament 212 with a low $T_m$ is used (e.g., polypropylene or polyethylene), then a high temperature polymer insulator 508 may be utilized instead of a ceramic insulator 508.

According to some embodiments, an insulator 508 may be positioned both above and below the heating elements 504 to prevent heat transfer from the heating elements 504 to the lead screw 404, linear shafts 405, base plate 121, top plate 122, or any other portion of warp rack 110 that may be undesirable to heat. As shown in FIG. 5C, warp head 402 may include one or more bolt holes 514 for bolts or screws to removably secure the components of warp head 402 together to allow for modularity. For example, in some embodiments, a filament channel 502 of warp head 402 may be removed and replaced if it becomes clogged. Further, filament channels 502 may be added or removed to build composites having a customized number of different layers.

Figure 6:
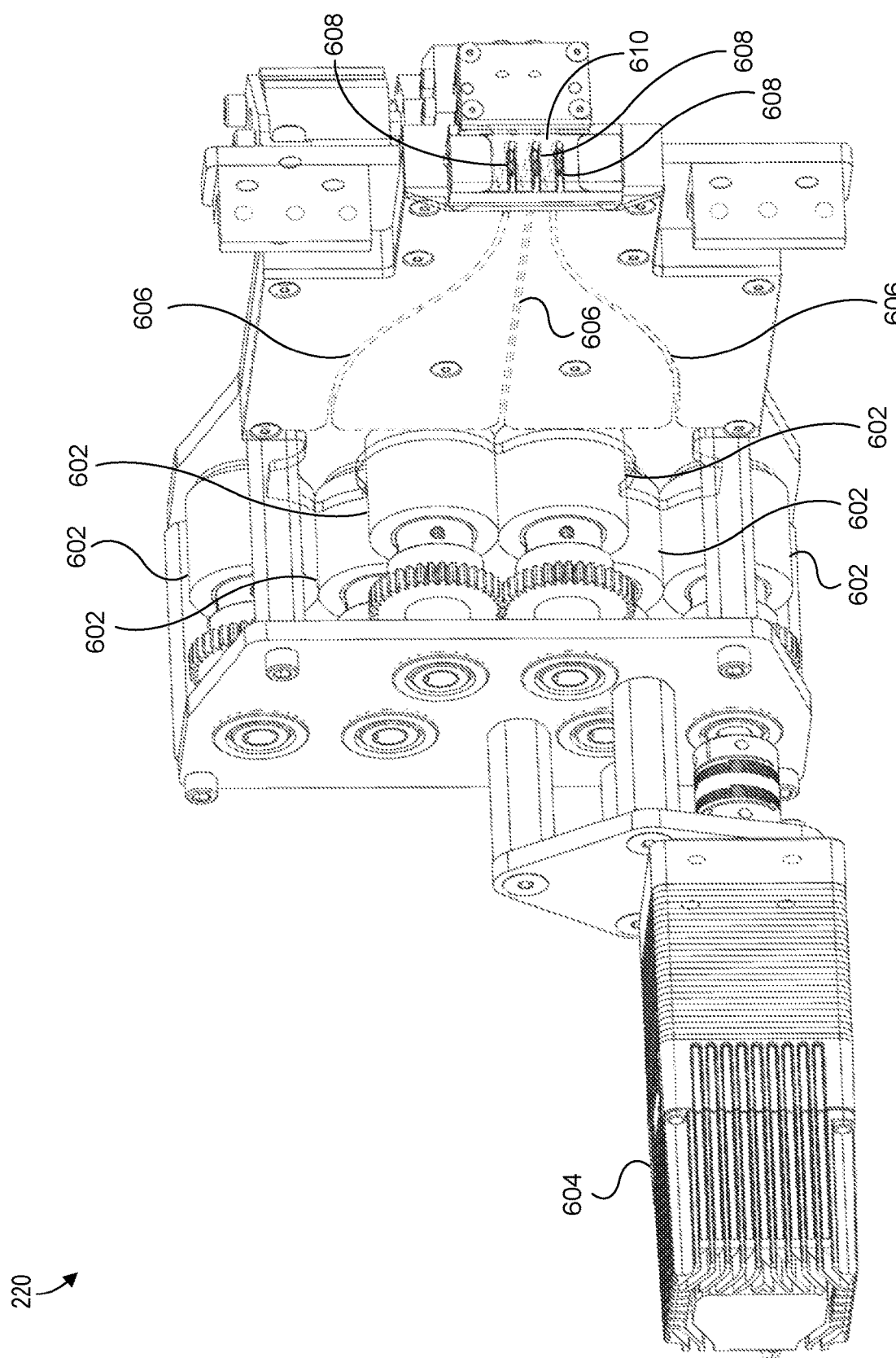
FIG. 6 is a side perspective view of a weft inserter stack of a continuous composite weaving machine in accordance with an exemplary embodiment.

FIG. 6 shows an embodiment of a weft inserter stack 220 having three inertial weft inserters that are configured to simultaneously output up to three separate weft filaments 222. The weft inserter stack 220 shown in FIG. 6 includes three inertial weft inserter roller pairs 602 that are each configured to propel a continuous strand of weft filament from a weft filament source positioned behind weft inserter stack 220 through a channel 606, and out of a slit 608 for insertion into a warp 300 formed by warp filaments 212. A continuous strand of weft filament 222 may be dispensed from a weft filament spool or roll (not shown) and fed into one of the inertial weft inserter roller pairs 602. The two rollers of a roller pair 602 that engage a weft filament 222 may simultaneously rotate in opposing directions to pull a portion of the weft filament 222 off of the spool while propelling another portion of the weft filament 222 through channel 606 towards slit 608. The propulsion caused by a roller pair 602 may serve to eject a weft filament 222 of a predetermined length out of a slit 608 of weft inserter stack 220.

The rotation of one or more roller pairs 602 may be powered by a motor 604. As shown in FIG. 6, roller pairs 602 may be powered by a single motor, such that each of the roller pairs 602 may be selectively activated by engaging gears associated with a roller pair 602 with a gear chain driven by the motor. Controller 260 which may send a signal to the roller pairs 602 to selectively engage one or more roller pairs 602 to cause weft inserter stack 220 to eject weft filaments 222 in accordance with a weave pattern controller 260 has been programmed to execute. Accordingly, the ejection of weft fibers 222 by weft inserter stack 220 can be timed to work in concert with the motion of roller assembly 116. In some embodiments, each roller pair 602 may be individually powered by a unique motor associated with the roller pair 602.

Although weft filaments 222 fed off of a spool into weft inserter stack 220 may be continuous strands, a cutting apparatus 610 may cut weft filaments 222 such that weft filaments 222 of a discrete length are ejected out of weft inserter stack 220 and inserted into warp 300. Accordingly, in some embodiments, inertial weft inserter roller pairs may be configured to rotate a predetermined amount to eject a predetermined length of weft filament 222. In some embodiments, a sensor positioned on the opposing side of warp 300 may detect the position of the weft filament 222 and the corresponding inertial weft inserter roller pair 602 may cease rotating in response to receiving a signal indicating that the weft filament 222 has been ejected a predetermined distance. In some embodiments, the predetermined distance may represent a minimum distance required for a weft filament 222 to cover the distance between the two end columns of warp filaments 212e, 212h.

As shown in FIG. 6, weft inserter stack 220 may include channels 606 for directing weft filaments 222 from the inertial weft inserter roller pairs 602 to slits 608. The channels may be internal to the body of the weft inserter stack 220 such that the weft filaments 222 are constrained to movement along the paths defined by the channels 606. The slits 608 may be apertures at the edge of the weft inserter stack 220 that are positioned at different vertical heights along the front face of the device. In some embodiments, each adjacent slit 608 may be vertically spaced apart by a common offset distance. The positioning of the slits 608 may be configured to position the weft filaments 222 ejected by the weft inserter stack 220 so that each weft filament 222 may be inserted into the warp 300 at a desired vertical height as described in greater detail below with respect to FIGS. 7A through 12B.

After one or more weft filaments 222 have been inserted into warp 300, the weft filaments may be cut into discrete lengths by cutting apparatus 610. As shown in FIG. 6, in some embodiments, cutting apparatus may be positioned adjacent to slits 608, internally to the body of weft inserter stack 220. Cutting apparatus 610 may include one or more blades that are configured to be actuated to move within a vertical plane that is approximately perpendicular to the weft filaments 222 positioned at slits 608 to cut one or more weft filaments 222. For example, in some embodiments, cutting apparatus may include blades configured to move in unison. In some embodiments, the number of the blades may correspond to the number of slits 608. In some embodiments, cutting apparatus may be a cutting wheel or disc, a laser, or a waterjet.

Although the embodiment shown in FIG. 6 depicts only three weft inserters, it is contemplated that a weft inserter stack 220 having any number of weft inserters may be similarly constructed by adding more inertial weft inserter roller pairs 602, channels 606, and slits 608. Further, although this embodiment uses inertial weft inserter roller pairs 602 to generate the propulsion/ejection force of the weft filaments 222, as discussed above, a weft inserter stack 220 may alternatively be constructed using one or more rapier weft inserters, air-jet inserters, or some combination of thereof.

FIGS. 7A-8B show representations of cutaway views of a continuous composite weaving machine 100, viewed from the perspective of roller assembly 116 looking towards warp rack 110, according to exemplary embodiments. As shown in FIG. 7A, continuous composite weaving machine 100 may have warp heads 402a, 402b, 402c, 402d, each having warp filaments 212 that extend towards roller assembly 116, forming a warp 300 as discussed above with respect to FIG. 3B. In this embodiment, each of the warp heads 402 supports four warp filaments 212. The continuous composite weaving machine 100 includes a weft inserter stack 220 positioned to the side of the warp heads 402 and configured to insert weft filaments 222 into the warp 300 (i.e., between two rows of warp filaments 212). Each of the warp heads 402 shown in FIG. 7A may be said to be in a "neutral position," meaning that the warp heads 402 are positioned at a default height. For example, the neutral position may be a position in which the warp heads 402 are positioned such about the vertical middle of the weft inserter stack 220.

For example, when in the neutral position, a warp head 402 may be positioned such that the middle-most weft inserter 702 of weft inserter stack 220 is aligned to insert a middle weft filament 222b between the two middle-most rows of warp filaments 212 of the warp head 402. As shown by FIG. 7A, when all of the warp heads 402 are in the neutral position, the weft inserter stack 220 may insert weft filaments 222 between the warp filaments 212 to create a weave pattern with no interlacing such that the resulting woven composite material 230 would be an alternating 0-90 unidirectional composite.

As shown in FIG. 7A, in some embodiments, weft inserter stack 220 may include primary weft inserters 702 and secondary weft inserters 704. Primary weft inserters 702 may be positioned vertically in the middle portion of weft inserter stack 220, whereas secondary weft inserters 704 may be positioned in the top and bottom portion of the weft stack 220. In some embodiments, primary weft inserters 702 may be weft inserters that can be used in any vertical configuration of warp heads 402, whereas secondary weft inserters 704 may only be used if one or more warp heads 402 move a sufficient vertical distance such that a weft filament 222 expelled by secondary weft inserter 704 would be positioned between at least one pair of warp filaments 212. Each primary weft inserter 702 and secondary weft inserter 704 may be controlled independently of one another by controller 260 such that weft filaments 222 may be simultaneously inserted into the warp 300 in using any combination of weft inserters 702, 704.

FIGS. 7B and 7C show an example process for creating a woven composite material 230 with interlacing between warp filaments 212 and weft filaments 222. As shown in FIG. 7B, three of the warp heads 402a, 402c, 402d are in the neutral position and one warp head 402b is in a vertically elevated position at the time weft inserter stack 220 inserts weft filaments 222 into the warp 300. As shown, warp head 402b is elevated such that secondary weft inserter 704a is able to insert a weft filament 222a between the top pair of warp filaments 212 extending out of warp head 402b. It may be said that in this case, warp head 402b has been elevated one "step." When a warp head 402 moves up or down a step it means that the set of weft inserters 702, 704 that the warp head 402 is positioned to receive weft filaments 222 from between a pair of warp filaments 222 changes by one unit.

For example, as shown in FIG. 7B, because warp head 402b has gone up one step, it is positioned to receive a weft filament 222a from secondary weft inserter 704a between a pair of warp filaments 212, but it is no longer positioned to receive a weft filament 222d between a pair of warp filaments 212 from primary weft inserter 702c. As shown in FIG. 7C, when warp head 402b returns from a position of being elevated one step back to the neutral position, each warp filament 212 of warp head 402b pushes down on the weft filament 222a, 222b, 222c, 222d beneath it, causing the interlacing weave pattern shown in FIG. 7C. After this weave pattern has been created, roller assembly 116 may pull the portion of the warp filaments 212 containing weft filaments 222a, 222b, 222c, 222d into the first pair of rollers 120 to carry out the process of compressing the filaments into a woven composite material 230, as described previously above.

Continuous composite weaving machine 100 may continuously create a woven composite material 230 as long as roller assembly 116 continues to pull and draw in warp filaments 212 from filament spools 210 via warp rack 110. In addition to continuously creating a woven composite material, continuous composite weaving machine 100 may also dynamically change the weave pattern to create woven composite materials 230 having customizable strength and stiffness properties. The strength of a woven composite material 230 is a function of the fabric geometry, which may be controlled by continuous composite weaving machine 100. For example, high amounts of crimp may reduce in-plane tensile strength and layer-to-layer interlocking may increase delamination strength and impact strength. Stiffness is a function of fabric geometry and weave density, which may also be controlled by continuous composite weaving machine 100. For example, dense weaves may be stiffer than less dense weaves. Plain weaves may have higher in-plane shear modulus, while satin weaves have higher in-plane tensile modulus, and twill weaves are somewhere in-between.

Figures 8A, 8B:
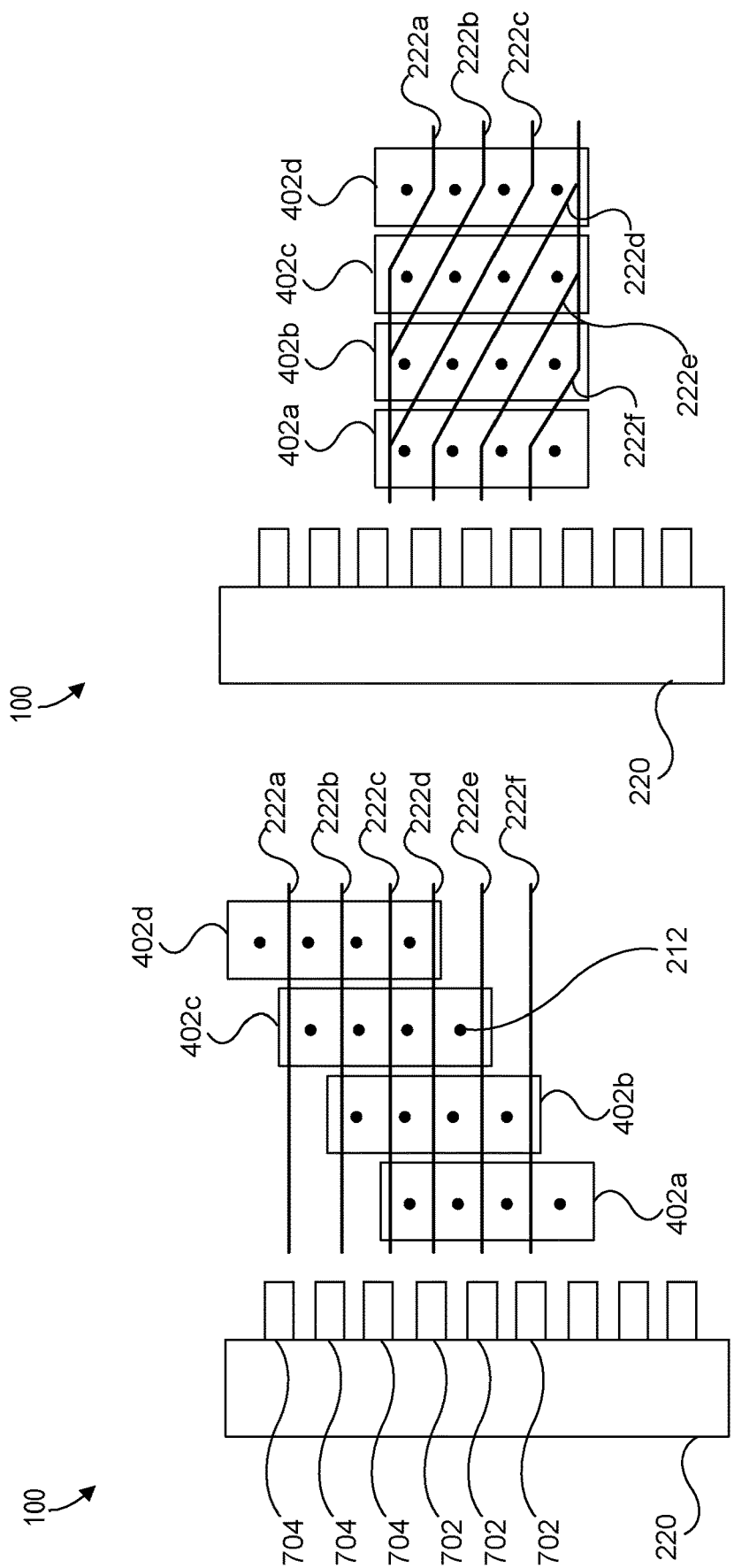
FIGS. 8A and 8B are representative front cutaway views of a continuous composite weaving machine showing another example of filament interlacing that occurs as warp heads move from a first vertical configuration (FIG. 8A) to a second vertical configuration (FIG. 8B) in accordance with an exemplary embodiment.

Continuous composite weaving machine 100 can generate a woven composite material 230 having different properties throughout the material by dynamically changing the fabric geometry and/or weave density of portions of the woven composite 230. For example, FIGS. 8A and 8B show an example process for creating an alternative weave pattern to that shown in FIGS. 7B and 7C. As shown in FIG. 8A, each warp head 402a, 402b, 402c, 402d may be positioned at a different step at the time weft inserter stack 220 inserts weft filaments 222 into the warp 300. In this example, a first warp head 402a is positioned in a neutral position, a second warp head 402b is positioned up one step, a third warp head 402c is positioned up two steps, and a fourth warp head 402d is positioned up three steps.

Accordingly, warp filament 212 pairs of the first warp head 402a are positioned to receive weft filaments 222d, 222e, 222f from the three primary weft inserters 702, and warp filament 212 of the fourth warp head 402d are positioned to receive weft filaments 222a, 222b, 222c from the three secondary weft inserters 704, with the warp filament 212 pairs of the second and third warp heads 402*b*, 402*c* receiving weft filaments 222 from a combination of primary and secondary weft inserters 702, 704 as shown in FIG. 8A. After the weft inserter stack 220 inserts weft filaments 222*a*, 222*b*, 222*c*, 222*d*, 222*e*, 222*f* into the warp 300, the elevated warp heads 402*b*, 402*c*, 402*d* return to the neutral position, pushing the weft filaments 222*a*, 222*b*, 222*c*, 222*d*, 222*e*, 222*f* downwards to create the interlacing pattern as shown in FIG. 8B. In this example, three weft filaments 222*d*, 222*e*, 222*f* converge at the bottom of warp head 402*d*, which may create a localized region with improved in-plane strength and stiffness but may have worse impact strength and shear strength and stiffness. Weave patterns formed where one or more warp heads 402 move up steps and one or two warp heads 402 remain in a neutral position at the time of weft insertion may result in woven composite structures with enhanced impact strength due to layer-to-layer interlacing.

It should be appreciated that the weave patterns illustrated by FIGS. 7A-8B may be sequentially integrated into a single piece of woven composite material 230. It should be further appreciated that the particular weave patterns illustrated by FIGS. 7A-8B are merely illustrative and any number or variety of different weave patterns may be achieved and integrated into a composite material 230 in any sequence by changing the vertical positions of the warp heads 402 between subsequent insertions of one or more weft filaments 222. The number of possible weave patterns may further be expanded by adding more warp filaments 212, warp heads 212, and/or weft inserters 702, 704 to machine 100.

For case of explaining the concepts disclosed herein, FIGS. 7A-8B illustrate exemplary embodiments of a continuous composite weaving machine 100 having four warp heads 402, however continuous composite weaving machine 100 is not so limited and may include any number of warp heads 402. For example, continuous composite weaving machine 100 may have ten or more warp heads 402.

FIG. 9A is a representative side view of a continuous composite weaving machine 900 having an alternative warp rack comprising heddle assemblies 902, according to an exemplary embodiment. In contrast to warp head 402, which can vertically adjust the collective positions of warp filaments 212 associated the warp head 402, heddle assembly 902 includes heddles 904 that that enable each individual warp filament 212 associated with heddle assembly 902 to be individually vertically adjusted by one of the heddles 904 of heddle assembly 902. Each heddle assembly 902 includes heddles 904*a*, 904*b*, 904*c*, 904*d*. Each of the heddles 904 has an eye 910 for engaging a warp filament 212 that may be vertically adjusted by the heddle 904 and a slot 912 for allowing other warp filaments 212 that may not be vertically adjusted by the heddle 904 to pass through.

The warp filament 212 that a given heddle 904 is configured to individually control may pass through the eye 910 of the heddle 904, whereas each warp filament 212 to be controlled by a different heddle 904 of the heddle assembly 902 may either pass through a slot 912 of the heddle 904 or may pass underneath the bottom of the heddle 904 as shown in FIGS. 9A and 9B. Each heddle 904 is capable of independent vertical movement, like the movement described above with respect to warp heads 402 of FIGS. 4A and 4B. When a particular heddle 904 moves, the height of the portion of the warp filament 212 held by the eye 910 will be adjusted to follow the movement of the heddle 904.

Like the warp heads 402 shown in FIGS. 4A and 4B, the heddle assemblies 902 are aligned adjacent to one another in a first vertical plane. As shown in FIG. 9A, individual heddles 904 of a heddle assembly 902 may be aligned adjacent to one another in a second vertical plane that is approximately perpendicular to the first vertical plane. For example, as shown in FIG. 9A, a first heddle 904*a* is adjacent to a second heddle 904*b*, which is further adjacent to a third heddle 904*c*, which is further adjacent to a fourth heddle 904*d*. Accordingly, the heddles 904 of a heddle assembly 902 may be positioned back-to-back as shown in FIG. 9A. Each of the heddle assemblies 902 may be actuated in a manner like warp heads 402, such as for example, driving a lead screw with a motor, a solenoid, a pneumatic or hydraulic actuator, or any other such method of providing vertical movement. Also like warp heads 402, the vertical movement of each heddle may be constrained by base plate 121 and top plate 122, limit switches, beam-based sensors, or encoders on the motors that drive the motion of the heddle assemblies.

FIG. 9B shows an exploded view of a heddle assembly 902'. As shown in the exploded heddle assembly 902', a first heddle 910*a* has an eye 910 for receiving a first warp filament 212*a* that may be individually vertically controlled by first heddle 910*a*. Exploded heddle assembly 902' further shows that a second heddle 910*b* has an eye 910 for receiving a second warp filament 212*b* that may be individually vertically controlled by second heddle 910*b* and a slot 912 for receiving the first warp filament 212*a*. A third heddle 910*c* of heddle assembly 902 has an eye 910 for receiving a third warp filament 212*c* that may be individually vertically controlled by third heddle 910*c*, and a slot 912 for receiving the first warp filament 212*a* and the second warp filament 212*b*. A fourth heddle 904*d* of heddle assembly 902 has an eye 910 for receiving a fourth warp filament 212*d* that may be individually vertically controlled by fourth heddle 910*d*, and a slot 912 for receiving the first warp filament 212*a*, the second warp filament 212*b*, and the third warp filament 212*c*.

FIG. 9C shows a front view of heddle assembly 902" in which each heddle 904*a*, 904*b*, 904*c*, 904*d* is positioned in a back-to-back configuration as shown in FIG. 9A. When aligned in a back-to-back configuration the first warp filament 212*a* may pass through the slots 912 of the fourth, third, and second heddles 904*d*, 904*c*, 904*b* before passing through the eye 910 of the first heddle 904*a* and then extending towards roller assembly 116. Similarly, the second warp filament 212*a* may pass through the slots 912 of the fourth and third heddles 904*d*, 904*c* before passing through the eye 910 of the second heddle 904*d* and then extending towards roller assembly 116 beneath first heddle 904*a*.

The third warp filament 212*c* may pass through the slot 912 of the fourth heddle 904*d* before passing through the eye 910 of the third heddle 904*c* and then extending towards roller assembly 116 beneath first and second heddles 904*a*, 904*b*. Further, the fourth warp filament 212*d* may only pass through the eye 910 of the fourth heddle 904*d* and then extending towards roller assembly 116 beneath first, second, and third heddles 904*a*, 904*b*, 904*c*. Accordingly, first warp filament 212*a* is individually vertically controllable by first heddle 904*a*, second warp filament 212*b* is individually vertically controllable by second heddle 904*b*, third warp filament 212*c* is individually vertically controllable by third heddle 904*c*, and fourth warp filament 212*d* is individually vertically controllable by fourth heddle 904*d*.

As can be seen in FIG. 9A, because some warp filaments 212*b*, 212*c*, 212*d* may be positioned beneath some heddles 904*a*, 904*b*, 904*c* (e.g., warp filament 212*d* runs below heddles 904*a*, 904*b*, 904*c* before entering roller assembly 116), the extent to which a given heddle 904 may move vertically downwards may be limited based on the positions of the heddles 904 adjacent to it to prevent the bottom of a heddle 904 from coming into contact with a warp filament 212 beneath it, unless the adjacent heddles move as well. For example, for the second heddle 904b shown in FIG. 9A to move down two steps, the third and fourth heddles 904c, 904d would also have to move down at least two steps to accommodate the second heddle's 904b movement. In some embodiments, heddles 904 may be configured to only move in a downwards direction from the neutral position but may be configured to move in an upwards direction to return to a neutral position or a position that is one or more steps below the neutral position. A neutral position may be a position in which the heddles 904 are positioned such that each eye 910 of a heddle is positioned one step below the eye 910 of the heddle in front of it, as shown in FIGS. 9A and 9C. According to some embodiments, heater elements may be included in heddle assembly 902, but other heating elements (e.g., infrared or microwave heating elements) may be placed in the area between the heddle assemblies 902 and the first pair of rollers 120 to heat the filaments above the glass transition temperature of the matrix polymer.

FIGS. 10-12B show a representative cutaway views of a continuous composite weaving machine 900, viewed from the perspective of roller assembly 116 looking towards warp rack 110, according to exemplary embodiments. As shown in FIG. 10, continuous composite weaving machine 900 may include a weft stack inserter 220 like that previously described above with respect to FIG. 6 and heddle assemblies 902a, 902b, 902c, 902d, as described above with respect to FIGS. 9A-9C. FIG. 10 shows a configuration in which each heddle assembly 902a, 902b, 902c, 902d is in a neutral position such that warp filaments extending out of each eye 910 of the heddle assemblies 902a, 902b, 902c, 902d form a warp positioned to receive weft filaments 222 without interlacing, similar to the embodiment shown in FIG. 6.

FIGS. 11A-11B illustrate the process of forming an interlaced weave pattern by a continuous composite weaving machine 900. As shown in FIG. 11A, three of the heddle assemblies 902a, 902c, 902d of a continuous composite weaving machine 900 are in a neutral position, but one heddle assembly 902b is in a position that is down one "step." When referring to heddle assemblies 902, a "step" may refer to the downward movement of the heddle assembly 902 such that the eye 910 of the heddle 904 forces the warp filament 212 contained within the eye 910 below the next weft inserter 702, 704 of the adjacent weft inserter stack 220. For example, one step down may indicate that the eye 910 of a heddle 904 has moved vertically beyond the plane in which the next weft inserter 704 is configured to insert a weft filament 222. As shown in FIG. 11A, the second heddle assembly's 902b fourth heddle 904d has moved down one step prior to the insertion of weft filaments 222a, 222b, 222c, 222d by weft inserter stack 220.

Note that because the top three warp filaments 212a, 212b, 212c pass through the slot 912 of the fourth heddle 904d, their vertical positions are left unchanged by the movement of the fourth heddle 904d, which only affects the vertical position of the warp filament 212d engaged by the eye 910 of the fourth heddle 904d. After the weft filaments 222 have been inserted into the warp, the fourth heddle 904d of the second heddle assembly moves up a step, returning to the neutral position, forming an interlacing weave as shown in FIG. 11B. FIGS. 12A-12B show another embodiment of an interlacing weave pattern formed by a continuous composite weaving machine 900. As shown in FIG. 12A, a first heddle assembly 902a is in a neutral position, the fourth heddle 904d of the second heddle assembly 902b is down one step, the fourth heddle 904d of the third heddle assembly 902c is down two steps, and the fourth heddle 904d of the fourth heddle assembly 902d is down three steps at the time of insertion of the weft filaments 222a, 222b, 222c, 222d, 222e, 222f by the weft inserter stack 220. Following the retraction, the fourth heddles 904d of the second, third, and fourth heddle assemblies 902b, 902c, 902d back to the neutral position, an interlacing pattern as shown in FIG. 12B is formed.

Although the figures only show examples in which the fourth heddle 904d of the heddle assemblies 902 moves down one or more steps, the first, second, and third heddles 904a, 904b, 904c of a heddle assembly 902 may all independently move vertically down to dynamically create a variety of intricate interlacing weave patterns as the warp is continuously drawn forward and compressed by roller assembly 116. For example, if the fourth heddle 904d of a heddle assembly 902 is down three steps, then the third heddle 904c may move down one, two, or three steps. In other words, if a particular heddle 904 of a heddle assembly 902 moves down several steps, then the adjacent heddle 904 in positioned in front of the particular heddle 904 may be enabled to move down the same number of steps or less.

Figure 13:
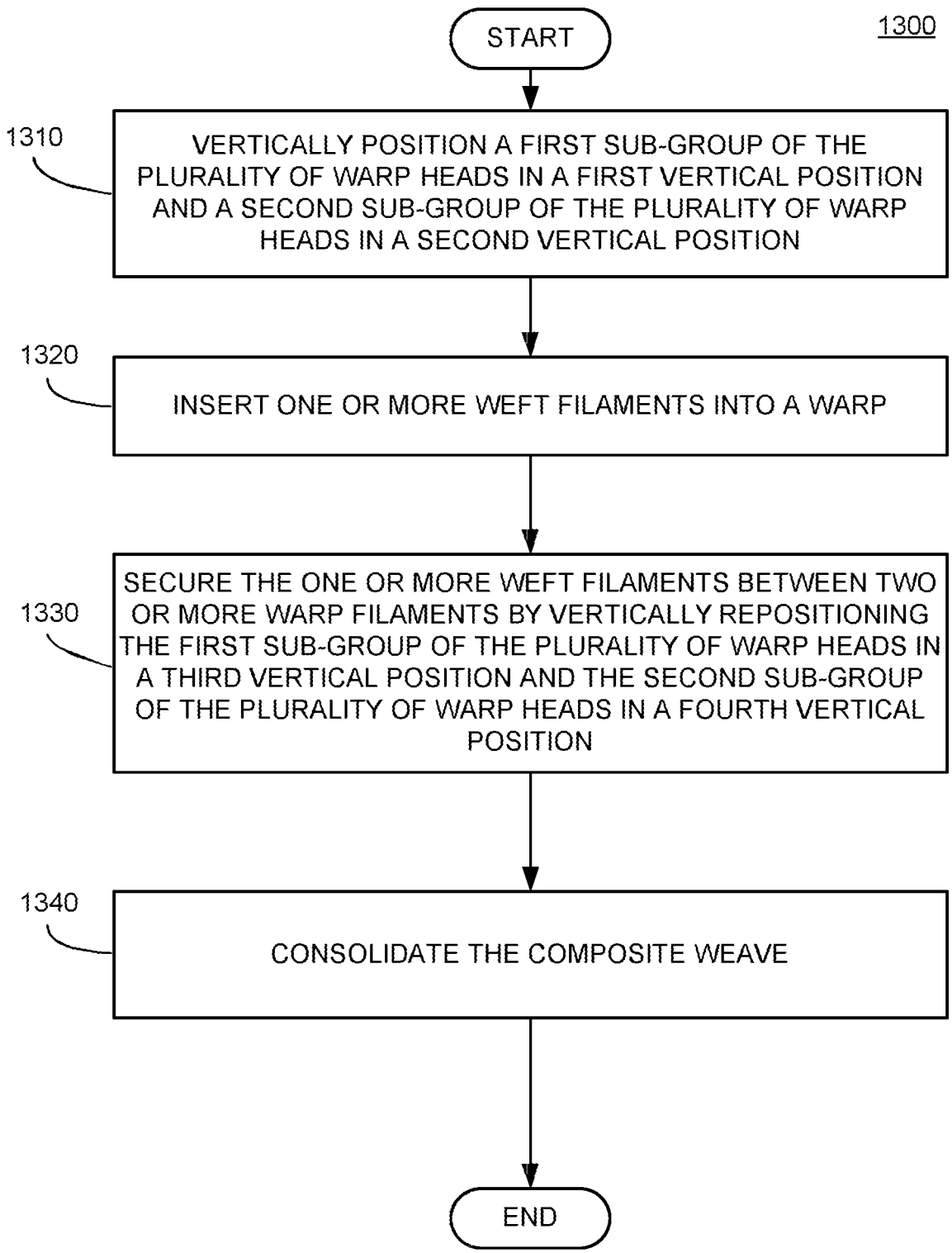
FIG. 13 is a flowchart of a method for continuously forming a composite weave in accordance with an exemplary embodiment.

FIG. 13 shows a flowchart of a method 1300 for continuously forming a woven composite material using a continuous composite weaving machine 100. Continuous composite weaving machine 100 may have warp filaments suspended between a roller assembly 116 and a warp rack 110 that comprises warp heads 402. Each warp head 402 may comprise filament channels 502 positioned at different vertical locations along the height of the warp head 402 (as shown in FIG. 5A). Each filament channel 502 may be configured to engage a warp filament 212, and each warp head 402 may be capable of independent vertical movement to adjust the height of warp filaments 212 associated with the respective warp head 402 relative to the roller assembly 116.

At block 1310, the method may include vertically positioning a first sub-group of the warp heads 402 in a first vertical position and a second sub-group of the warp heads 402 in a second vertical position such that the vertical height of each warp filament 212 in a filament channel 502 of a warp head 402 of the first sub-group of the warp heads 402 is higher than a warp filament 212 in a corresponding filament channel 502 of a warp head 402 of the second sub-group of the warp heads 402.

At block 1320, the method may include inserting (e.g., by weft inserter stack 220) one or more weft filaments 222 into a warp 300 that is positioned between the roller assembly 116 and the warp rack 110, such that each weft filament 222 is inserted between a warp filament 212 associated with the first sub-group of the warp heads 402 and a warp filament 212 associated with the second sub-group of the warp heads 402. A weft filament 222 may be inserted into the warp 300 such that warp filaments 212 associated with the first sub-group of the warp heads 402 are positioned above the weft filament 222 and warp filaments 212 associated with the second sub-group of the warp heads 402 are positioned below the weft filament 222.

Weft inserter stack 220 may simultaneously insert multiple weft filaments 222 at different heights of the warp 300. Each weft filament 222 that is simultaneously inserted into warp 300 may have a different sub-group of warp filaments 212 positioned above the weft filament 222 and a different sup-group positioned below the weft filament 222. In this manner, based on the vertical positions of the warp heads 402 and the number and vertical positions of the inserted weft filaments 222, continuous composite weaving machine 100 may place weft filaments 222 into the warp 300 so that a customized predetermined internal geometry of the weave may be achieved.

At block 1330, the method may include securing the one or more weft filaments 222 between two or more warp filaments 212 to form a composite weave by vertically repositioning the first sub-group of the warp heads 402 in a third vertical position and the second sub-group of the warp heads 402 in a fourth vertical position such that the vertical height of each warp filament 212 in a filament channel 502 of a warp head 402 of the first sub-group of the warp heads 402 is lower than a warp filament 212 in the corresponding filament channel 502 of a warp head 402 of the second sub-group of the warp heads 402. Alternatively, in some embodiments, the third and fourth vertical positions may be the same vertical height, such that the warp heads 402 associated with the first and second sub-groups of warp filaments 212 return to, for example, a neutral position. In a neutral position, the filament channels 502 of each of the warp heads 402 may be vertically aligned such that they form rows.

At block 1340, the method may include consolidating the composite weave by activating the roller assembly 116 to draw the composite weave through a pair of opposing rollers (e.g., the first pair or rollers 120) that are configured to heat and compress the composite weave. Continuous composite weaving machine 100 may continually form a composite weave by repeating blocks 1310, 1320, 1330, and 1340 in sequence. The vertical positions of the sub-groups of warp heads 402 may change during each iteration of this ongoing process in order to create a composite weave of a specified internal geometry. For example, controller 260 may contain instructions that specify a particular sequence of movements of warp heads 402 along with a particular sequence of weft filament 222 insertions to create a woven composite material 230 that has a specified internal geometry that may utilize interlacing. In some embodiments, roller assembly 116 may be activated for short bursts following each subsequent insertion of one or more weft filaments 222 into the warp 300 to consolidate the portion of the composite weave that includes the newly inserted weft filaments 222. In some embodiments, warp heads 402 may return to a neutral position after an insertion of one or more weft filaments 222 is performed and prior to the activation of roller assembly 116.

In some embodiments, method 1300 may optionally include a step of creating the warp 300 between the roller assembly 116 and the warp rack 110 by feeding a free end of each of warp filament 212 originating from filament spools 210 through a unique filament channel 502 of one of warp heads 402 of the warp rack 110 and then further feeding the free end of each of the warp filaments 212 through a pair of opposing rollers of roller assembly 116 (e.g., first pair of rollers 120).

Although method 1300 is described with respect to a continuous composite weaving machine 100 that utilizes a warp rack 110 having warp heads 402, a similar method may also be carried out for a continuous composite weaving machine 900 that utilizes heddle assemblies 902 and having a configuration as described above with respect to FIGS. 9A-9C. For example, heddles 904 of a first sub-group of the heddle assemblies 902 may be vertically positioned in a first vertical configuration and a second sub-group of the heddles 904 of a second sub-group of the heddle assemblies 902 may be positioned in a second vertical configuration to form a warp 300. Weft inserter stack 220 may insert one or more weft filaments 222 into the warp 300 at different vertical heights such that each inserted weft filament 222 has a different sub-set of warp filaments 212 positioned above and below it. Some or all of the heddles 904 of the first and second sub-groups of the heddle assemblies 902 may change to a different vertical configuration to secure the one or more weft filaments 222 within the weave.

For example, all of the heddles 904 may return to a neutral position. After the one or more weft filaments 222 are secured within the weave, a pair of rollers (e.g. the first pair or rollers 120) may be activated to draw in the portion of the weave containing the one or more weft filaments 222 and roller assembly 116 may consolidate the composite weave 230 as described above. This process may be repeated by continuous composite weaving machine 900 to continuously form a composite weave having a controllable internal geometry.

According to some embodiments, after a woven composite material 230 has been formed by continuous composite weaving machine 100, the woven composite material 230 may then be preformed, trimmed, and/or shaped into three-dimensional structures using traditional injection molding or long fiber thermoplastic molding. For example, after exiting roller assembly 116, woven composite material 230 may be trimmed using, for example, a water jet, a laser, a shear press, or any other suitable device of method of trimming. Accordingly, in some embodiments, a composite weaving machine 100 may include a trimming device configured to trim the woven composite material 230 after it exits roller assembly 116. A trimming device may be, for example, a computer numerical control (CNC) waterjet.

The trimmed composite may then be heated and stamped/pressed into a preform shape. For example, in some embodiments, a composite weaving machine 100 may include a stamping press that may press the trimmed composite into a preformed shape. In some embodiments, composite weaving machine 100 may include a robot arm to pick up the trimmed composite and place it in the stamping press. Heating can be performed using, for example, an oven, induction heating, or any other suitable heating method. The preform may then be placed in a compression mold or injection mold and over-molded (e.g., injection, DLFT, LFT, etc.). In some embodiments, composite weaving machine 100 may include an injection molding machine for injection molding or over-molding the preform.

In some embodiments, composite weaving machine 100 may include a robot arm that is configured to pick up the preformed shape from the stamping press and place it in the injection molding machine. The process of over-molding may allow for texturizing of the preform and the creation of non-structural protruding features. The preform may be over-molded multiple times to add different materials to the preform or add materials to different sides or portions of the preform. Following the over-molding process, the part may be removed from the mold and trimmed and finished. For example, the part may have edges trimmed, holes drilled into it, it may be sanded down, or any other such typical finishing process may be applied to the part. In some embodiments, composite weaving machine 100 may include a robot arm configured to pick up the over-molded preform and place it in a device that is configured to trim and finish the part. A variety of shapes may be formed using this process, including, for example but not limited to, brackets and panels (such as vehicle body panels) with flat or curvilinear contour.

For example, a two-piece car door could be formed by preforming the woven composite into the shape of the outer surface of the door panel. In this example, a first piece may be creating by a first over-molding shot that may allow the formation of a smooth airflow surface and a second over-molding shot that forms the internal surface of the door (e.g., forming channels for wiring, window, handle, etc.). Once the internal components of the door (e.g., wiring, window, handle, etc.) are installed into the channels of the first piece, a second piece may be joined to the first piece to encase the internal components. The second piece may also contain a woven preform, if needed for structural stiffness.

Although the prior example illustrates a particular industrial application of a preform created from a woven composite material 230 fabricated by a continuous composite weaving machine 100, those of skill in the art will appreciate that such preforms may have a variety of different industrial applications.

In some embodiments, the process of trimming, stamping, injection molding/overmolding, and trimming and finishing of a woven composite material 230 described above could be performed continuously by using die stamping for the preliminary trimming, preforming, and overmolding. The die stamping may be run off of a continuous stock during the press operation. Following this process, final trimming may be performed as described above. In some embodiments, the continuous composite weaving machine 100 may not have a cooled rollers (e.g., the second pair of rollers 130 may be omitted) because the composite may need to remain above $T_m$ before the preforming step.

FIG. 14 shows a representative side view of an embodiment of a continuous composite weaving machine 100 that is configured to apply a polymer film 1402 to the top and/or bottom surface of the composite weave before it enters roller assembly 116. Polymer film 1402 may be a pure polymer film, a polymer-infused fiber mat, or a combination of the two. Rolls of polymer film 1402 on polymer film rollers 1404 can be positioned above and/or below the first pair of rollers 120. Roller assembly 116 (e.g., via the first pair of rollers 120) may draw polymer film 1402 off of polymer film rollers 1404 in a manner similar to how roller assembly draws warp filaments 212 from filament spools 210, as described above. Polymer film 1402 may laminate the top and/or bottom surface of the composite weave as it is consolidated by roller assembly 116. After being consolidated by roller assembly 116, the consolidation process may result in a consolidated woven composite material 230 that is a finished flat panel that can be used as-is or used in the overmolding process described above.

In some embodiments, one or more tapes may be transmission tapes that include transmission material. Transmission material can include any material suitable for conducting heat or transmitting data, signals, or electric current. Examples of transmission material can include metallic wire, optical fiber and metallic or light guide material. The mechanical and processing parameters of a transmission tape may vary depending on the type of transmission material used and the desired functionality.

For example, in some embodiments, transmission material may be enclosed between two tapes during the consolidation process. As an example, FIG. 15A illustrates an exploded view of a transmission tape 1800 that may be formed during consolidation. Transmission tape 1800 includes top tape 1830 overlaying bottom tape 1810 with transmission wire 1820 positioned between them. An example of transmission wire 1820 can include transmission material in a wire form. Prior to consolidation, bottom tape 1810 and top tape 1830 may not be fused together but may act as a single warp or weft tape during consolidation. After consolidation, bottom tape 1810 and top tape 1830 may be fused together, enclosing transmission wire 1820 between them. FIG. 15B illustrates a cross section of an example transmission tape 1800 from FIG. 15A that includes multiple transmission wires 1820. Top tape 1810 overlays bottom tape 1830. Transmission wires 1820 are positioned between top tape 1810 and bottom tape 1830. In this example, top tape 1810 and bottom tape 1830 have already been fused together, resulting in transmission wires 1820 being enclosed between them.

FIG. 15C illustrates an exploded view of transmission tape 1850 that is similar to transmission tape 1800 in FIG. 15A, except transmission tape 1850 includes a transmission ribbon 1870 instead of transmission wire 1820. An example of transmission ribbon 1870 can include transmission material in a ribbon form. Transmission ribbon 1870 is positioned between top tape 1860 and a bottom tape 1880 during consolidation. After consolidation, top tape 1860 and bottom tape 1880 may be fused together, enclosing transmission ribbon 1880 between them.

Figure 15D:
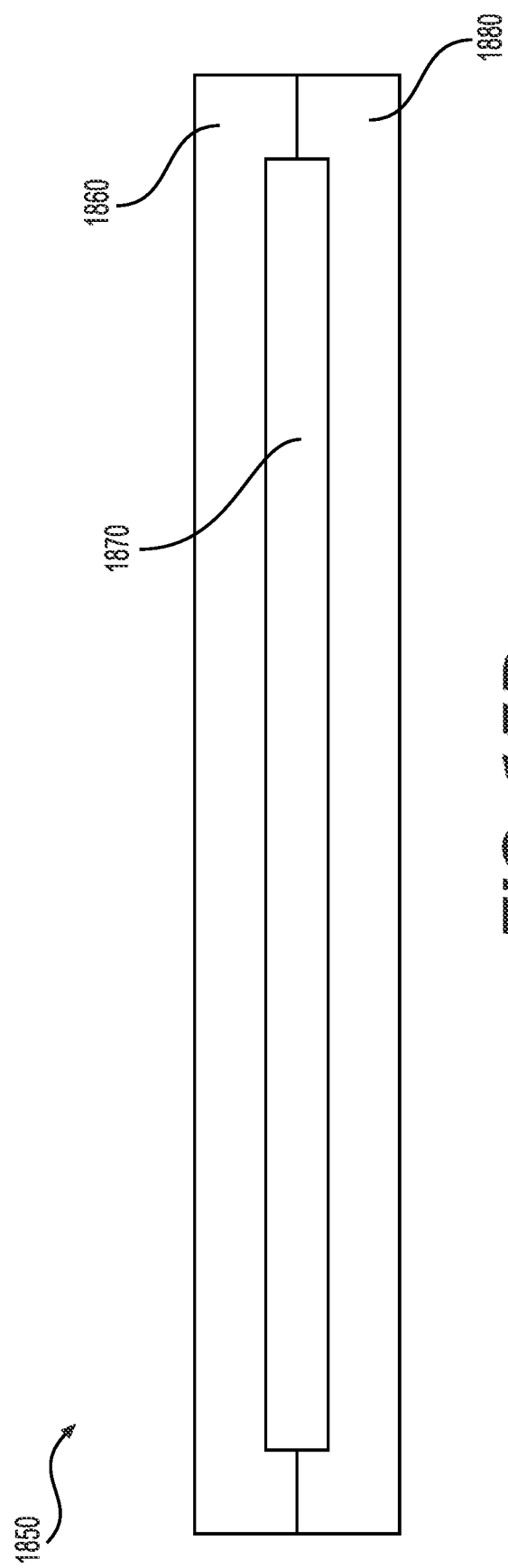
FIG. 15D illustrates one example of a cross section of transmission material enclosed between two tapes in accordance with the present disclosure.

FIG. 15D illustrates a cross section of an example transmission tape 1850 from FIG. 15B that includes transmission ribbon 1870. Top tape 1860 overlays bottom tape 1880. Transmission ribbon 1870 is positioned between top tape 1860 and bottom tape 1880. In this example, top tape 1860 and bottom tape 1880 have already been fused together, resulting in transmission ribbon 1870 being enclosed between them.

In some embodiments transmission tape 1800 and 1850 can be manufactured using methods described in paragraphs [0082]-[0086] and FIGS. 7A-9C of International Application No. WO 2017/200935 (incorporated herein in its entirety). For example, transmission wire 1820 or transmission ribbon 1870 could be fed into composite weaving machine 100 in the position one of the middle warp filaments, such as warp filaments 222b-c or 212b-c. The consolidation process described in paragraphs [0082]-[0086] would result in transmission wire 1820 or transmission ribbon 1870 being enclosed between at least one tape above and one tape below.

In some embodiments, the transmission material may be impregnated in a resin prior to consolidation. For example, FIG. 16 illustrates a cross-sectional view of a transmission tape 1900 that includes multiple impregnated transmission wires 1910. In contrast to transmission tape 1800 from FIGS. 15A-B, transmission wires 1910 are impregnated within a single tape, not between two tapes. When compared to impregnating transmission material during consolidation, preimpregnating transmission ribbon allows for use of higher performance filaments with greater structural support qualities, but at a greater monetary cost.

In these embodiments, the resin used may depend on the composition and use of the transmission material. As an example, a transmission tape may include transmission material that is metallic wire used for transmitting electric current. Transmitting electric current through metallic transmission material may cause the temperature of the transmission tape to increase. Such a transmission tape would require that the metallic transmission material be impregnated in a resin that can withstand the temperature increase. In one embodiment, the resin may be a thermoplastic polymer with a heat deflection point above the anticipated temperature increase in the transmission tape. In another embodiment, the resin may be a thermoset polymer. A thermoset polymer has the advantage of avoiding the risk of re-melting when heat is applied. In some examples, the resin selected should be compatible with resin used in other filaments in the lattice structure. For example, acrylonitrile butadiene styrene ("ABS") and polycarbonate are thermoplastic polymers that experience good adhesion. Also, resins in the same polymer family will bond to each other more readily, such as polyamides and polyesters. In contrast, if a nonpolar resin is used with a transmission tape and other filaments in the lattice structure have polar resin, the transmission tape would not bond to the other tapes during consolidation.

In some embodiments, increasing the temperature of the transmission tape may be desirable. For example, transmission tapes integrated into structural components of vehicles or aircrafts can be heated to defrost accumulated ice. Such embodiments may include transmission material made of resistance wire with high resistivity and oxidation resistance. For example, nichrome, an 80/20 alloy of nickel and chromium, is a commonly used resistance material used for heating purposes. Heating transmission tapes may require a resin that can withstand the higher temperatures created by the transmission material, such as a thermoset polymer.

In some embodiments, transmission tapes may absorb heat from a structural body. For example, some embodiments may include tapes with transmission material with high thermal conductivity, such as copper or aluminum. The transmission tape may absorb heat from the structural body, or component fastened to that structural body, such as circuit boards or batteries, in which the interlaced composite is integrated. This can aid in cooling the structural body or component. In examples where the transmission tape is a filament, the resin used must allow heat to pass through to the transmission ribbon. In some examples, it may be preferred that the transmission tape be composed entirely of transmission material to avoid potential obstacles from the conductivity of resin. In such examples, the heat from the structural body or component may then pass directly into the transmission material.

In some embodiments, a transmission tape containing metallic transmission material may need insulation from conductive material that may be used in other tapes. For example, in some embodiments the metallic transmission material may be part of a closed circuit. Carbon fiber is an example of a conductive material that may be used in tapes. If a weave includes a carbon fiber tape in contact with the metallic transmission material, some of the electric current passing through the metallic transmission material may transfer to the carbon fiber tape. Depending on the weave pattern, this can cause the circuit to short. In this example, a non-conductive material is needed between the metallic transmission material and carbon fiber tape to serve as an electrical insulator. For example, in some embodiments the metallic transmission material may be preimpregnated in a non-conductive resin.

Figure 17A:
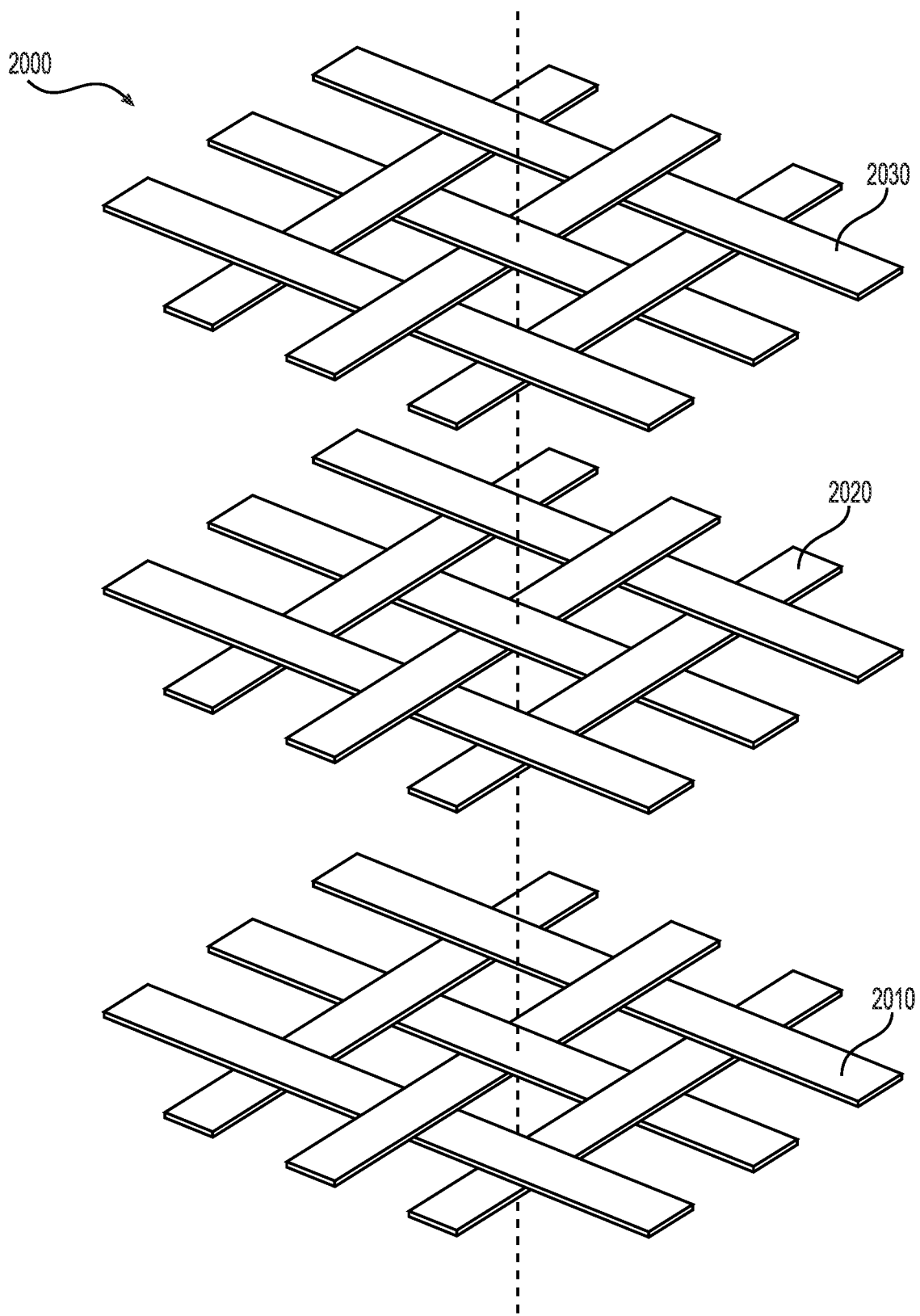
FIG. 17A is an exploded diagram of an interlaced composite that includes multiple weave layers in accordance with the present disclosure.

In other embodiments, an interlaced composite may include multiple weave layers with at least one non-conductive layer between two conductive layers such that the non-conductive layer electrically insulates the conductive layers from each other. As an example, FIG. 17A illustrates multi-layered composite 2000 that includes metallic transmission tape layer 2010, non-conductive tape layer 2020, and conductive tape layer 2030. Metallic transmission tape layer 2010 may include metallic transmission material that is part of a closed electrical circuit. Conductive tape layer 2030 may include conductive material, such as carbon fiber, that if put in direct contact with metallic transmission tape layer 2010 would cause the closed electrical circuit to short.

Non-conductive tape layer 2020 may be composed of non-conductive material, such as glass fiber, and configured between metallic transmission tape layer 2010 and conductive tape layer 2030 during consolidation. Non-conductive tape layer 2020 may prevent electrical current from passing to conductive tape layer 2030 from metallic transmission tape layer 2010. In some embodiments, multiple non-conductive tape layers 2020 may be used to increase the insulation.

FIG. 17B illustrates a cross-section of multi-layered composite 2000 from FIG. 17A (some out of plane tapes of the layers have been omitted). Metallic transmission tapes 2012 and 2014 are part of metallic transmission tape layer 2010. Metallic transmission tape 2012 includes transmission material 2016. Non-conductive tape 2022 is part of non-conductive tape layer 2020. Conductive tapes 2032 and 2034 are part of conductive tape layer 2030. In some embodiments, additional tapes, such as tapes 2014, 2032, and 2034, may also include transmission material. Non-conductive tape layer 2020 would protect such embodiments from the risk shorting electric circuits.

Figure 18:
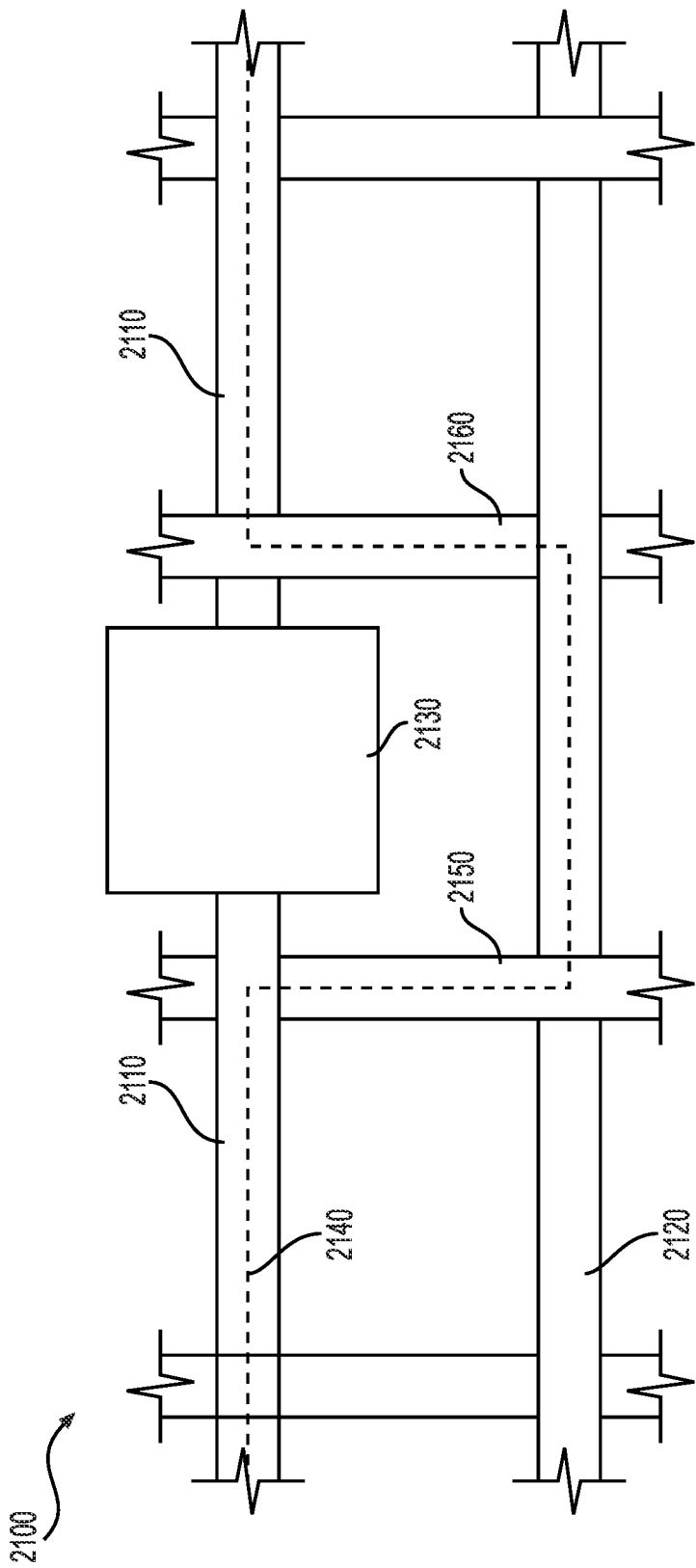
FIG. 18 depicts one example of a weave including transmission material.

In some embodiments, transferring electric current between warp and weft tapes may be desirable. For example, as shown in FIG. 18, a weave pattern 2100 may be formed with holes to accommodate structural gaps, such as a window of a vehicle. As depicted in FIG. 18, warp tape 2110 is not continuous due to structural gap 2130. Transmission material 2140 can circumvent structural gap 2130 by routing transmission material 2140 from the first portion of warp tape 2110 to weft tape 2150, to warp tape 2120, to weft tape 2160, and to the second portion of warp tape 2110 as shown. To transfer the electric current, the transmission tapes need to contact each other, either directly or through an additional component. In one embodiment, insulating material may be removed where the warp and weft tapes intersect, thus exposing the transmission material in the transmission tapes so that they come in direct contact where the transmission tapes intersect. In another embodiment, junction device may be applied where the transmission tapes meet. One example of a junction device can be a rivet or clinching device. The rivet or clinching device may penetrate the transmission tapes. In one embodiment, the rivet or clinching device secures the transmission material of the transmission tapes to each other. In another embodiment, the rivet or clinching device may be made of a conductive material, such as copper or aluminum, so that electric current may flow between the transmission material through the device. Another example of a junction device can be an optical fiber junction box. It is contemplated that there may be other methods in the art for connecting transmission material of transmission tapes.

Light guide material is another type of transmission material that may be incorporated into weave tapes. Light guide material is a transmission medium that can be used to direct light from one place to another. Some light guide material, such as optical fiber, allow for data transmission using light. Light guide material allows for transmissions over greater distances and at greater speeds than more traditional metallic wires. Additionally, light guide material is unaffected by electromagnetic interference, unlike metallic wires. However, some light guide material can be more delicate and subject to damage under lower stress levels than metallic wire. In such cases, tape fusing methods that apply lighter pressure to the weave may be preferred, such as heat or ultrasonic welding.

In some embodiments, light guide transmission material may be impregnated in a transparent or translucent filament material that allows light diffusion, such as acrylic, polycarbonate, polypropylene, or similar, to create a light guide transmission tape. Light passing through the light guide material may diffuse through the filament material, and the filament may then serve as a light source. For example, a weave containing such light guide transmission tapes may be incorporated into a semi-transparent roof structure, such as the roof of a vehicle. By activating the light source that passes light through the light guide material, the light guide transmission tape may provide cabin lighting.

In some embodiments, multiple warp and weft tapes in an interlaced composite may include metallic transmission material arranged so that the transmission material forms a grid. Such a grid may allow a structural body to detect touch or damage. For example, in one embodiment a grid can create a transparent electrode layer for a capacitive touch panel. In another embodiment, ultrasonic elastic waves may be transmitted as vibrations through the tapes creating a surface acoustic wave ("SAW") touch panel.

Integrating transmission material into interlaced composites allows data and power to run through structural bodies, which provides for numerous applications in addition to what has already been described herein. For example, an interlaced composite may include metallic transmission material connected to a radio frequency (RF) module. The metallic transmission material may act as an RF antenna for the RF module. Transmission material may be used to detect damage to a structural body as party of a security system or to detect damage before it becomes visible. Transmission material can also be used to detect tampering to a structural body, such as a utility cabinet. Additionally, transmission material can be used to accumulate life cycle data of structural bodies. For example, a vehicle including a processor and memory can store impact or damage information detected by the transmission material. Date and location data could be associated with the impact information to create a record of vehicle damage, in some examples.

Interlaced composites may include multiple transmission ribbons that perform different functions. For example, an interlaced composite may include metallic transmission ribbon acting as an RF antenna, fiber optic material providing lighting, additional fiber optic material providing data transfer, and additional metallic transmission material creating an electric grid to serve as a touchpad. In some embodiments, a single warp or weft tape may include transmission material types that perform different functions. It is contemplated that there may be any number of possible transmission material combinations that are possible insofar as they do not interfere with each other.

Integrating data and power transmission capabilities into interlaced composites as described herein can reduce the volume needed in many structural bodies that house electrical and other wiring. For example, the sizing and shape of many vehicle parts are restricted by the need to run electric components through the vehicle body. Vehicle doors have a minimum thickness required so that they may house wiring required for powering the windows and other functions. Additionally, the touch sensor capabilities of interlaced composites may replace bulkier buttons and knobs, such as for power windows and door locks. By integrating the wiring into the structural body of the door using integrated composites as described herein, the doors to a vehicle may be produced thinner and stronger, thus expanding the cabin space of the car without compromising safety.

Reinforced Concrete
Materials Tested

Six thermoplastic materials were tested for adhesion to both open mold and closed mold polymer concrete mixes. Five of the selected plastics were chosen based on potential compatibility for bonding with unsaturated polyester used in polymer concrete, and one plastic (polypropylene) was selected as a known non-polar control. All plastics with potential compatibility contain polar carbonyl group (oxygen double bonded to carbon) and several possess rings structures within or attached to the main backbone chain. The selected polymers were chosen in an effort to approximate the molecular structure of the UPR and increase the likelihood of participating in the UPR cross-linking reaction caused by the presence of the curing agent. The tested thermoplastic materials were:

polypropylene ("PP"), which has repeated subunits of:

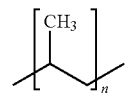

polyamide 6 ("nylon 6"), which has repeated subunits of:

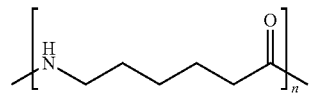

polyamide 6,6 ("nylon 6,6"), which has repeated subunits of:

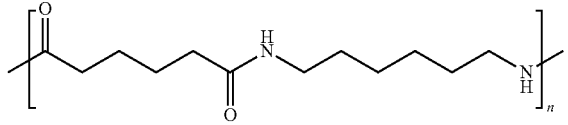

polyethylene terephthalate ("PET"), which has repeated subunits of:

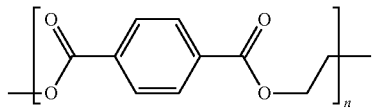

PETG, which is a copolymer of PET in which CHDM is added to the polymer backbone, but at lower levels than ethylene glycol ("EG"):

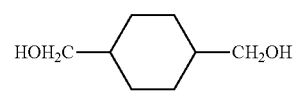

Ethylene Glycol (EG)   1,4 Cyclohexanedimethanol (CHDM)

and polycarbonate ("PC"), which has repeated subunits of:

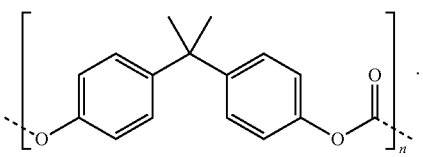

The diagram below illustrates an example polymerization process of PETG:

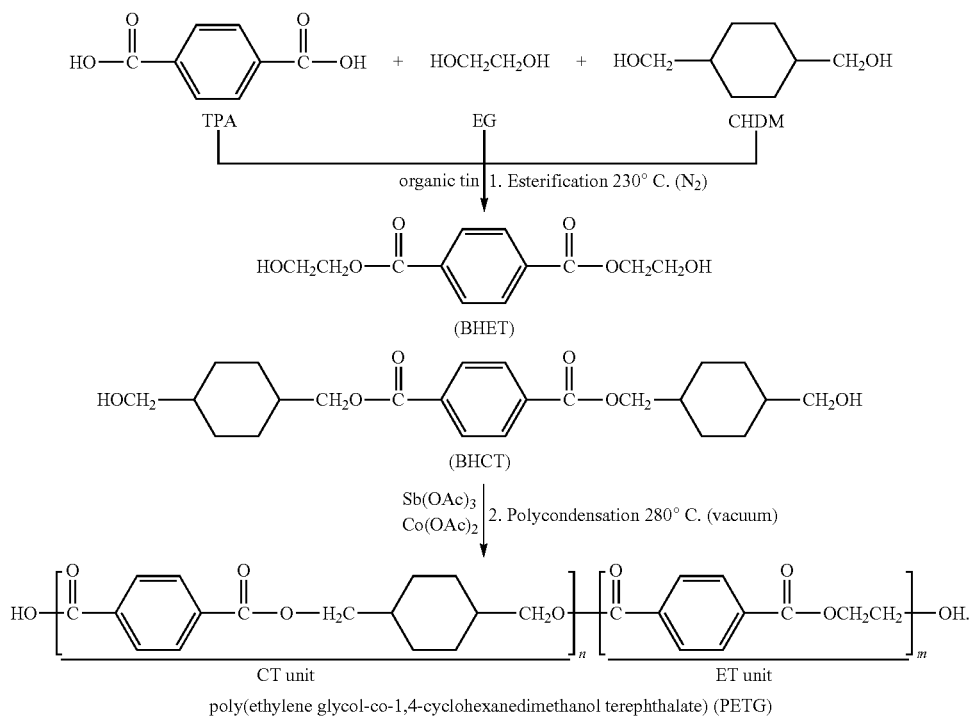

poly(ethylene glycol-co-1,4-cyclohexanedimethanol terephthalate) (PETG)

Preparation

In order to investigate the adhesion between the candidate thermoplastic polymers and the UPR-based polymer concrete, a modified lap shear test was performed. In preparation for this test, rectangular strips of consistent size were cut for each of the candidate thermoplastic polymers. Where required, the strips were lightly sanded to increase roughness in order to achieve similar surface roughness between each material. In order to identify any potential influence of molding type on the adhesive behavior, strips of each material were prepared in both open mold and closed mold curing processes, where they were combined with polymer concrete, such that the thermoplastic strip is approximately flush with the surface of the polymer concrete. In the open mold process, the polymer concrete was cured at room temperature and pressure. In the closed molded process, the polymer concrete was cured at elevated temperature and pressure. The elevated temperature can range from 150 degrees centigrade up to the degradation temperature of the material, but it is typically closer to the 150 degrees centigrade. The pressure can range from a pressure greater than atmospheric pressure up to the compressive strength of the material, but it is typically elevated to 100-300 psi.

After the polymer concrete was permitted to fully cure (approximately 24 hours for closed mold processes and approximately 72 hours for open molded processes), test specimens were cut from the polymer concrete using a water jet. FIGS. 19A and 19B illustrate an example of a test specimen 3100 after the water jet cuts. 3120 identifies the thermoplastic strip and 3110 identifies the polymer concrete. Notches 3130 and 3140 were created when the specimen was cut to create the necessary lap shear region 3150.

Testing

Figure 20:
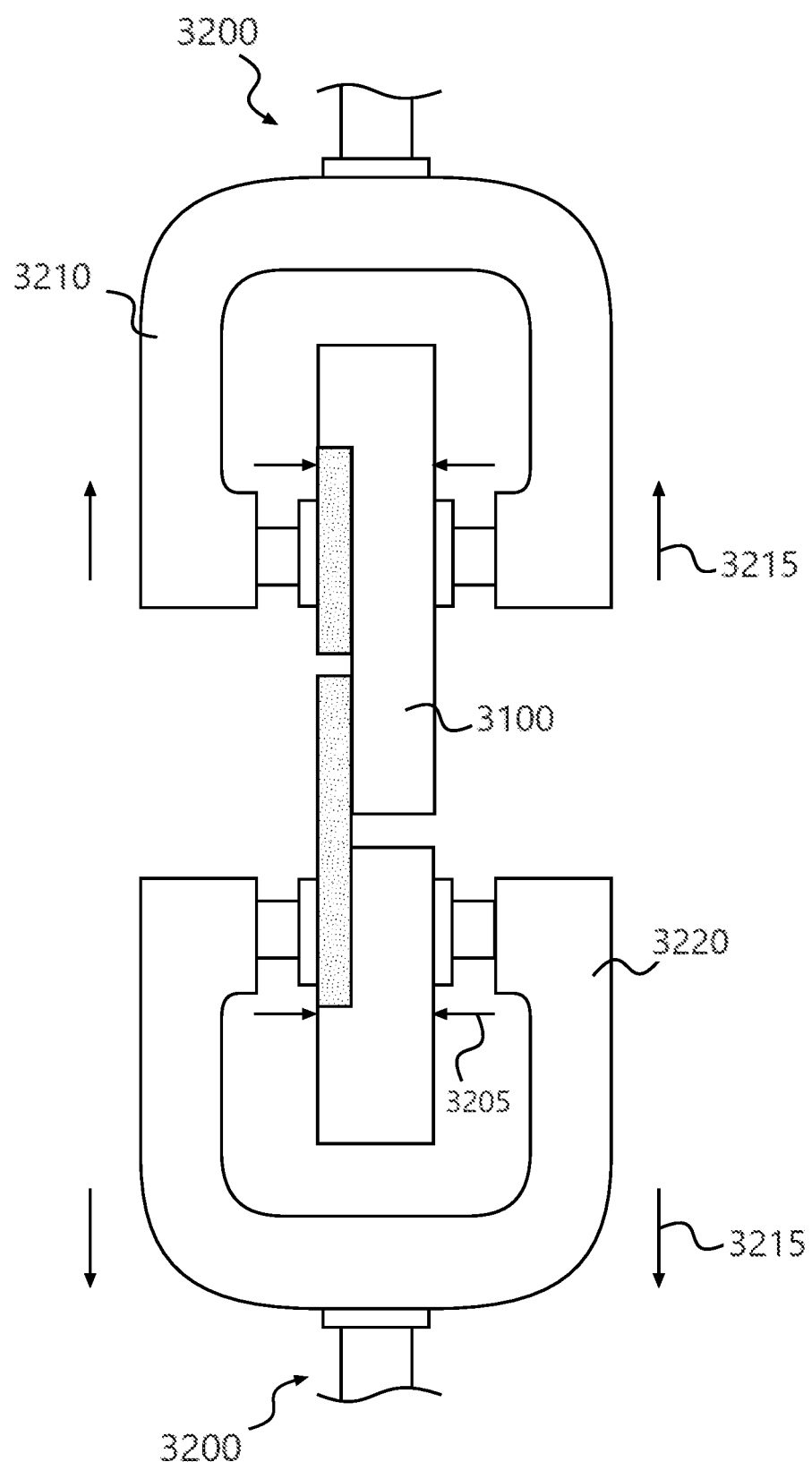
FIG. 20 illustrates lap shear test equipment loaded with a sample of reinforced polymer concrete.

Test specimens prepared using the method described above can be tested using any type of universal testing machine with grips and load limit appropriate for the size of the specimen. FIG. 20 shows the test specimen 3100 oriented within the grips of a universal testing machine 3200, such that the length of the specimen is in-line with the tensile loading direction (illustrated by arrows 3215) of the machine and the plane of the notches 3130 and 3140 are perpendicular to tensile loading direction. Grips 3210 should be configured to provide sufficient force (illustrated by arrows 3205) to firmly hold the test specimen 3100 and avoid slippage, without applying so much force that it damages the test specimen 3100 and induces failure at the grips.

The application of tensile load, through displacement of one of the grips 3210 along the tensile loading direction, induces tensile strain in the test specimen 3100. The notches 3130 and 3140 create a stress concentration region between them, which generates shear stress between the contact surface of the thermoplastic strip 3120 and the polymer concrete 3110. Adhesion between the thermoplastic strip 3120 and the polymer concrete 3110 can be determined by calculating the shear stress at the time of disbond failure. For thermoplastic materials with low adhesion, the shear strength will be less than the tensile strength of either of the constituent materials and disbond failure will occur. For thermoplastic materials with high adhesion, the adhesion strength may exceed the tensile strength of either the thermoplastic strip or the polymer concrete, resulting in a tensile failure in the weaker material.

In order to avoid biasing the test results due to inconsistent grip-induced prestress, the load cell was zeroed while the grips were open (without any test specimen) and a preload of 50N was specified for each specimen. The preload occurs after the specimen has been loaded in the grips, whereby the specimen is slowly loaded to 50N, at which point the displacement of the load cell is zeroed and the test is started.

Results

Polypropylene

The PP specimens were unable to survive the heated cure of the closed mold process. While they were able to survive the cure of the open mold process, the PP delaminated from the concrete during the waterjet cut described above. The bond strength of PP to the UPR concrete was therefore so weak that the adhesive shear strength could not be tested.

Nylon 6,6

The Nylon 6,6 specimens were able to survive both the open and closed mold curing processes. However, similar to PP, none of the Nylon 6,6 samples survived the waterjet cutting. The bond strength of Nylon 6,6 to the UPR concrete was therefore too weak to be able to test the adhesive shear strength.

Nylon 6

The Nylon 6 specimens also survived the curing processes. The closed mold Nylon 6 specimens failed the waterjet cutting process; however, the open mold samples survived. Of the four open mold Nylon 6 samples, two of them failed the 50N preload. The remaining two samples were tested and experienced failure in lap shear region 3150 at loads between 100N and 275N. In other words, the Nylon 6 and polymer concrete separate from each other in the lap shear region 3150 when the tensile load reached between 100N and 275N. Calculated adhesive shear strength for the two samples was 0.21 MPa and 0.47 MPa.

Polycarbonate

The PC specimens did not survive the closed mold cure process, but all four open mold PC samples survived the open mold cure, waterjet cut, and 50N preload threshold. The PC samples exhibited a unique failure mode where the plastic sample initially disbonded at the edge of notch 3130 opposite lap shear region 3150 in FIG. 19A. This disbonding then propagated along the interface until it reached the grips of the testing machine. All four PC samples exhibited this failure mode and one sample also exhibited a subsequent failure at the lap shear region 3150. After the load was removed, the thermoplastic strip 3120 and polymer concrete 3110 appeared to be in contact, but the disbond interface became visible if a small amount of tensile force was reapplied to the sample in its longitudinal direction. Due to the unusual failure mode, it was not possible to calculate adhesive shear strength; however, analysis of the force-displacement curve for the test showed that disbond initially occurs between 200N and 250N for two samples, between 400N and 425N for one sample, and around 800N for one sample.

Polyethylene Terephthalate

Similar to the Nylon 6 samples, the PET specimens survived both the open and closed mold curing processes with the closed mold samples failing during the waterjet cut. Two of the four open mold PET samples also failed the 50N preload threshold. The remaining two specimens were tested and experienced failure in lap shear region 3150 at loads between 150N and 250N. The calculated adhesive shear strength of the two specimens was 0.49 MPa and 0.26 MPa.

Polyethylene Terephthalate Glycol

The results for the PETG specimens were unexpected compared to all the other samples. Unlike every other sample tested, all the PETG specimens survived both the open and closed mold curing processes, the waterjet cut, and the 50N preload threshold. While the PETG exhibited some softening/compressive flow behavior during the closed mold cast and cure process, that did not weaken the material. To the contrary, it improved the interface with the polymer concrete as it provided a compliant surface to accommodate the polymer concrete mixture and increased the contact area between the two materials.

In all four of the open mold PETG specimens, the PETG itself fractured under a tensile load before any disbonding occurred in the lap shear region 3150. The fracture consistently originated at the notch 3130 (shown in FIG. 20) and then propagated through the thickness of the thermoplastic layer, leaving a hinge contact on the exposed face of the plastic strip. Two of the open molded PETG specimens fractured at loads between 575N and 625N, which is about three times greater load failure load observed for PET, despite the two materials coming from the same polymer family. One open molded PETG specimen failed between 300N and 350N and another failed between 500N and 550N. Furthermore, the failure mode observed was purely tensile, which indicates that the actual adhesive shear strength between PETG and the polymer concrete is even higher than what was observed for PC, despite the two materials failing under similar loads.

Two of the closed mold PETG specimens were tested. In both specimens, the polymer concrete fractured under tension at notch 3140 (shown in FIG. 19) before any disbonding occurred in the lap shear region 3150. The polymer concrete failure occurred at loads between 350N and 500N. Similar to the observation for open molded PETG, no adhesive shear strength can be calculated due to the tensile failure of the samples.

The polymer concrete likely failed before the PETG because the closed mold polymer concrete specimens were only ¾ inch thick, compared to the one-and-a-half-inch thick open mold samples. This difference in thickness, combined with the close mold mix having higher aggregate fraction, leads to more load concentrated in the polymer concrete. Due to this failure mode, it follows that the adhesion strength of the PETG-polymer concrete interface is higher than the tensile strength of the close mold polymer concrete mix. While the adhesion testing was conducted using unreinforced plastic strips, one of the claimed inventions involves utilizing a reinforcing material that contains both a polymer and a reinforcement fiber. The addition of a reinforcing fiber, particularly a continuous reinforcement fiber, would dramatically increase the tensile strength of the reinforcing material and change the failure mode to either polymer concrete failure or adhesive failure.

Analysis

Polypropylene was selected to provide establish a benchmark for a material that we knew would not participate in the UPR polymerization reaction due to a lack of polarity and reactive functional groups. Nylon 6 and nylon 6,6 were expected to exhibit some polar interaction with the UPR; however, we were surprised to observe different behavior between these two materials as their chemical structures are very nearly identical. In particular, the observation that nylon 6,6 was no better than polypropylene at withstanding the waterjet cut, while the nylon 6 not only survived the waterjet cut, but also had 2/4 samples pass the 50N preload was unexpected.

Polycarbonate, PET, and PETG were expected to exhibit relatively similar adhesion behavior towards the UPR because their structures are based on backbone chains combining a ring structure, oxygen, and carbon, with carbonyl (double bonded oxygen) functionality. In particular, the closely related nature of PET and PETG led us to expect these materials to have very similar adhesive behavior and both materials were included only to provide us with cost flexibility and supplier alternatives. Despite this initial hypothesis, these three materials exhibited dramatically different adhesion behavior, with PET showing the worst adhesion, PC showing moderate adhesion, and PETG showing exceptional adhesion. The level of adhesion observed during tensile indicates that the PETG forms a chemical bond with the UPR in the polymer concrete.

Following the initial lap shear testing, the PC and PETG specimens were subject to sharp impact force to induce fracture in order to compare adhesive behavior between the materials. The PC materials suffered disbond at the interface between the plastic strip and polymer concrete regardless of whether they were struck on the plastic face or the polymer concrete face, or on edge near the interface. In the PETG samples, fracture paths were observed across the interface between the polymer concrete and PETG materials with no visual disbond, for both low angle and high angle fracture paths. This indicates that the adhesive strength between the materials is high enough to result in cohesive energy dissipation across the interface.

A final test, whereby a continuous glass fiber reinforced PETG sheet was cast into a UPR polymer concrete slab structure, cured, and then struck repeatedly with a hammer further confirmed the high level of adhesion between the polymer concrete and PETG. The glass/PETG sheet was sized to be smaller than slab and impact outside of sheet-reinforced region caused fracture within 1-2 strikes, while impact in the sheet reinforced region took 3-4 impacts before any fracture occurred and even once the surface layer of polymer concrete was cracked, several more impacts were necessary to propagate the impact through the sheet. Despite the fractures, the glass/PETG sheet remained firmly adhered to the polymer concrete fragments and it was only by pulling apart the glass strands within the glass/PETG tape that we were able to separate the fragments.

Terephthalic acid ("TPA") and EG are common to both PET and PETG; however, PETG is unique in its inclusion of CHDM. Unlike TPA, which contains a benzene ring backbone, CHDM only has a cyclohexane ring (with carbon-carbon single bonds), which is both more flexible and more reactive than the benzene structure (due to benzenes delocalized resonate structure). Also, after polymerization, this cyclohexane ring is located further from the protective carbonyl functional groups, which makes it easier for the cyclohexane to participate in subsequent reactions.

The cyclohexane ring of CHDM may be participating in the free radical initiated cross-linking reaction that occurs when a curing agent is added to the liquid UPR during polymer concrete casting.

Illustrative Embodiments

One embodiment of the reinforced polymer concrete described here can include polymer concrete and a reinforcing material. The reinforcing material can include a polymer and a reinforcement fiber. Based on a CHDM cross-linking reaction, the polymer in the reinforcement material can be any CHDM-containing polymer. The polymer can be thermoset or thermoplastic so long as it contains as CHDM backbone. For example, polyurethanes formed by reacting isocyanates and polyols can be synthesized using CHDM as part of the polyol component. It is suspected that all such CHDM-containing polyurethanes would experience similar bonding during the polymer concrete curing process. Some examples of CHDM-containing polyesters include the copolyesters PETG, PCTG, and PCTA. The monomers for polymerization of PCT, PCTG, and PCTA are:

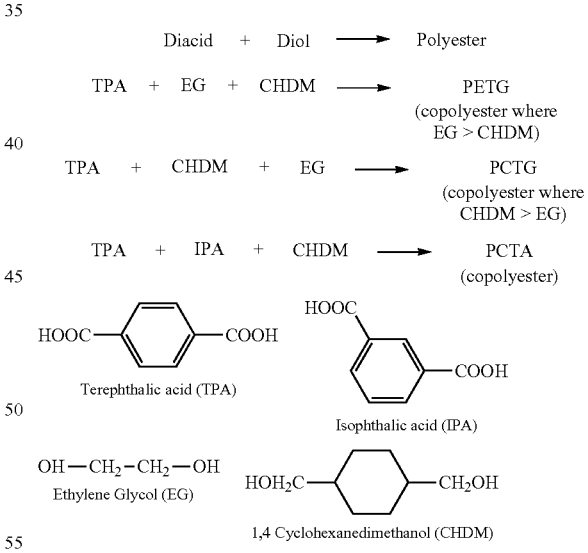

One example of a binding agent that can be used in the polymer concrete is UPR. Other binding agents can be used that would create the similar cross-linking mechanisms with CHDM-containing polymers, such as vinyl ester and epoxy. However, UPR is significantly cheaper and more widely available than the available alternatives. For that reason, it may be preferred to use UPR as the primary binding agent. UPR can be formed by combining maelic anhydride and phthalic anhydride (diacids) with propylene glycol (diol) to form an unsaturated polyester structure as shown below:

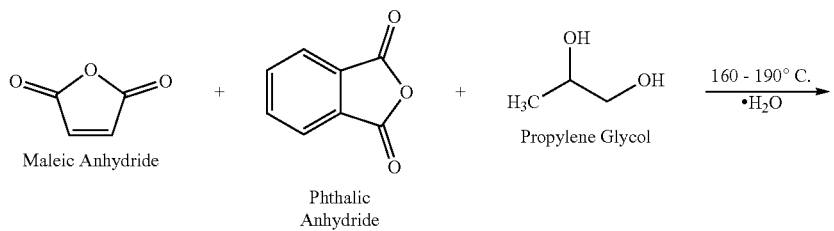

Maleic Anhydride + Phthalic Anhydride + Propylene Glycol $\xrightarrow[\cdot H_2O]{160 - 190° C.}$

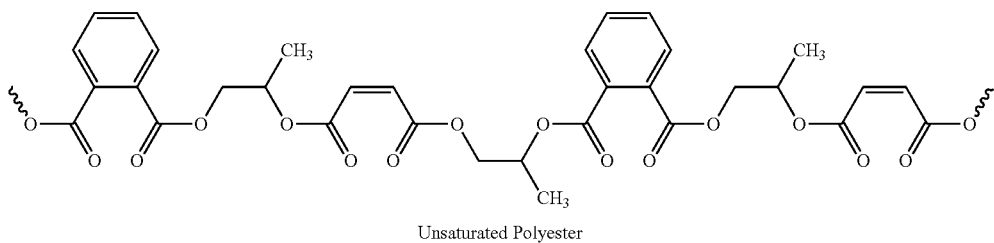

Unsaturated Polyester

Polymer concrete differs from more traditional concretes in the binding agent used. Portland cement is the most common binding agent used in traditional concrete. When mixed with water, Portland cement creates a paste that binds with sand and rock to harden. While Portland cement usually originates from limestone, polymer concretes use polymers as a binding agent, as explained above. Because Portland cement-based concretes use a limestone-based binding agent as opposed to a polymer-based binding agent, their adhesion properties to different materials would greatly differ. For example, the paragraphs below describe a cross-linking mechanism that may be active in creating a chemical bond between CHDM-containing polyesters and UPR polymer concrete. This cross-linking mechanism would not be present with a Portland cement-based concrete and therefore would not experience the same adhesion strength with PETG.

Introducing a cross-linking reagent (such as styrene) and free radicals (often done by adding MEKP or BPO) triggers a reaction that opens the double bonds and allows the formation of cross-linking between adjacent polyester molecules through the styrene molecules. The chemical structure of this reaction is shown below:

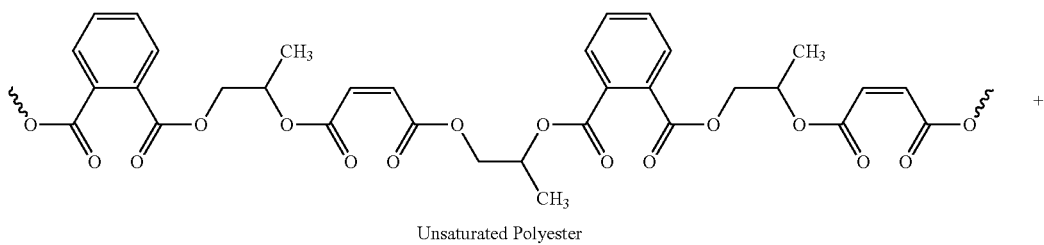

Unsaturated Polyester

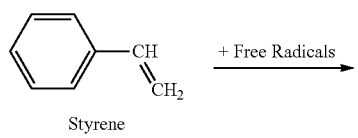

Styrene

-continued

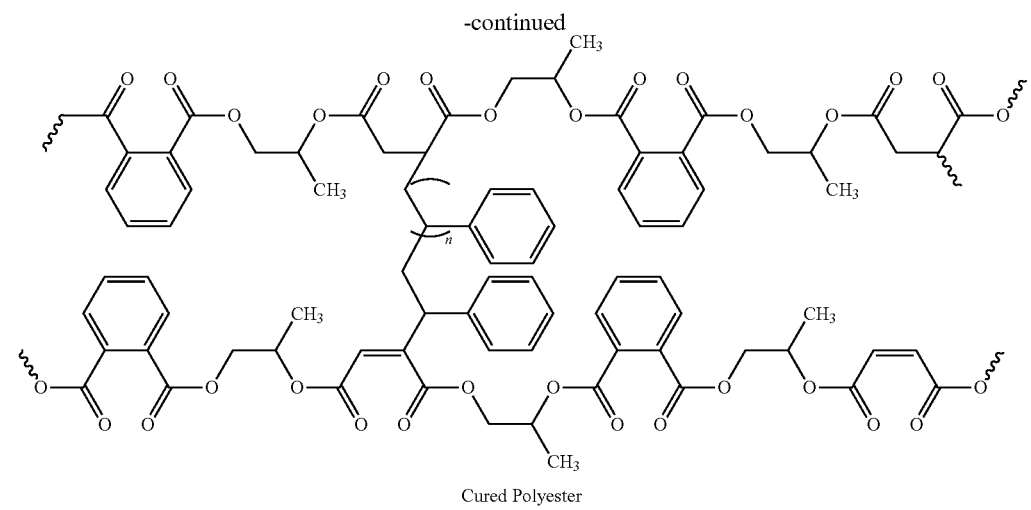

Cured Polyester

There are two possible cross-linking mechanisms that may be active in creating a chemical bond between CHDM-containing polyesters and UPR polymer concrete. First, as previously discussed, the cyclohexane ring of CHDM may participate in the free radical initiated cross-linking reaction that occurs when MEKP is added to liquid UPR during polymer concrete casting. Cyclohexane may be vulnerable to free radical initiated ring opening. As a result, it may be able to actively participate in the UPR cross-linking reaction as a radicalized UPR molecule or radicalized styrene attacks the CHDM, opening it and forming a bond with one arm of the open ring. After the ring opens, the remaining arm can rotate to a lower energy conformation (opposite the first arm) which may allow it to react with an additional styrene molecule without interference from the UPR attached to the first arm.

In another cross-linking mechanism, the cyclohexane within PETG may participate in the cross-linking reaction through radical substitution of one of the carbon-hydrogen bonds, rather than ring separation. Previous studies on this type of radical substitution reaction utilize phthalic acid-based CHDM-containing polyesters which changes the location of the cyclohexane ring relative to the protective carbonyl groups, whereas PETG both utilize terephthalic acid, so this mechanism may not be favored.

Example Applications

Figure 21:
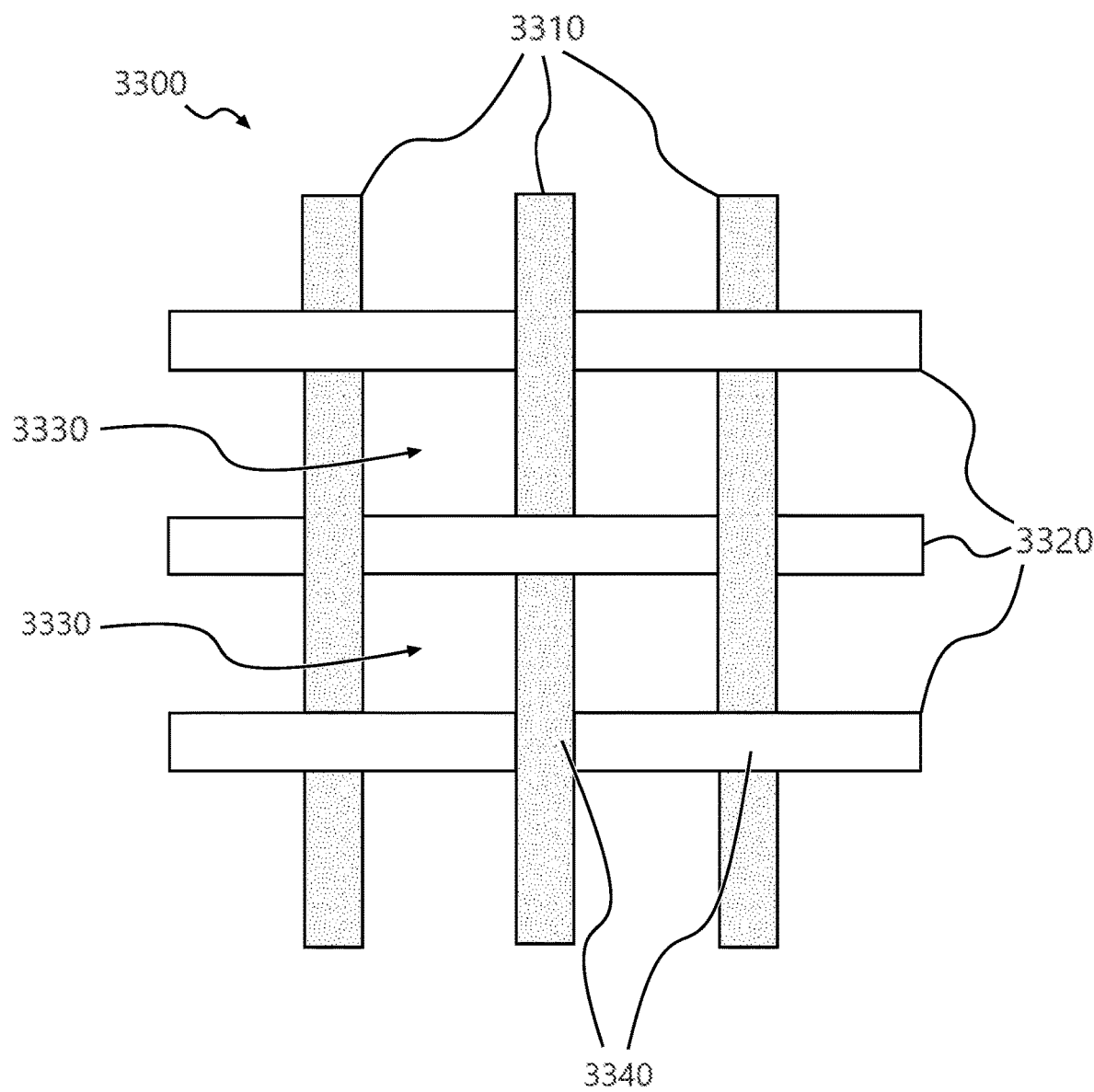
FIG. 21 is a diagram of a plain weave illustrating the interlacing of warp and weft tapes in accordance with the present disclosure.

The unexpected results exhibited by PETG and polymer concrete using methods described herein can be advantageous when using an interlaced composite as a reinforcing structure in polymer concrete. FIG. 21 illustrates an exemplary embodiment of an interlaced composite 3300 as described in related applications referenced above and incorporated by reference into this application. The interlaced composite 3300 can include a first set of two or more warp tapes 3310 (substantially parallel to one another) and a first set of two or more weft tapes 3320 (substantially parallel to one another), wherein at least a portion of the first set of warp tapes 3310 are interlaced with, and bonded and bonded to, at least a portion of the first set of weft tapes 3320. As used herein, "tape" refers to an element having length much greater than its width or thickness. In the preferred embodiment, the tapes 3310 and 3320 can include a polymer and a reinforcement fiber, such as carbon, basalt, glass, metallic, or aramid, or any other fiber reinforcement that would be known by a person having ordinary skill in the art to provide increased strength, stiffness, or functionality compared to the polymer.

In an embodiment, one or more of tapes 3310 and/or 3320 can include a CHDM-containing polymer. In some embodiments it may be favorable to produce an interlaced component where all the tapes include a CHDM-containing polymer to maximize the adhesion of the polymer concrete to the interlaced composite. In other embodiments it may be favorable to design the interlaced composite where some number of tapes include a CHDM-containing polymer and other tapes include a non-CHDM-containing polymer that is still bondable to one or more tapes in the interlaced composite (PETG and PET would be one such example). This mixed material interlaced composite may be less expensive than a single material design, or it may be advantageous to induce disbond failure in some areas, while retaining a high level of adhesion in other areas to generate a pseudoplastic failure mode within the material.

As polymer concrete is traditionally poured or cast into a mold directly from a mixing device, it is important to ensure that the interlaced composite allows the polymer concrete to fill the mold without obstruction. Accordingly, warp tapes 3310 and weft tapes 3320 can be spaced apart so as to create openings 3330. The interlaced composite can therefore be designed with one or more openings 3330 to allow polymer concrete to flow through and around the interlaced composite during the molding process. In some embodiments, a plurality of openings 3330 within the interlaced composite may be used to increase the surface area in contact between the interlaced composite and polymer concrete. In other embodiments, a plurality of openings 3330 may generate a mechanical bond through encapsulation of interlace points 3340 of the interlaced composites. Allowing polymer concrete to flow through and around the interlaced composite also has the benefit of reducing interfacial shear stress, caused by differential strain between materials, by creating continuity between the polymer concrete above and below the interlaced composite.

The use of an interlaced composite, as opposed to a unidirectional tape or extruded/pultruded rod provides additional benefits relating to the handling and location of lattice within the concrete component. Unidirectional tapes are difficult to handle and locate within the mold, due to their tendency to curl or twist, and are susceptible to movement during the pouring operation, which can result in a defective product. Extruded/pultruded composite rods, particularly those produced using from thermoset polymers, are well known within the construction industry to be labor intensive to install, as forming a reinforcing cage structure requires each rebar to be manually tied to each intersecting rebar. These tie points also represent areas of poor load transfer within the structure. The interlaced composite can be produced with tapes spaced as required by the structural design, and the use of thermoplastic polymers in the tapes permits the interlaced composite to be heat formed to any shape and also permits welding of the interlaced composite to itself and to other compatible thermoplastics (such as additional interlaced composites or thermoplastic anchors). The interlaced composite is also conducive to the production of prestressed concrete, as the lattice can be tensioned in the warp and weft directions prior to casting.

In some embodiments, a transmission material (such as optical fiber or metallic ribbon) may be utilized as a warp or weft tape within the interlaced composite. The inclusion of this transmission material may enable structural health monitoring of the cured concrete component. Having the transmission material embedded within the interlaced composite allows it to be precisely located in a known depth of the concrete component, which also happens to be the same location as the maximum expected tensile stress. Existing methods of placing optical fibers for structural health monitoring in concrete rely on manual placement of the material, which increases the likelihood of damaging the fiber or results in suboptimal placement caused by difficulty securing the fiber during the pouring process.

Figure 22:
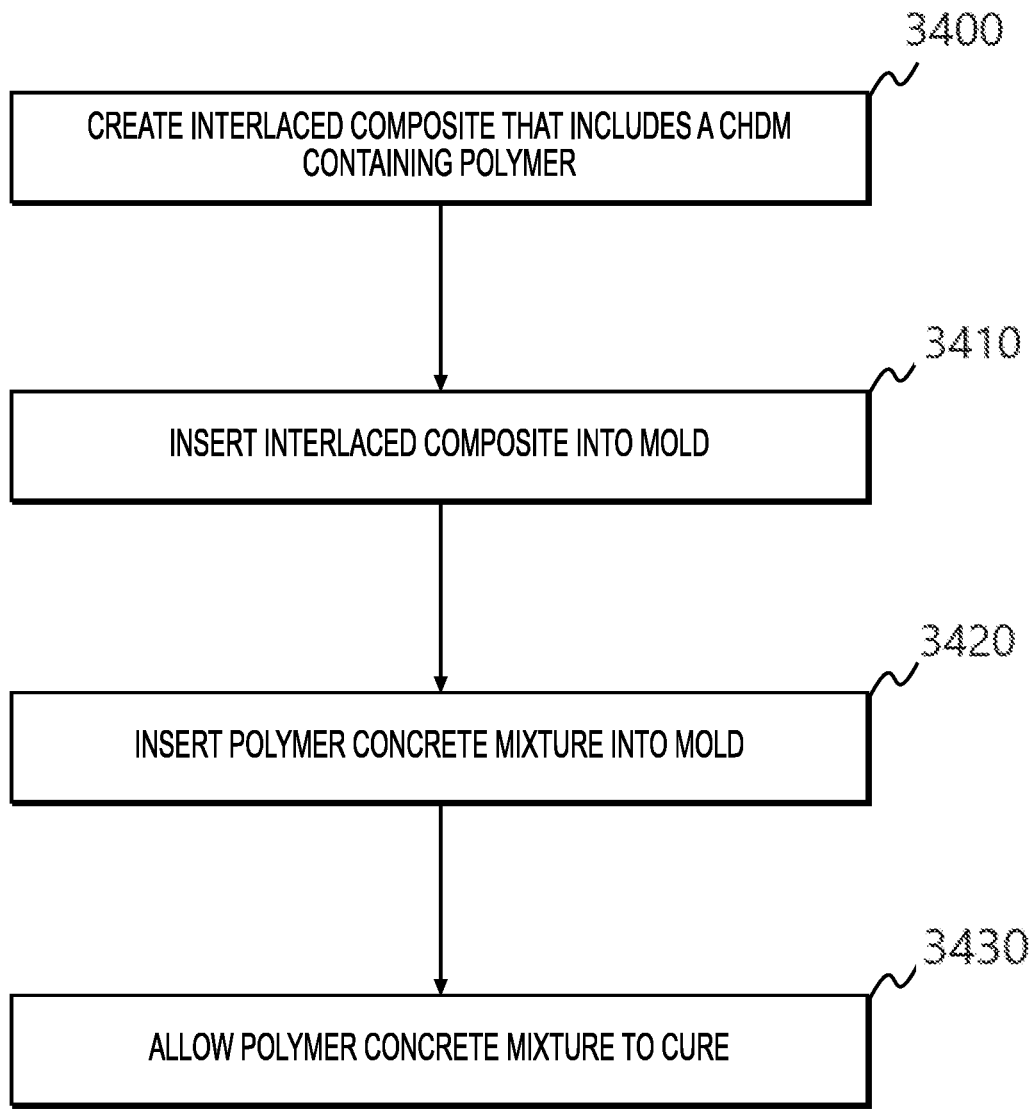
FIG. 22 illustrates an example method for incorporating an interlaced composite into a polymer concrete mixture as a reinforcing agent.

FIG. 22 illustrates an example method for incorporating an interlaced composite into a polymer concrete mixture as a reinforcing material. At stage 3400, an interlaced composite can be created that includes a CHDM-containing polymer. As an example, the CHDM-containing polymer can be PETG. In an example, the interlaced composite can be created using the methods previously described herein, such as the method previously described regarding FIG. 21. The composition of the interlaced composite regarding where and how many CHDM-containing polymer tapes are used can be vary according to specific needs. For example, tapes with CHDM-containing polymer may be more expensive than those without, and so fewer tapes with the polymer can be used. In one example, the interlaced composite can have just one tape with the CHDM-containing polymer. In another example, all the tapes can have the CHDM-containing polymer. For reasons previously described herein, a greater number of tapes with a CHDM-containing polymer in the interlaced composite may create a stronger bond to polymer concrete.

At stage 3410, the interlaced composite can be inserted into a mold. The mold can be open or closed. The interlaced composite can be positioned in the mold as desired, so long as at least a portion of the interlaced composite is in direct contact with any polymer concrete poured into the mold.

At stage 3420, a polymer concrete mixture can be inserted into the mold. In an example, the polymer concrete mixture can be a concrete mixture that includes UPR as a binding agent. Examples of other binding agents can include epoxy and vinyl ester. It should be noted that stages 3410 and 3420 can be performed in the opposite order, simultaneously, or in an overlapping fashion. The polymer concrete mixture can include a cross-linking agent and a free radical initiator. Styrene is an example cross-linking agent that can be included. MEKP and BPO are example free radical initiators that can be included. For reasons described previously herein, the cross-linking agent and free radical initiator may open the molecules of the binding agent for bonding with the CHDM-containing polymer in the interlaced composite tapes.

In some examples, the interlaced composite and polymer concrete mixture can be inserted into the mold using a layering technique. For example, a portion of the mold can first be filled with polymer concrete mixture. An interlaced composite can then be pressed into the exposed surface of the polymer concrete mixture. Finally, additional polymer concrete mixture can be poured on top so that the interlaced composite is enclosed within polymer concrete mixture. In other examples, an interlaced composite can be inserted into the mold first. Polymer concrete mixture can then be poured into the mold, thus enclosing the interlaced composite.

At stage 3430, the polymer concrete mixture can be allowed to cure. In an example where an open mold is used, the polymer concrete mixture can cure at room temperature and pressure. In another example where a closed mold is used, the polymer concrete mixture can be cured at an elevated temperature and pressure. For example, in a closed mold the polymer concrete mixture can cure where the temperature is above 150 degree centigrade and the pressure is between 100-300 psi.

Although numerous references herein are made to polymer concrete, it is contemplated that similar results can be expected when using UPR as a binding agent, or similar binding agents like vinyl ester and epoxy, in any thermoset mixture, introducing a curing agent to the mixture, and allowing the mixture to cure while in direct contact with a CDHM-containing polymer, such as PETG.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of continuously forming a consolidated woven composite comprising:
   forming a woven composite material of repeating units created by a repeated sequence of warp and weft filament movements comprising:
   receiving one or more polymer impregnated or coated warp filaments from a warp rack comprising warp heads; and
   inserting one or more polymer impregnated or coated weft filaments between one or more warp filaments with a weft inserter, at least one of the warp or weft filaments comprising a transmission material; and
   consolidating the woven composite material by heat and pressure to form a consolidated woven composite,
   wherein the forming and consolidating of the woven composite material is performed on a single machine.

2. The method of claim 1, wherein a first warp filament and a first weft filament comprises the transmission material.

3. The method of claim 1, wherein the transmission material comprises a metallic conductor.

4. The method of claim 1, wherein the transmission material comprises a light guide material.

5. The method of claim 1, wherein the forming the woven woven composite material further comprises receiving at least one warp filament that is not polymer impregnated or coated and that is composed entirely of the transmission material.

6. The method of claim 1, wherein a first warp or weft filament comprises a first transmission material of a first type, and a second warp or weft filament comprises a second transmission material of a second type.

7. The method of claim 2, wherein subsequent to the consolidating, a junction device is attached at a location where the first warp filament and the first weft filament intersect.

8. The method of claim 7, wherein the junction device is a rivet or a clinching device.

9. The method of claim 8, wherein the consolidated woven composite comprises a CHDM-containing polymer and the method further comprises:
   trimming a part portion of the consolidated woven composite;
   inserting the trimmed part portion of the consolidated woven composite into a mold;
   inserting a polymer concrete mixture into the mold, where the mixture comprises an unsaturated polyester resin, an aggregate, and a curing agent; and
   curing the polymer concrete mixture while in direct contact with the CHDM-containing polymer of the consolidated woven composite.

10. A method of continuously forming a consolidated woven composite, comprising:
    forming a woven composite material of repeating units by a repeated sequence of warp and weft filament movements comprising:
    receiving one or more polymer impregnated or coated warp filaments from a warp rack comprising warp heads; and
    inserting one or more polymer impregnated or coated weft filaments between one or more warp filaments, at least one of the warp or weft filaments comprising a transmission material; and
    consolidating the woven composite material by heat and pressure to form a consolidated woven composite,
    wherein each warp head is capable of independent vertical movement to adjust the height of the warp filament exiting from the respective warp head.

11. The method of claim 10, wherein a first warp filament and a first weft filament comprise the transmission material.

12. The method of claim 10, wherein the transmission material comprises a metallic conductor or a light guide material.

13. A method of continuously forming a consolidated woven composite comprising:
    forming a woven composite material of repeating units created by a repeated sequence of warp and weft tape movements comprising:
    receiving one or more polymer impregnated or coated warp tapes from a warp rack comprising warp heads, at least a first warp tape including a first plurality of reinforcing fibers and a second warp tape including a first transmission element; and
    inserting one or more polymer impregnated or coated weft tapes between one or more warp tapes, at least a first weft tape including a second plurality of reinforcing fibers; and
    consolidating the woven composite material by heat and pressure to form a consolidated woven composite,
    wherein the forming and consolidating of the woven composite material is performed on a single machine.

14. The method of claim 13, wherein the second warp tape is positioned vertically above the first warp tape within the woven composite material.

15. The method of claim 14, wherein the reinforcing fibers of the first warp tape are electrically or thermally insulating.

16. The method of claim 14, wherein the receiving one or more polymer impregnated or coated warp tapes includes at least a third warp tape including a third plurality of reinforcing fibers.

17. The method of claim 16, wherein the third warp tape is positioned vertically above the second warp tape within the woven composite material such that the second warp tape is positioned between the first and third warp tapes.

18. The method of claim 14, further comprising at least a second weft tape including a second transmission element.

19. The method of claim 18, wherein the second weft tape is inserted vertically below the first warp tape such that the second weft tape is not in direct contact with the second warp tape.

20. The method of claim 18, wherein the second weft tape is inserted between the first and second warp tapes such that the second weft tape is in direct contact with the second warp tape.

* * * * *